US012466612B2

(12) United States Patent
Zayat et al.

(10) Patent No.: US 12,466,612 B2
(45) Date of Patent: Nov. 11, 2025

(54) PAPER RETAIL BAG

(71) Applicant: DOMTAR PAPER COMPANY, LLC, Fort Mill, SC (US)

(72) Inventors: Jonathan Zayat, Naperville, IL (US); Jae Young Jeon, Glenview, IL (US); Andrew Johansen, Chicago, IL (US); Brent Lindberg, Chicago, IL (US)

(73) Assignee: Domtar Paper Company, LLC, Ft. Mill, SC (US)

( * ) Notice: Subject to any disclaimer, the term of this patent is extended or adjusted under 35 U.S.C. 154(b) by 0 days.

(21) Appl. No.: 17/858,777

(22) Filed: Jul. 6, 2022

(65) Prior Publication Data

US 2024/0010392 A1 Jan. 11, 2024

(51) Int. Cl.

*B65D 33/14* (2006.01)
*B31B 70/14* (2017.01)
*B31B 70/20* (2017.01)
*B65D 30/00* (2006.01)
*B65D 30/20* (2006.01)

(Continued)

(52) U.S. Cl.

CPC ............ *B65D 33/14* (2013.01); *B31B 70/148* (2017.08); *B31B 70/20* (2017.08); *B65D 31/005* (2013.01); *B65D 31/10* (2013.01); *B65D 33/065* (2013.01); *B65D 33/08* (2013.01); *B65D 33/12* (2013.01); *B31B 2150/001* (2017.08); *B31B 2160/20* (2017.08)

(58) Field of Classification Search

CPC ...... B65D 33/14; B65D 31/005; B65D 31/10; B65D 33/065; B65D 33/08; B65D 33/12; B31B 70/148; B31B 70/20; B31B 2160/20; B31B 2150/001

USPC .............................. 383/8, 9, 22, 37; 206/554

See application file for complete search history.

(56) References Cited

U.S. PATENT DOCUMENTS 1,719,347 A * 7/1929 Weinstein .............. B65D 33/30 383/905
1,802,276 A * 4/1931 Schardt .................. B65D 33/18 383/91

(Continued)

FOREIGN PATENT DOCUMENTS

DE 102009007985 A1 * 2/2010 ............ B65D 31/10
KR 200450706 Y1 * 10/2010
KR 200473275 Y1 * 6/2014

OTHER PUBLICATIONS

Machine translation of KR200473275Y1. (Year: 2014).*

*Primary Examiner* — Jes F Pascua

(74) *Attorney, Agent, or Firm* — Norton Rose Fulbright US LLP

(57) ABSTRACT

The present disclosure includes paper bags and methods for forming paper bags. Some of the bags may include a body, a first attachment portion configured to engage an arm of a bag holder, and a second attachment portion configured to engage another arm of the bag holder. In some aspects, the body defines an opening and includes opposing first and second sides, a first section disposed between the first side and the second side, and a second section disposed between the first and second sides, the second section moveable relative to the first section to define a cavity that is in communication with the opening. The first attachment portion may be closer to the first side of the body than the second side and the second attachment portion may be closer to the second side of the body than the first side.

22 Claims, 45 Drawing Sheets

(51) Int. Cl.

| | |
|---|---|
| ***B65D 33/06*** | (2006.01) |
| ***B65D 33/08*** | (2006.01) |
| ***B65D 33/12*** | (2006.01) |
| *B31B 150/00* | (2017.01) |
| *B31B 160/20* | (2017.01) |

(56) References Cited

U.S. PATENT DOCUMENTS 1,955,385 A * 4/1934 Gray ...................... B65D 33/14 220/495.11
2,725,141 A * 11/1955 Latvala ................... B65F 1/062 220/495.07
2,899,161 A * 8/1959 Bayard ............... B65B 67/1266 248/101
2,903,215 A * 9/1959 Derek ...................... B60N 3/08 248/99
3,388,882 A * 6/1968 Burroughs .......... B65B 67/1244 294/142
3,455,529 A * 7/1969 Kelley ................ B65B 67/1266 248/100
4,106,733 A * 8/1978 Walitalo .............. B65B 67/1266 248/222.51
4,106,734 A * 8/1978 Walitalo .................. B65B 43/14 248/222.51
4,736,450 A * 4/1988 Van Erden ......... B65D 33/2541 383/65
D309,565 S * 7/1990 Newman ........................ D9/704
5,154,378 A * 10/1992 Plum ....................... B65B 67/12 312/212
5,165,799 A * 11/1992 Wood .................. B29C 65/1483 383/104
6,394,309 B1 * 5/2002 Fainberg ................. G07F 11/64 206/554
10,787,187 B1 * 9/2020 De Bonet ............... B62B 3/106
2004/0184682 A1 * 9/2004 Lovold ................ B65D 33/007 383/35
2009/0169135 A1 * 7/2009 Dickinson ............ B65D 33/001 383/33
2018/0253686 A1 * 9/2018 Fallgren ............. G06Q 10/0832

* cited by examiner

PAPER RETAIL BAG

FIELD OF INVENTION

The present invention relates generally to paper bags, and more specifically, to paper bags configured for use with conventional plastic bag holders.

BACKGROUND

Disposable bags are often used in retail setting to assist consumers in carrying multiple products from a shop to the consumer's end destination. Disposable bags are most often made from different types of paper and plastic materials. However, current paper and plastic bags have several disadvantages.

Plastic bags are the most common type of disposable bag and are typically arranged on a bag holder for easy manipulation and convenience. However, plastic bags are known to contribute to environmental issues. For example, animals may eat plastic bags, which can cause health problems and may leads to death. Further, because plastic bags are generally not biodegradable, they often become litter if they are not properly recycled.

Some paper bags are biodegradable or compostable and have a smaller environmental impact relative to plastic bags. However, paper bags tend to be less convenient for consumers and retailers. Typically, paper bags are folded and stacked on a surface near a checkout station. Paper bags typically require more space for storage and/or an employee must replenish paper bags at a checkout station frequently (e.g., more frequently than plastic bags). Further, most paper bags need to be manipulated with both hands to be able to receive objects. This can be burdensome and time consuming for both consumers and employees handling multiple items or performing more than one task. Paper bags are typically also inelastic and/or susceptible to tearing when carrying heavy items and/or items with rigid corners or edges.

SUMMARY

There is a need for disposable bags which are convenient to use and have a smaller environmental impact. Some configurations of the present paper bags can address these needs by being made from paper, rather than plastic, and being usable with existing bag holders.

Some of the present configurations include a paper bag having a body, a first attachment portion configured to engage with a first arm of a bag holder, and a second attachment portion configured to engage with a second arm of the bag holder. In some configurations, the body defines defining an opening configured to receive objects. The body may include opposing first and second sides, a first section disposed between the first side and the second side, and a second section disposed between the first and second sides, the second section moveable relative to the first section to define a cavity that is in communication with the opening. In some aspects, the first attachment portion is closer to the first side of the body than the second side, the second attachment portion is closer to the second side of the body than the first side, or both. In some configurations, the paper includes kraft paper, such as an extensible or semi-extensible kraft paper.

Some of the present bags include a first handle coupled to the body and a second handle coupled to the body. Additionally, or alternatively, the body may define a first aperture and a second aperture that is aligned with the first aperture. First and second apertures may be defined by first and second sections, respectively. In some configurations, at least a majority of the first and second sections are interposed between the first attachment portion and the second attachment portion. In some aspects, the first and second attachment portions are unitary with the body. Additionally, or alternatively, at least one of the first and second attachment portions are disposed laterally outward from the body. In some configurations, a width of the paper bag is greater than a width of the body.

In some of the present configurations, the paper bag includes a perimeter and the first attachment portion includes a first notch extending inward from the perimeter. As an example, the first notch may extend vertically upward from the perimeter. In some of the present configurations, the first notch includes a first region having a first transverse dimension and a second region having a second transverse dimension that is greater than the first transverse dimension. The first transverse dimension may be less than a dimension of the first arm of the bag holder and the second transverse dimension may be greater than the dimension of the first arm such that the first attachment portion is configured to slide along the first arm. In some aspects, the first notch is positioned vertically below the opening. The second attachment portion may include a second notch extending inward from the perimeter.

Some aspects of the present disclosure include a method of forming a paper bag. The method may include folding a paper sheet to form one of the present bags. Some methods include forming a first attachment portion, forming a second attachment portion, or both. In some aspects, the method can include cutting a first notch in the bag or cutting a second notch in the bag. The first and second notch extend from a perimeter of the bag. Some methods can include attaching a portion of the first section to a portion of the second section. Additionally, or alternatively, some methods include cutting a portion of the sheet to form an opening of the bag.

The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed configuration, the term "substantially" may be substituted with "within [a percentage] of" what is specified, where the percentage includes 0.1, 1, 5, and 10 percent.

Further, an apparatus or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus that "comprises," "has," or "includes" one or more elements possesses those one or more elements, but is not limited to possessing only those elements. Likewise, a method that "comprises," "has," or "includes" one or more steps possesses those one or more steps, but is not limited to possessing only those one or more steps.

Any configuration of any of the apparatuses, systems, and methods can consist of or consist essentially of—rather than comprise/include/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one configuration may be applied to other configurations, even though not described or illustrated, unless expressly prohibited by this disclosure or the nature of the configurations.

Some details associated with the configurations described above and others are described below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures are drawn to scale (unless otherwise noted), meaning the sizes of the depicted elements are accurate relative to each other for at least the configuration depicted in the figures.

FIG. 9IJ is a perspective view of the paper bag of FIG. 9A in a second position while engaged with a bag holder system.

DETAILED DESCRIPTION

Figure 1:
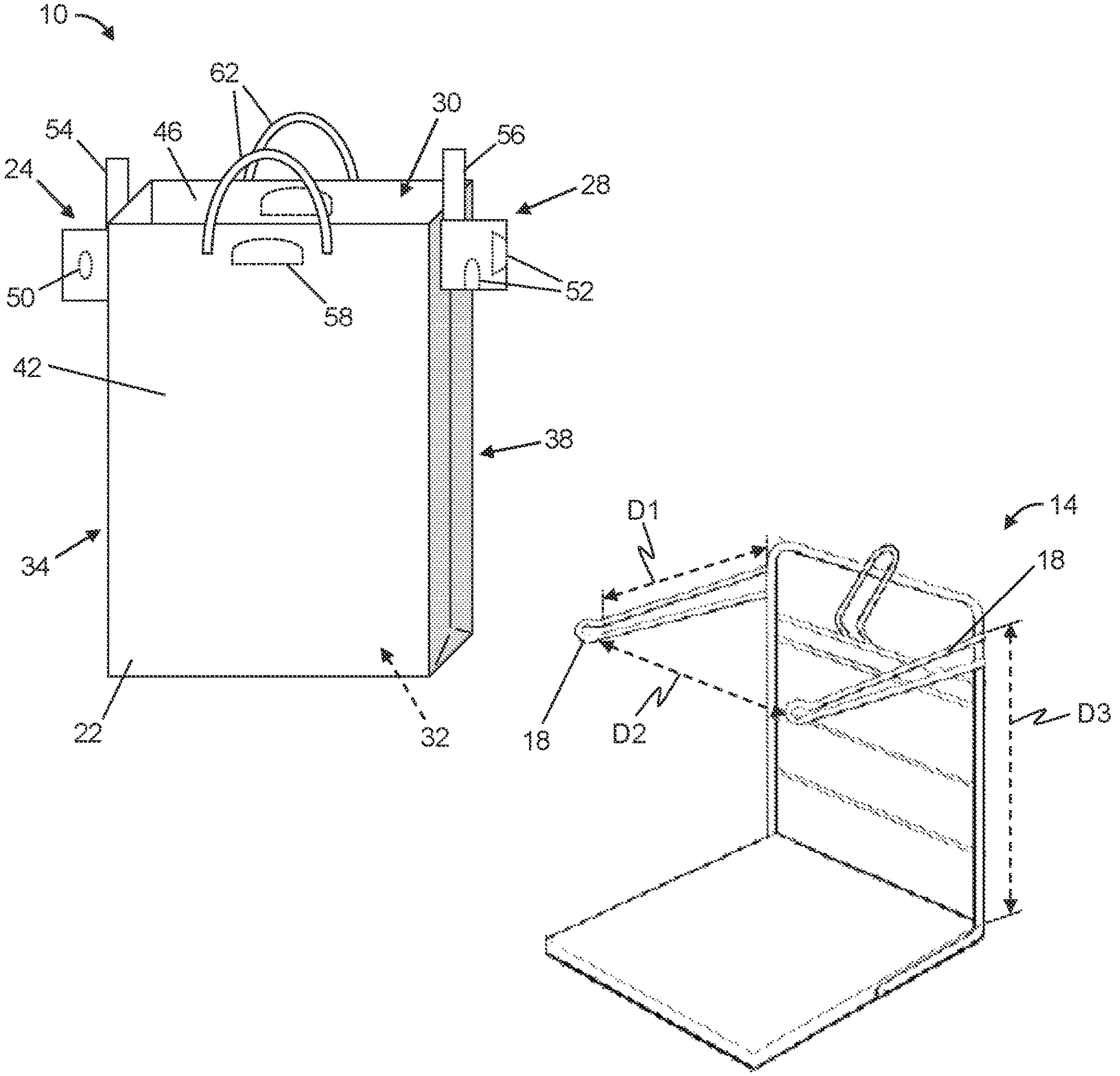
FIG. 1 is a schematic view of an example of a paper bag of the present disclosure with a bag holder.

Referring now to the drawings, and more particularly to FIG. 1, shown therein and designated by the reference numeral 10 is one configuration of the present paper bags. Bag 10 is configured to engage with a bag holder 14 such that the bag can be stored in an upright position. As shown, bag holder 14 includes an arm length D1 that is a distance between two ends of an arm 18, an arm width D2 that is a distance between two different arms 18 measured orthogonal to the length of the arms, and an arm height D3 that is a distance from a base of the bag holder to an arm 18. In some configurations, bag 10 can slidably engage with arms 18 of bag holder 14. For example, bag 10 can be sized to correspond to arm width D2 of bag holder 14, such as an existing plastic bag holder. Additionally, or alternatively, bag 10 may be sized to one or more other dimensions of bag holder such as, for example, arm length D1 or arm height D3. In this way and others, bag 10 may engage with pre-existing bag holders to limit structural changes required for a retailer to use both paper and plastic bags. Accordingly, as described herein, bag 10 provides an eco-friendly bag that is more convenient for consumers than a conventional bag and is able to operate with existing retailer equipment.

As shown in FIG. 1, bag 10 includes a body 22, a first attachment portion 24 configured to engage with a first arm 18 of bag holder 14, and a second attachment portion 28 configured to engage with a second arm 18 of the bag holder. First attachment portion 24 and second attachment portion 28 can be coupled to body 22 in any suitable manner. For example, attachment portions 24, 28 can be unitary with body 22 or, in other configurations, the attachment portions can be separate from the body and attached to the body. To illustrate, FIG. 1 shows the first and second attachment portions 24, 28 being disposed laterally outward from body; however, in some configurations, first attachment portion 24 and second attachment portion 28 can be included in, or be a section of, body 22.

Body 22 defines an opening 30 and a cavity 32 configured to receive and accommodate a plurality of objects. Body 22 has a first side 34 and a second side 38 that is opposite the first side. A first section 42 and a second section 46 of body 22 are disposed between the first side and the second side and are moveable relative to one another to define cavity 32, as further described herein with reference to FIGS. 2A and 2B. Body 22 includes a paper material such as kraft paper, white paper, paperboard, recycled paper, or other suitable paper material for use as a bag. In some configurations, the paper material is extensible or semi-extensible paper. In at least some configurations, the paper material is flexible with a stretch capacity between 30 and 50 percent in the machine direction, such as a 40 percent stretch capacity.

Each of first and second attachment portions 24, 28 are configured to engage a respective arm 18 of bag holder 14. First attachment portion 24 may be closer to first side 34 of body 22 than to second side 38. Second attachment portion 28 may be closer to second side 38 of body 22 than to first side 34. For example, a majority of, up to and including all of, first and second sections 42, 46 are interposed between first and second attachment portions 24, 28. In this way and others, bag 10 first and second attachment portions 24, 28 can engage different arms 18 of bag holder 14. In some configurations, bag 10 can be sized such that a distance between a part of first attachment portion 24 and a part of second attachment portion 28 is substantially equal to arm width D2 of bag holder 14. In some configurations, a distance between a part of first attachment portion 24 and a part of second attachment portion 28 can, but need not, be greater than a width of body 22. Each of first and second attachment portions 24, 28 include a paper material as described above with respect to body 22. In some configurations, bag 10—including body 22 and first and second attachment portions 24, 28—consist of paper material and do not include other materials, such as plastic.

In some configurations, first attachment portion 24 can define one or more notch 50 that is shaped to engage arm 18 and second attachment portion 28 can define one or more notch 52 that is shaped to engage arm 18 to support body 22 in an upright position. Notch 50 may be sized in any suitable manner to engage arm 18. For example, notches 50, 52 can include an indentation that extends from an edge of bag 10, such as the perimeter edge of the bag. In some such configurations, notches 50, 52 may extend in a vertical direction from a bottom edge of bag 10, or may extend in a lateral direction from a side edge of bag 10, or combination thereof. Notches 50, 52 can be shaped in any suitable manner to engage arms and, in some configurations, the notches can include different regions with varying dimensions that allow the notches to slide along arms while still supporting bag 10. Additionally, or alternatively, notches 50, 52 can include one or more aperture in an interior of first attachment portion 24. In other configurations, first and second attachment portions 24, 28 can include a slit or loop that is configured to surround arm 18. In yet other configurations, first and second attachment portions 24, 28 can slidably engage arm 18 in another suitable manner as known in the art.

In some configurations, first attachment portion 24 can include a handle portion 54 and second attachment portion 28 can include a handle portion 56. Handle portions 54, 56 can be utilized by a user to lift bag 10, can be utilized to engage arm 18, or both. In some configurations, handle portions 54, 56 includes a strip of paper material that is attached at its ends to form a loop. Handle portions 54, 56 can be unitary or separate from body 22. For example, in some configurations, handle portions 54, 56 can extend from first section 42, second section 46, or both. In other configurations, handle portions 54, 56 can include a separate paper material that is attached to body 22 in a suitable manner, such as via an adhesive.

In some configurations, bag 10 can include a means for carrying the bag. For example, bag 10 may define one or more aperture 58 configured to receive a user's hand. Aperture 58 may be rounded or arched at one end to minimize stress points when lifting bag 10. As shown, each of first section 42 and a second section 46 can define aperture 58 that are aligned with one another. Additionally, or alternatively, bag 10 can include one or more handles 62. In some configurations, handle 62 can extend from body 22. Handle 62 can be unitary with, or separate from, body 22. In other configurations, alternative carrying means known in the art can be utilized for handling bag 10.

Figure 2A:
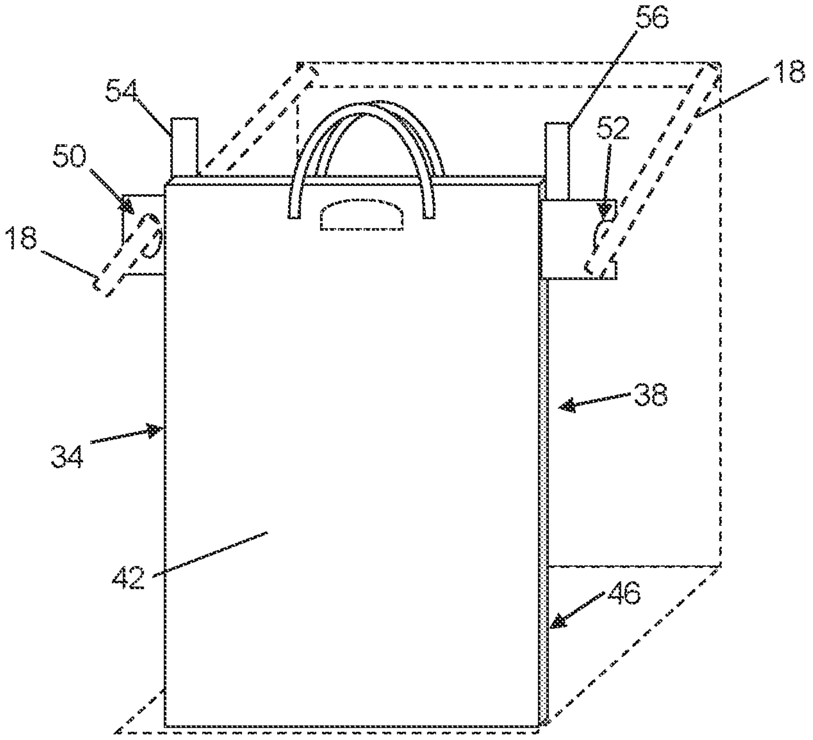
FIGS. 2A and 2B are schematic views of the paper bag of the present disclosure engaged with the bag holder in a first and second position, respectively.
Figure 2B:
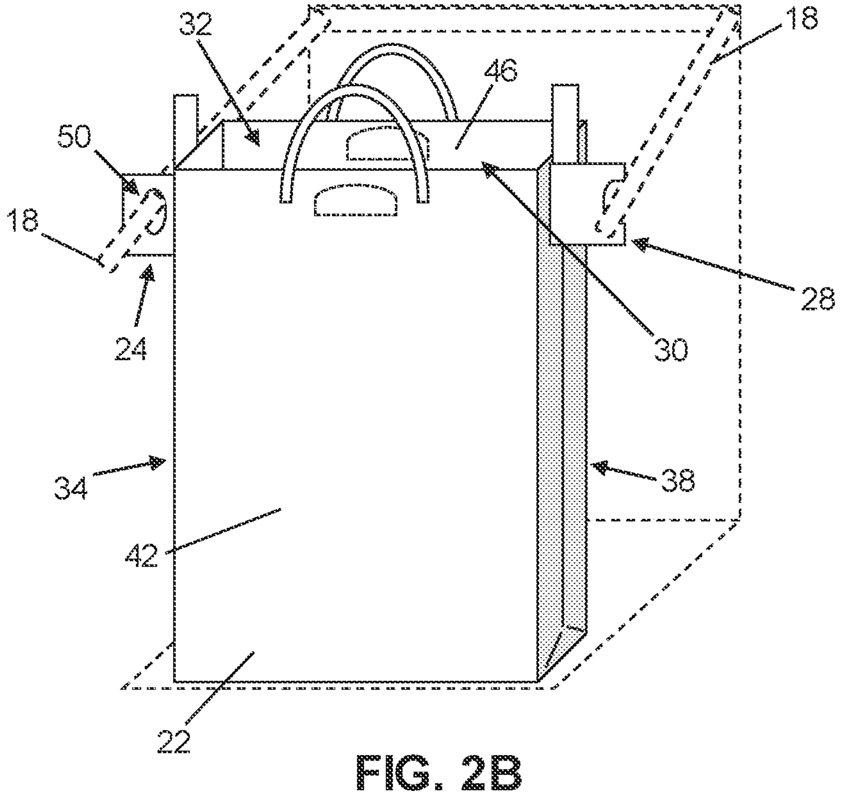

Referring now to FIGS. 2A-2B, an example of bag 10 is shown engaged with bag holder 14. FIG. 2A shows body 22 in a first, closed position and FIG. 2B shows the body in a second, open position in which opening 30 is larger than when the body is in the first position. As shown, second section 46 is moveable relative to first section 42 to define cavity 32 that is in communication with opening 30. In this way, a user may manipulate body 22 to move first and second sections 42, 46 away from each other to expand cavity 32 and move the first and second sections toward each other to decrease the size of the cavity. First and second attachment portions 24, 28 can engage bag holder 14 while body 22 moves between the open and closed positions. Further, first and second attachment portions 24, 28 can also slide along arm 18 of bag holder 14 to position bag 10 laterally along the bag holder.

FIGS. 3A-16C display some possible configurations of paper bags, but the present bags are not limited to the configurations shown in the figures. In these configurations, components that are similar, such as in structure or function, to components discussed with reference to FIGS. 1, 2A, and 2B are labeled with the same reference numerals and a new numeral suffix, for example "a." The described bags may be suitable for use alone or with existing bag holders to provide a more convenient, environmentally friendly bag.

FIGS. 3A-3I show a second configuration 10*a* of the present bags. Bag 10*a* includes a body 22*a*, a first attachment portion 24*a* configured to engage with an arm 18 of bag holder 14, and a second attachment portion 28*a* configured to engage with another arm 18 of the bag holder. Body 22*a* includes a first side 34*a*, a second side 38*a* opposing the first side, and a first section 42*a* and a second section 46*a* disposed between the first side and the second side. As shown, first attachment portion 24*a* and second attachment portion 28*a* are unitary with body 22*a*. For example, first and second attachment portions 24*a*, 28*a* are continuous with first and second sections 42*a*, 46*a*.

Figure 3A:
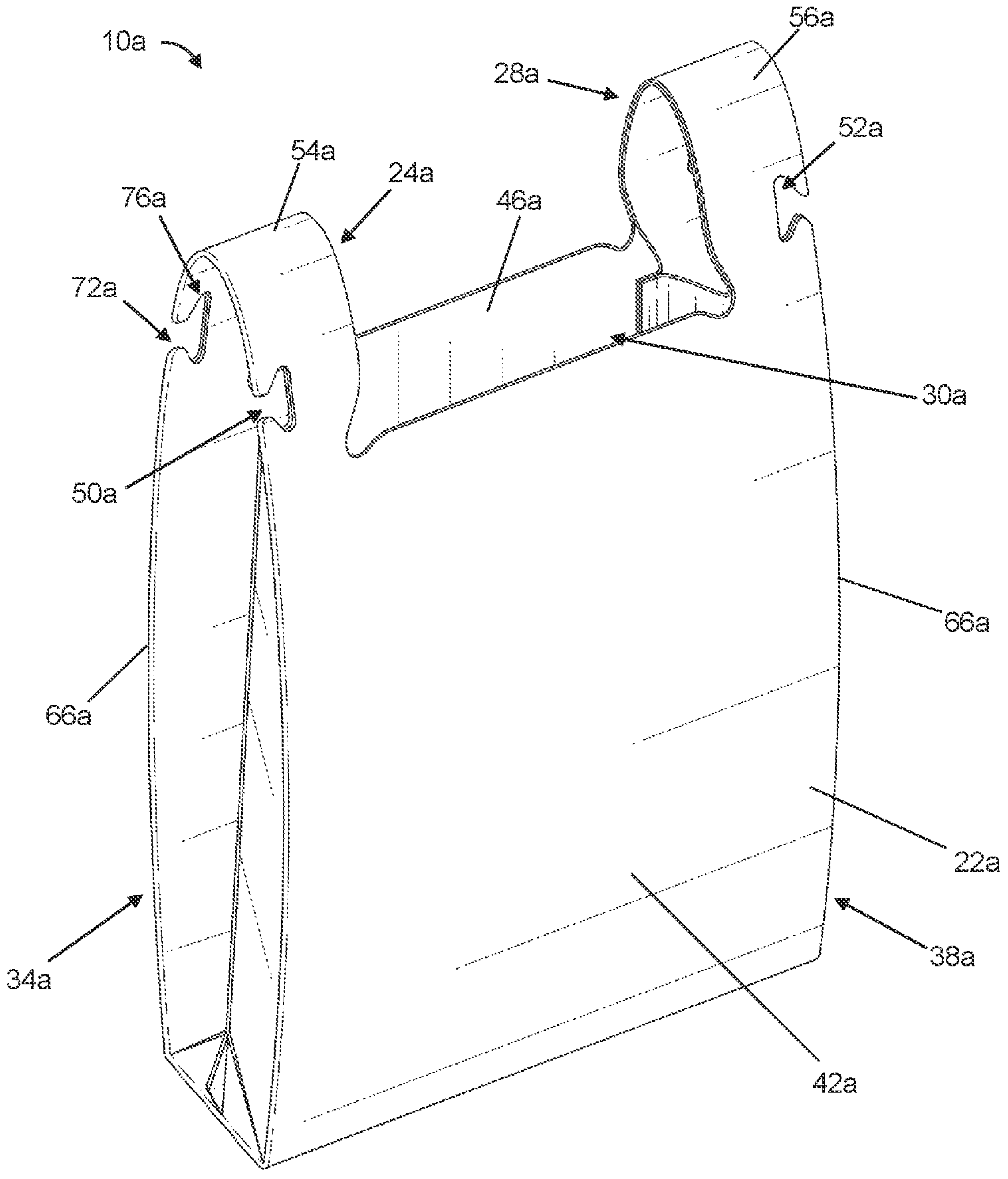
FIG. 3A is a perspective view of an example of a second configuration of the present paper bags.
Figure 3C:
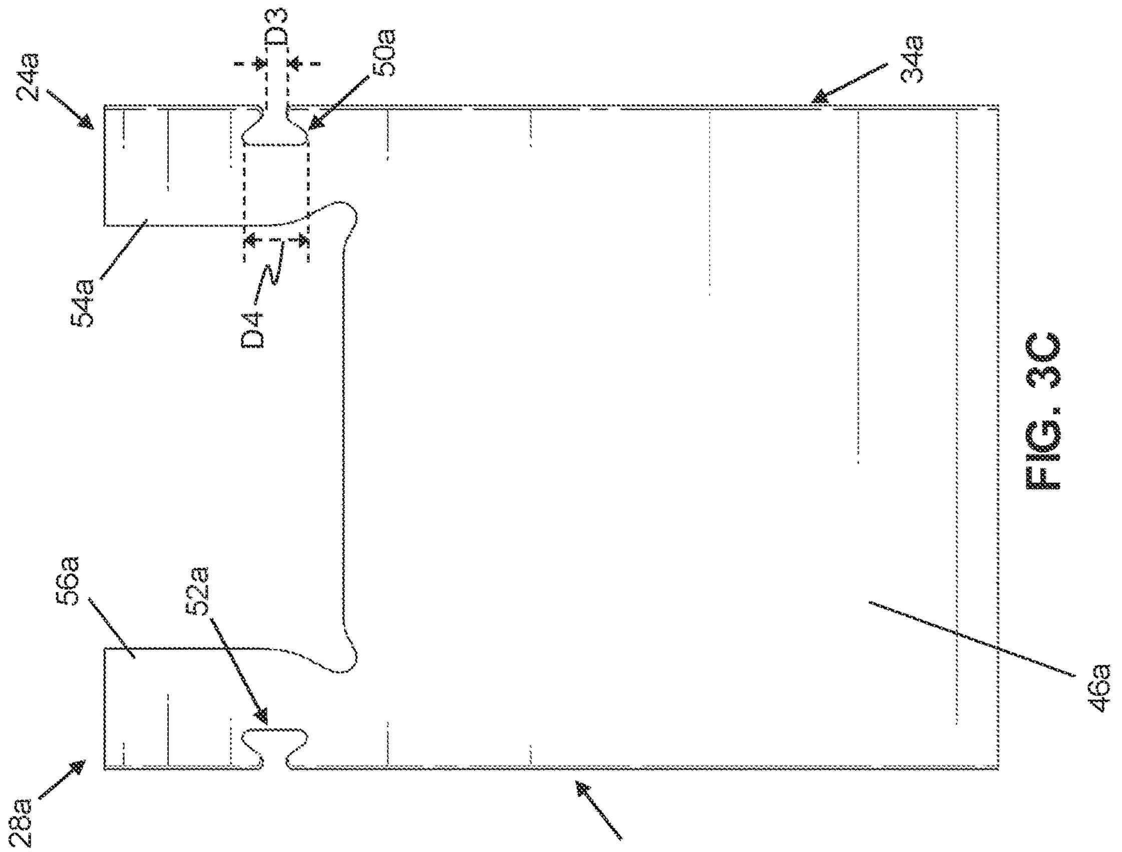
FIGS. 3B and 3C are front and back views, respectively, of the paper bag of FIG. 3A.
Figure 3B:
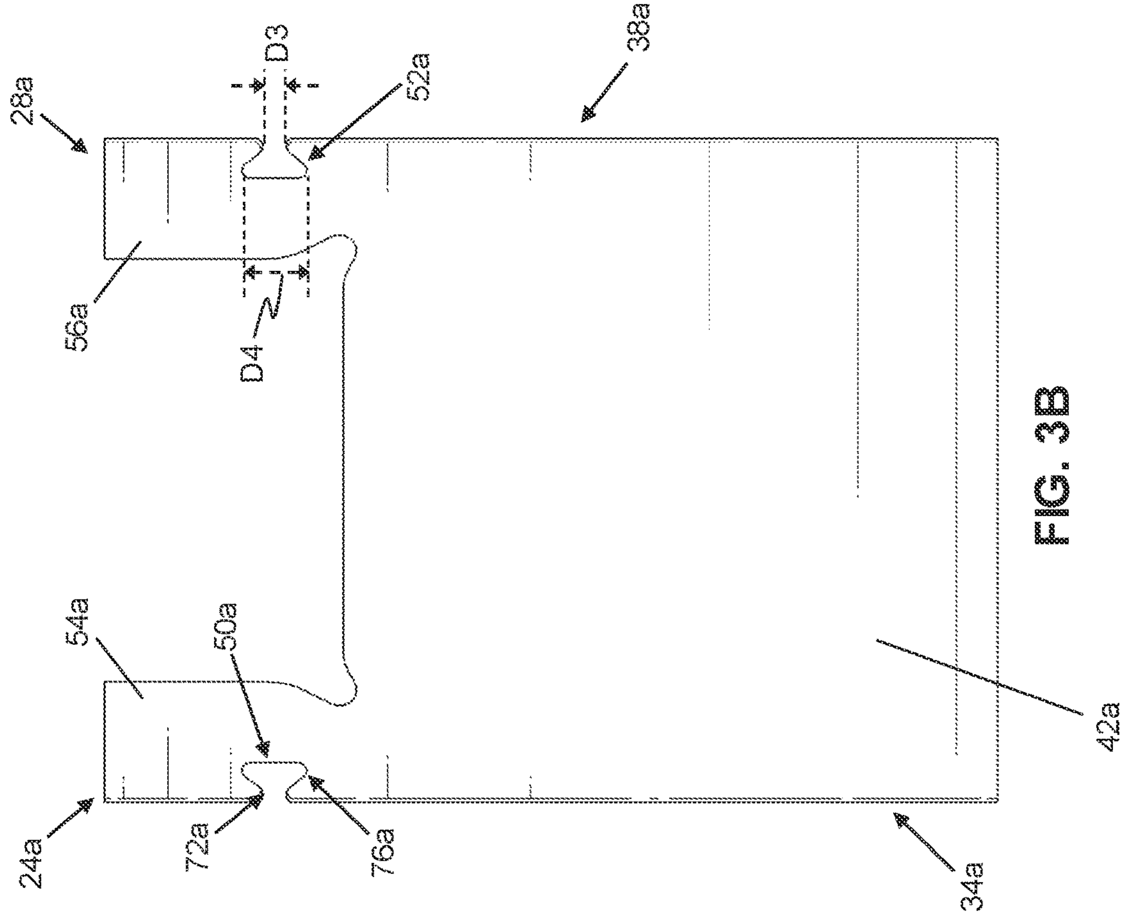
Figures 3D, 3E, 3F, 3G:
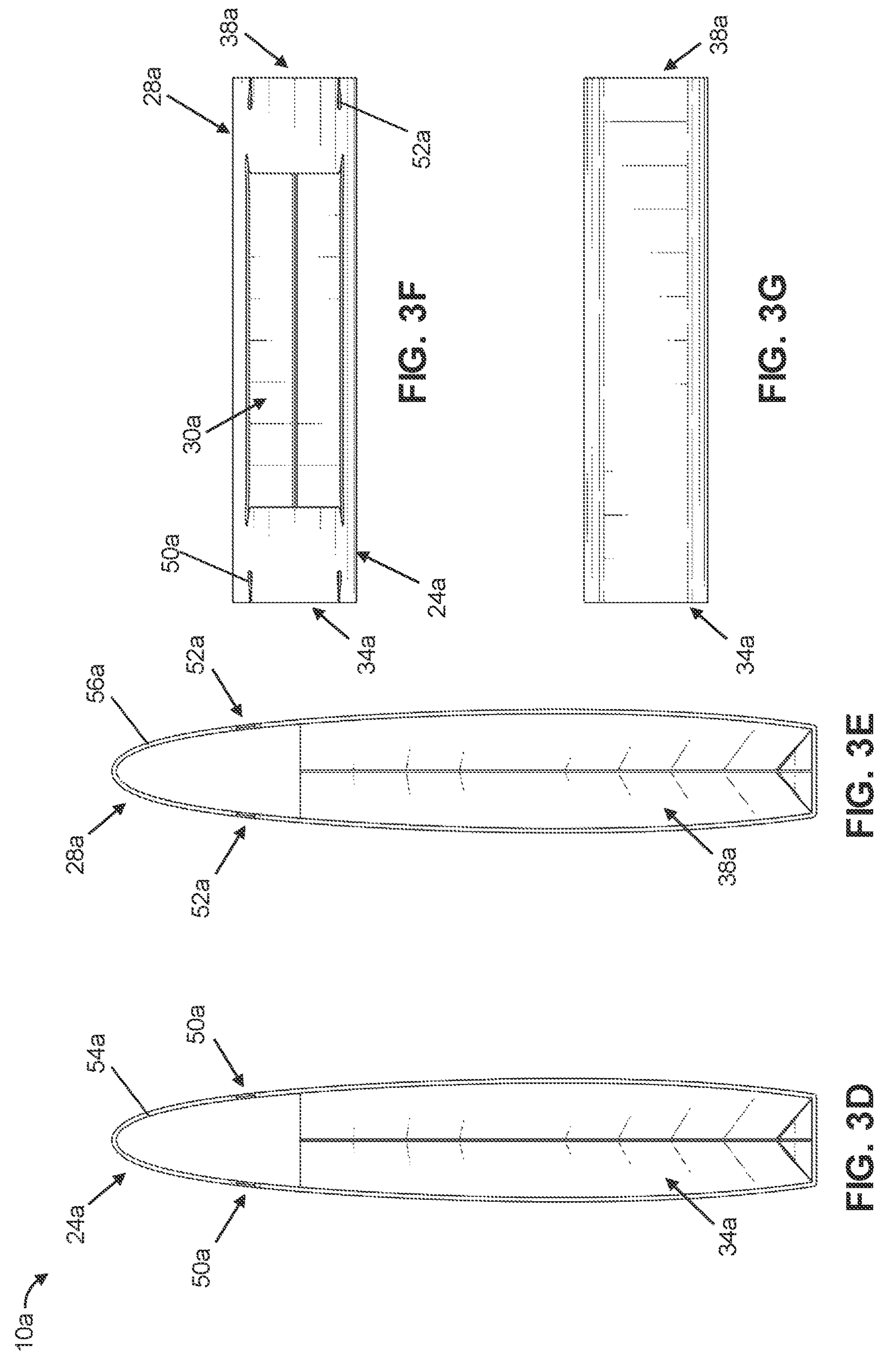
FIGS. 3D and 3E are left and right side views, respectively, of the paper bag of FIG. 3A.
FIGS. 3F and 3G are top and bottom views, respectively, of the paper bag of FIG. 3A.
Figure 3I:
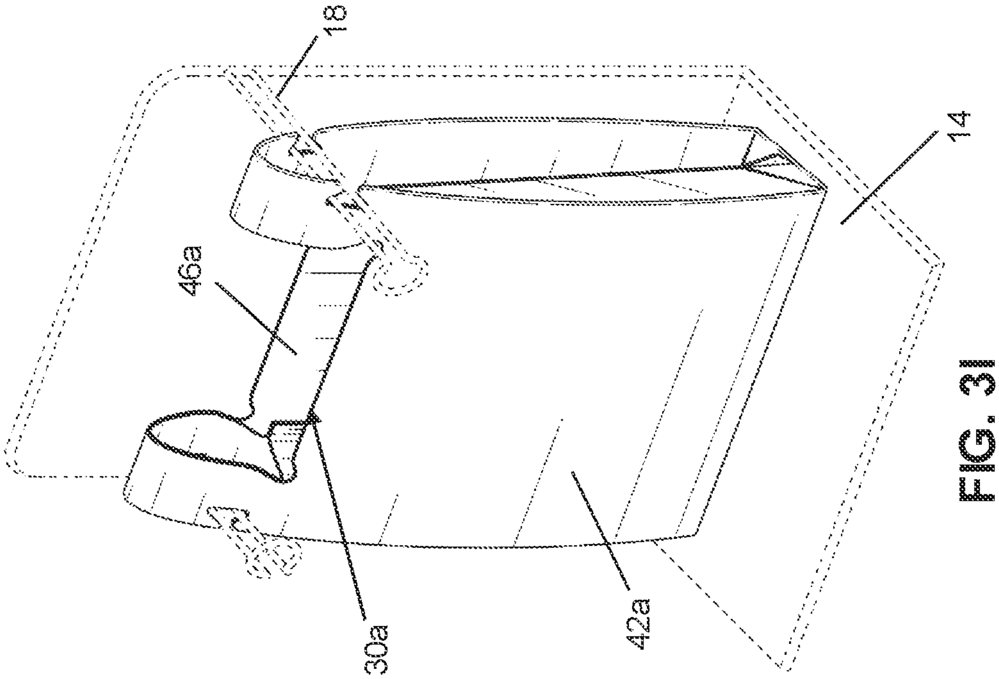
FIG. 3I is a perspective view of the paper bag of FIG. 3A in a second position while engaged with a bag holder system.
Figure 3H:
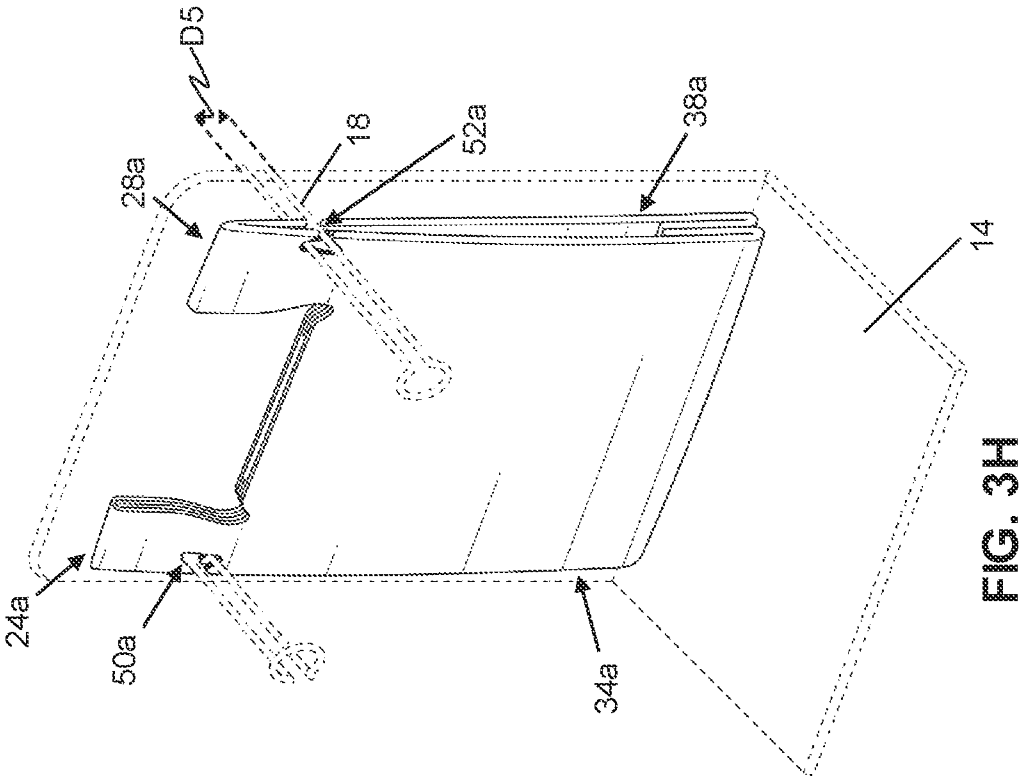
FIG. 3H is a perspective view of the paper bag of FIG. 3A in a first position while engaged with a bag holder system.

First attachment portion 24*a* includes a plurality of notches 50*a* and a handle portion 54*a*. In the depicted configuration, each notch 50*a* extends inward from a perimeter 66*a* of bag 10*a*. Both notches 50*a* are aligned with one another in a horizontal plane to simultaneously engage portions of arm 18. As best shown in FIG. 3B, each notch 50*a* includes a first region 72*a* having a first transverse dimension D3 and a second region 76*a* having a second transverse dimension D4 that is greater than the first transverse dimension. In some configurations, such as that shown in FIGS. 3H and 3I, first transverse dimension D3 is less than a height D5 of arm 18 of bag holder 14. Additionally, or alternatively, second transverse dimension D4 of notch 50*a* can be greater than height D5 of arm 18. In some configurations, edges of notches 50*a* are rounded, while in other configurations the notches can be shaped differently, such as for example, rectangular or acutely angled. As describe herein, first attachment portion 24*a* can be configured to slide along arm 18 while supporting bag 10*a*.

Handle portion 54*a* cooperates with body 20*a*, for example, first side 34*a* to define a loop for a user to grasp while carrying bag 10*a*. As shown, handle portion 54*a* can extend above opening 30 of bag 10*a*. Although, notches 50*a* are shown as being defined by handle portion 54*a*, in other configurations, the notches can be positioned in other positions. For conciseness, only the features of first attachment portion 24 are described above, however, it should be understood that the description of notches 50*a* and handle portion 54*a* apply similarly to notches 52*a* and handle portion 56*a*, respectively, of second attachment portion 28. For example, each of notch 52*a* can include first region 72*a* and second region 76*a*.

Figure 4A:
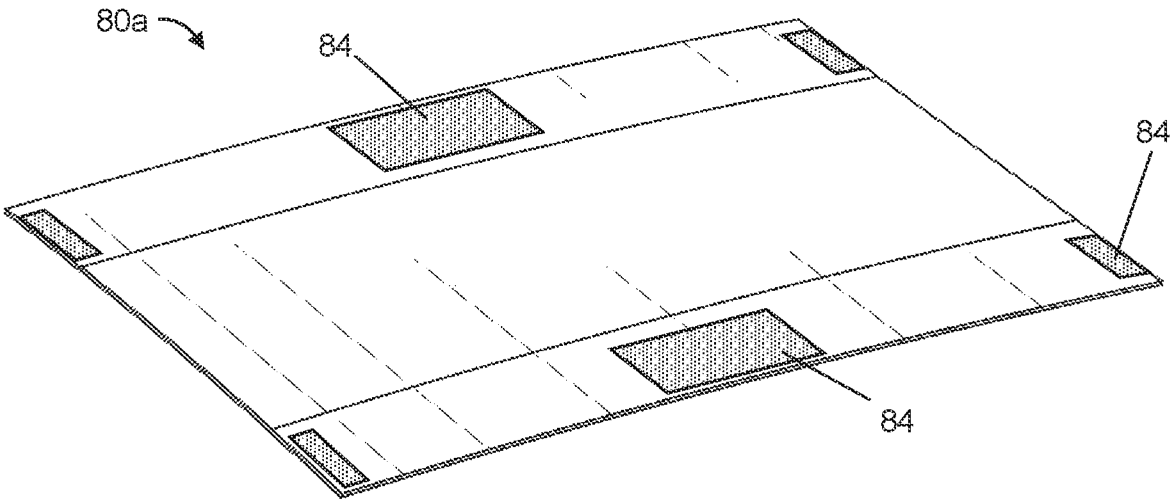
FIGS. 4A-4D show a process of forming the paper bag of FIG. 3A.

Referring now to FIGS. 4A-4D, shown is a process for making bag 10*a* from a sheet 80*a* of paper material. As shown in FIG. 4A, sheet 80*a* can be a pre-fabricated sheet, for example a rectangular sheet, that is sized and shaped based on the target dimensions of bag 10*a*. Some of the present methods may include cutting, or otherwise making sheet 80*a* from a larger roll of paper material. In some configurations, Sheet 80*a* can have an adhesive material 84 applied to one or more sides of the sheet. In the configuration depicted in FIG. 4A, adhesive 84 is positioned at six locations of sheet 80*a*. Each location can include the same, or a different, adhesive depending on the stresses experienced at each location. In some configurations, the process can include applying adhesive 84 to different portions of sheet 80. However, in other configurations, sheet 80 may come pre-fabricated with adhesive 84 already applied to the sheet. In such configurations, one or more other steps may be necessary, such as removing a covering from adhesive 84, or the like.

Figure 4B:
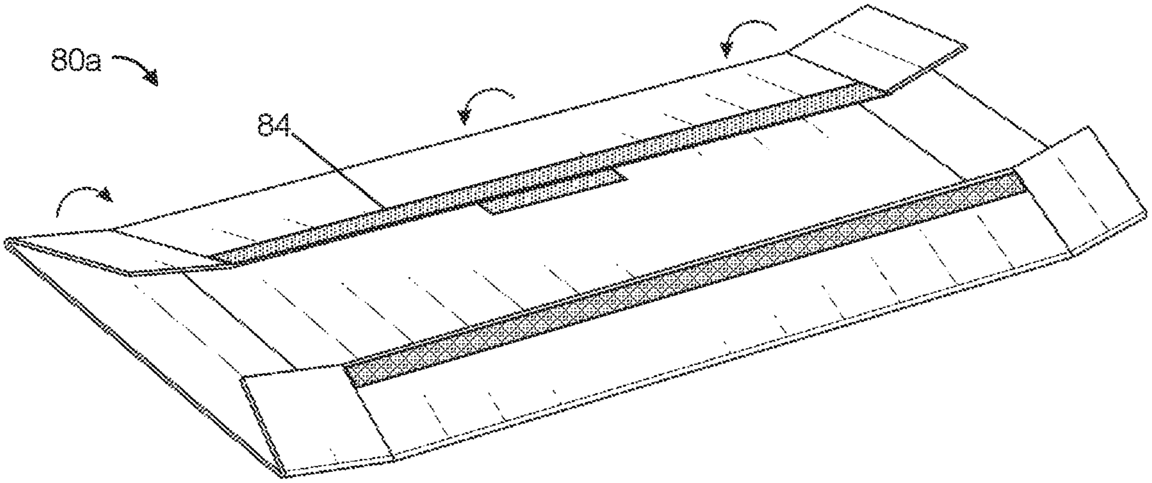
Figure 4C:
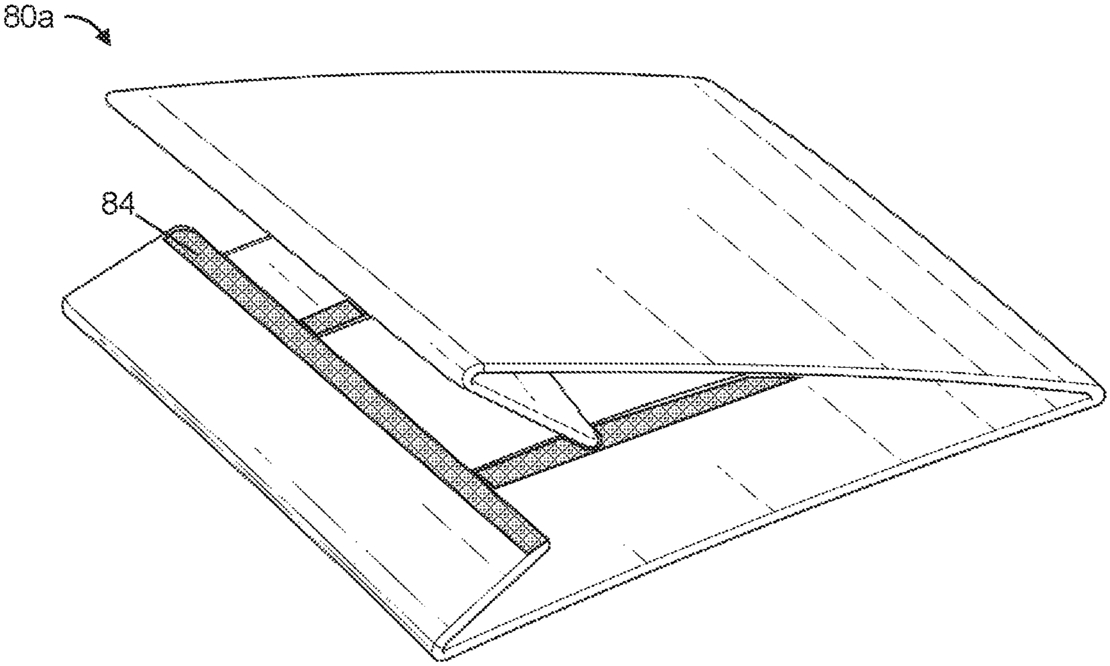

As shown in FIGS. 4B and 4C, the method of forming bag 10*a* can include folding sheet 80*a*. For example, as shown in FIG. 4B, sheet 80*a* can be folded inward on both lateral sides and on both ends. In some such configurations, partial folding of the sides can be used to increase the layers of a section of bag 10*a*, such as handle portions 54*a*, 56*a* to increase the strength of the bags. As depicted in FIG. 4C, such folding may reveal additional portions of adhesive 84 located on an opposing side of sheet 80*a*. In other configurations, additional adhesive 84 may be applied after sheet 80*a* is folded. Some methods include folding sheet 80*a* multiple times. For example, as shown in FIG. 4C, sheet 80*a*—including the previously folded portions—is folded in half. This folding step may keep stretch direction uniform while increasing strength. In other configurations, sheet 80*a* can be folded any number of times to form bag 10*a*.

Figure 4D:
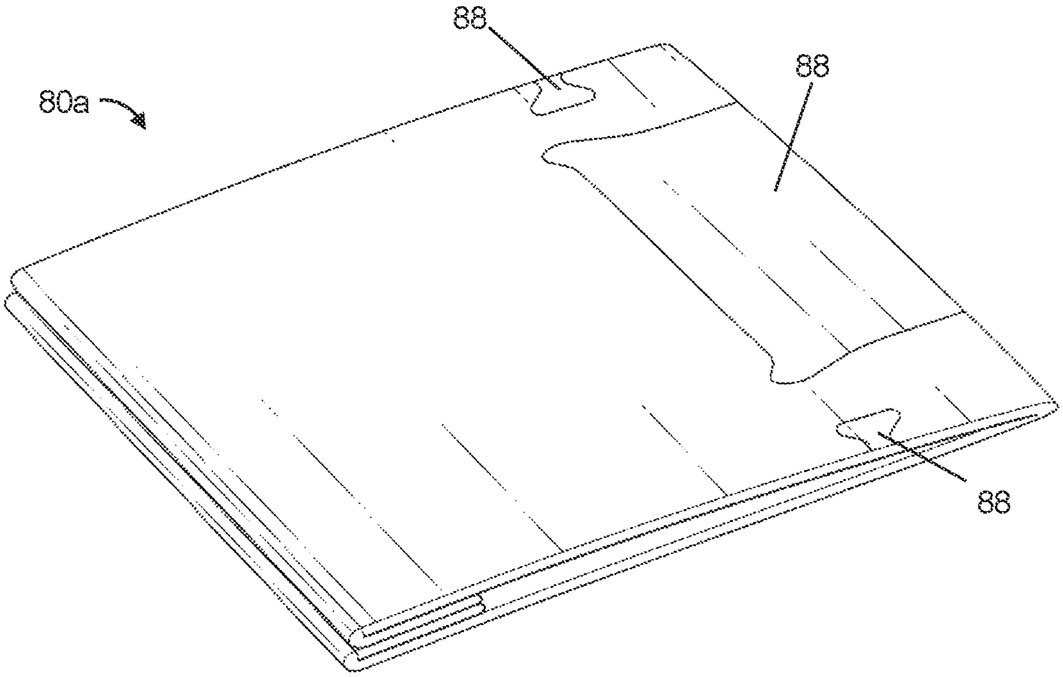

Referring now to FIG. 4D, sheet 80*a* can be cut to form one or more features of bag 10*a*. For example, FIG. 4D shows multiple cutting portions 88 that are to be cut from sheet 80*a* to form bag 10*a*. To further illustrate, a first cutting portion 88 can be cut out of sheet 80*a* at a first location—first attachment portion 24*a* to form notch 50*a* and a second cutting portion 88 can be cut out of the sheet at a second location—second attachment portion 28*a*—to form notch 52*a*. Because sheet 80*a* is folded during the cutting step, a single cut can go through multiple layers to form multiple notches that are aligned with each other. As depicted in FIG. 4D, some methods include a step of cutting an opening of bag 30*a*. In such configurations, removal of a cutting portion 88 can reveal opening 30*a* and cavity 32 of bag 10*a*. The cutting steps may enable bag 10*a* to be specifically tailored to an existing bag holder.

FIGS. 5A-5I show a third configuration 10*b* of the present bags. Bag 10*b* includes a body 22*b*, a first attachment portion 24*b* configured to engage with arm 18 of bag holder 14, and a second attachment portion 28*b* configured to engage with another arm 18 of the bag holder. Body 22*b* includes a first side 34*b*, a second side 38*b* opposing the first side, and a first section 42*b* and a second section 46*b* disposed between the first side and the second side. One of first section 42*b* or second section 46*b* may include a notch 92 at a top end—defining opening 30*b*. Notch 92 can allow a user to easily identify each bag 10*b* while a plurality of the bags are stacked together or arranged on bag holder 14. Additionally, or alternatively, first and second sections 42*b*, 46*b* can define one or more apertures for carrying bag 10*b*.

First attachment portion 24*b* may be positioned closer to first side 34*b* of body 22*b* than to second side 38*b*. Similarly, second attachment portion 28*b* may be positioned closer to second side 38*b* of body 22*b* than to first side 34*b*. As shown, first attachment portion 24*b* and second attachment portion 28*b* are unitary with body 22*b*. For example, first and second attachment portions 24*b*, 28*b* are continuous with first and second sections 42*b*, 46*b*.

Figure 5A:
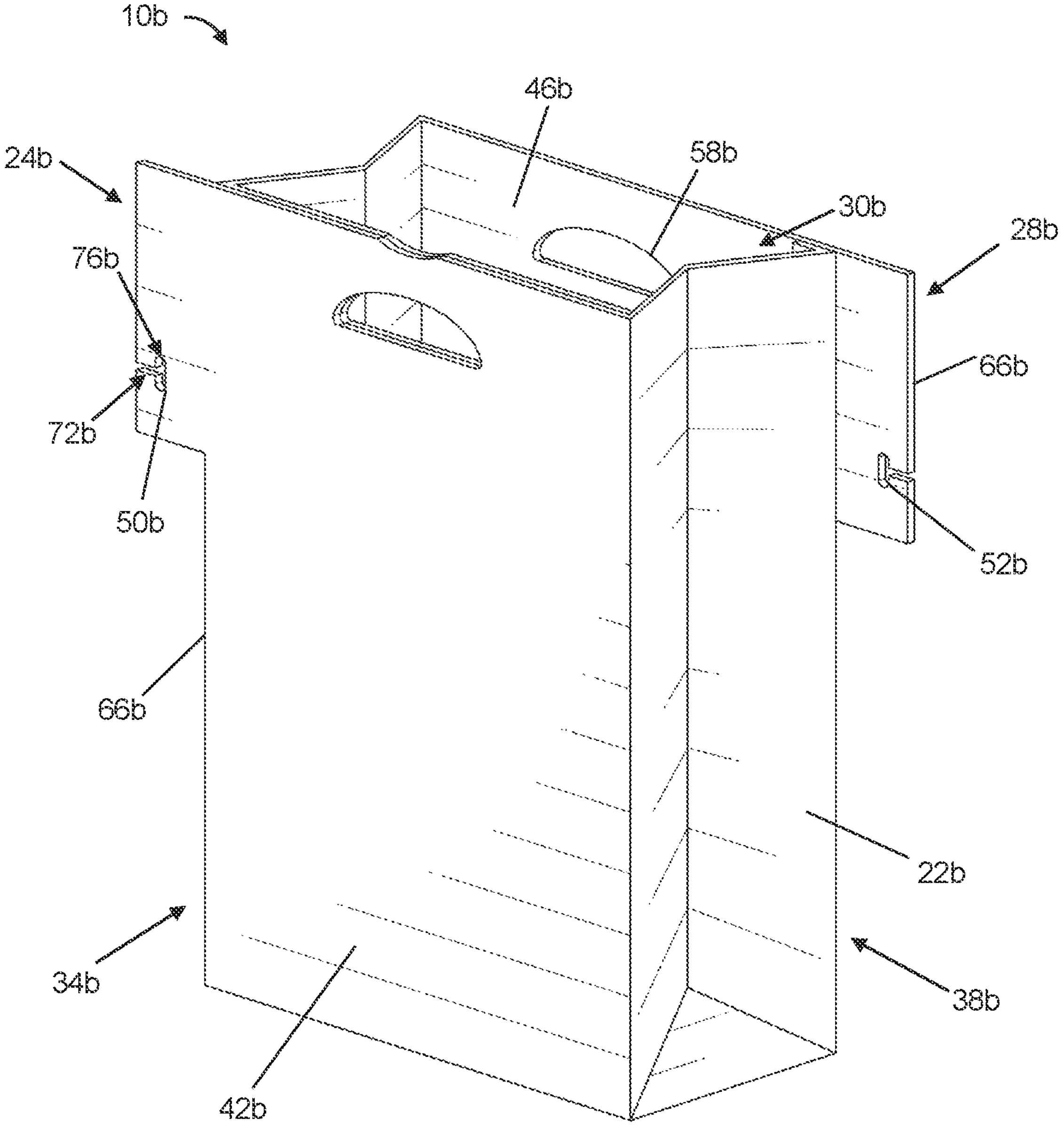
FIG. 5A is a perspective view of an example of a third configuration of the present paper bags.
Figure 5C:
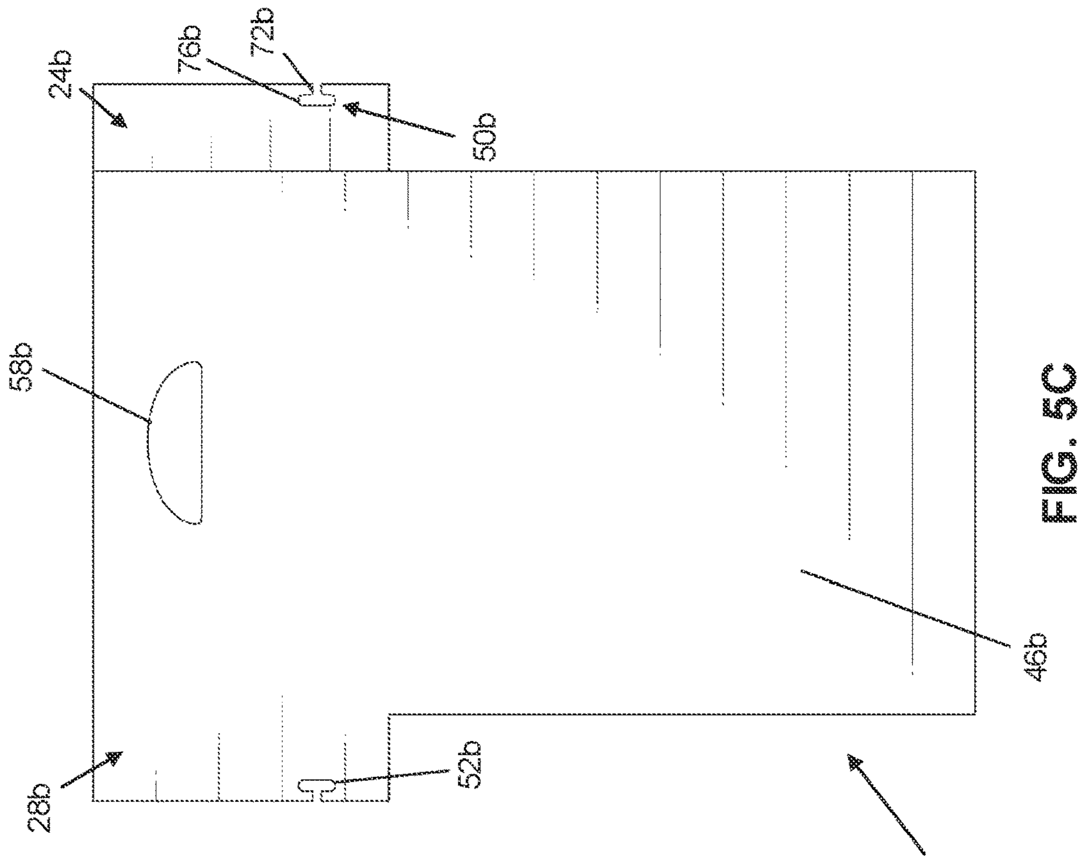
FIGS. 5B and 5C are front and back views, respectively, of the paper bag of FIG. 5A.
Figure 5B:
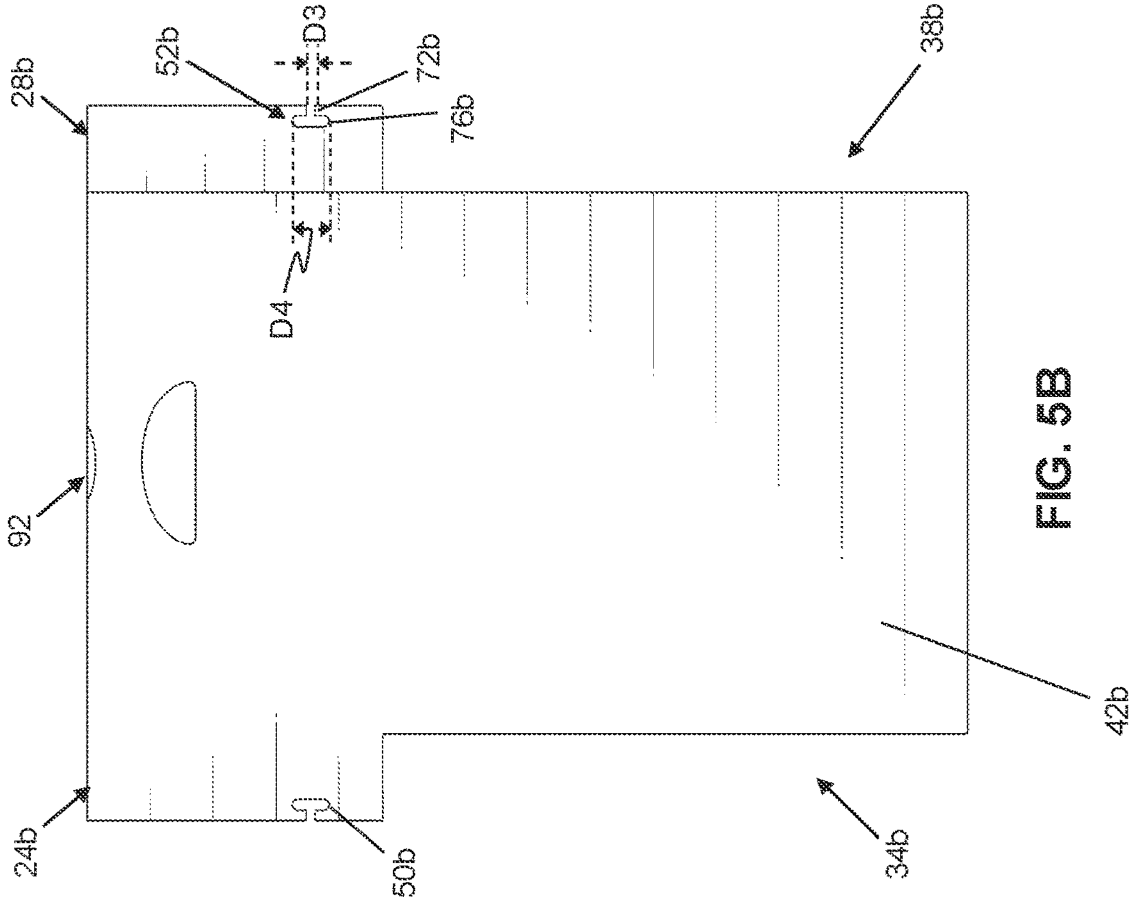
Figure 5F:
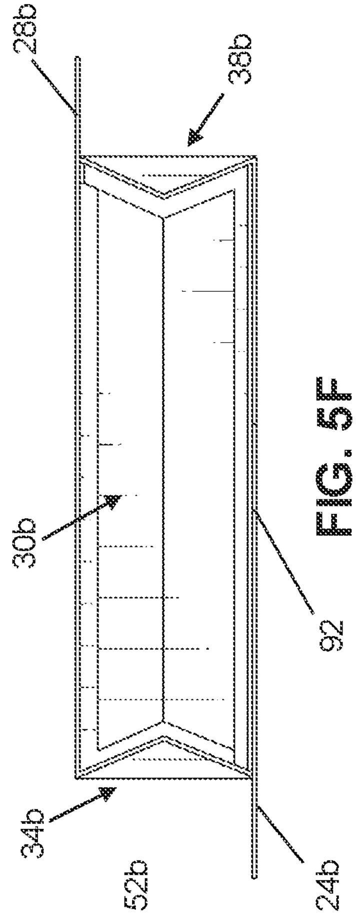
FIGS. 5F and 5G are top and bottom views, respectively, of the paper bag of FIG. 5A.
Figure 5G:
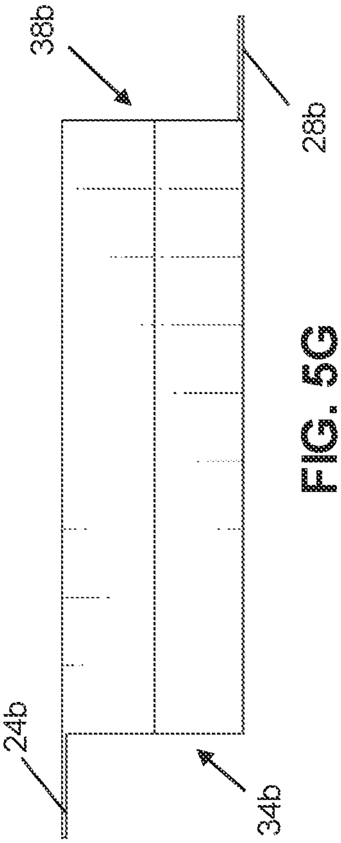
Figure 5E:
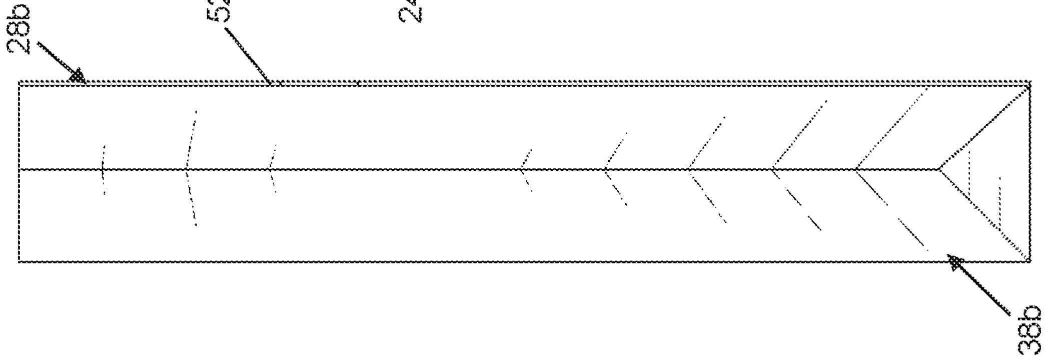
FIGS. 5D and 5E are left and right side views, respectively, of the paper bag of FIG. 5A.
Figure 5D:
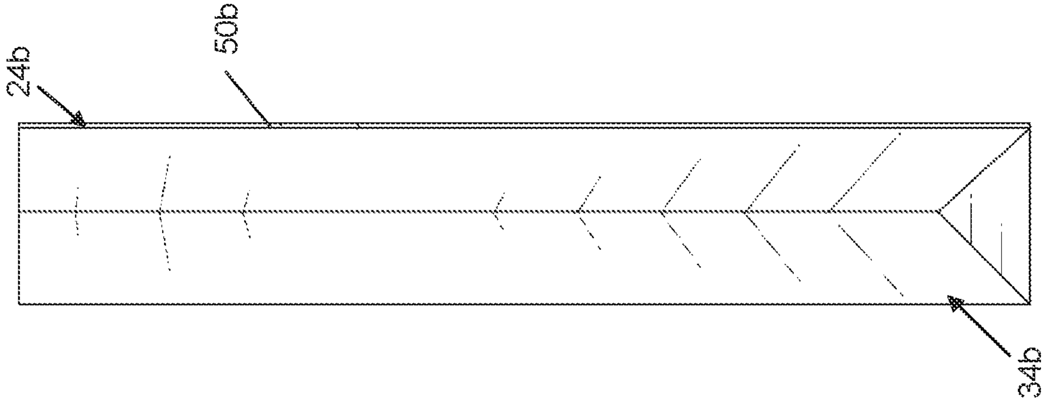
Figure 5I:
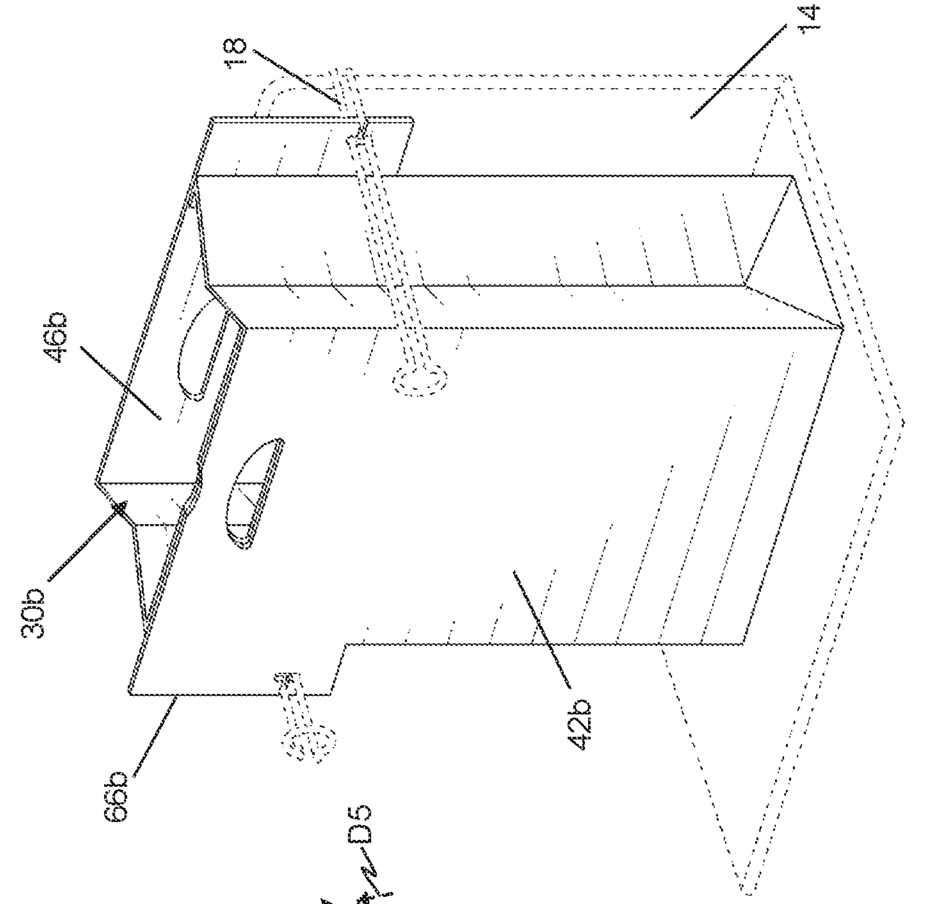
FIG. 5I is a perspective view of the paper bag of FIG. 5A in a second position while engaged with a bag holder system.
Figure 5H:
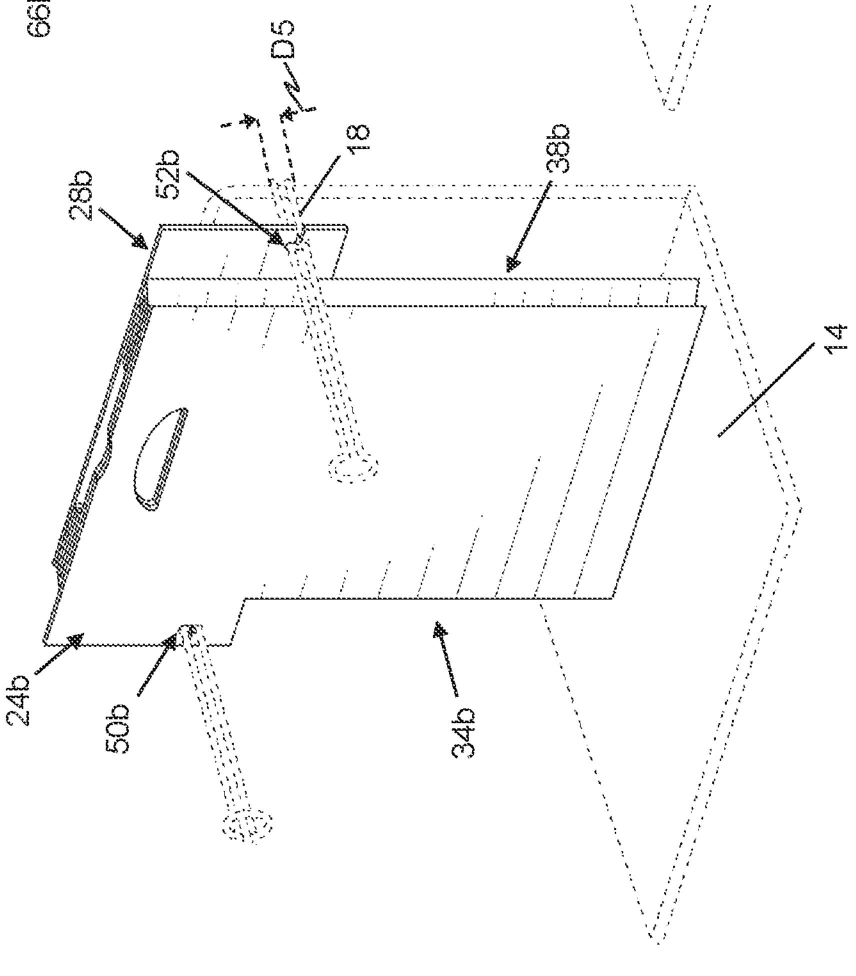
FIG. 5H is a perspective view of the paper bag of FIG. 5A in a first position while engaged with a bag holder system.

First attachment portion 24*b* includes a notch 50*b* and second attachment portion 28*b* includes a notch 52*b* that extends inward from a perimeter 66*b* of bag 10*b*. As depicted, notches 50*b*, 52*b* extend orthogonally from perimeter 66*b*. As best shown in FIG. 5B, notches 50*b*, 52*b* include a first region 72*b* having a first transverse dimension D3 and a second region 76*b* having a second transverse dimension D4 that is greater than the first transverse dimension. In some configurations, such as that shown in FIGS. 5H and 5I, first transverse dimension D3 is less than a height D5 of arm 18 of bag holder 14. Additionally, or alternatively, second transverse dimension D4 of notch 50*b* can be greater than height D5 of arm 18. In some configurations, edges of notches 50*b* are rounded, while in other configurations the notches can be shaped differently, such as for example, rectangular or acutely angled. As describe herein, first attachment portion 24*b* and second attachment portion 28*b* can be configured to slide along arm 18 while supporting bag 10*b*.

Figure 6A:
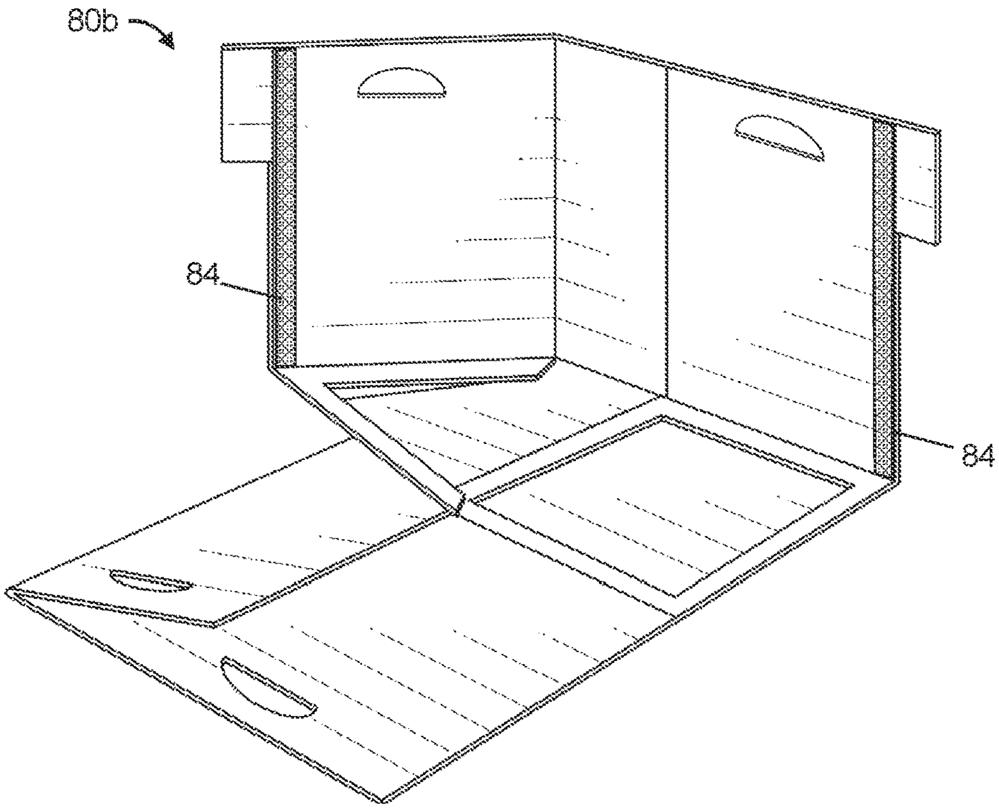
FIGS. 6A-6D show a process of forming the paper bag of FIG. 5A.

Referring now to FIGS. 6A-4D, shown is a process for making bag 10*b* from a sheet 80*b* of paper material. As shown in FIG. 6A, sheet 80*b* can be a pre-fabricated sheet that is sized and shaped based on the target dimensions of bag 10*b* or can be cut from a larger area of paper material to form sheet 80*b*. In some configurations, Sheet 80*b* includes adhesive material 84 applied to one or more sides of the sheet. In some configurations, the process can include applying adhesive 84 to different portions of sheet 80*b*. However, in other configurations, sheet 80*b* may come pre-fabricated with adhesive 84 already applied to the sheet. In such configurations, one or more other steps may be necessary, such as removing a covering from adhesive 84, or the like.

Figure 6B:
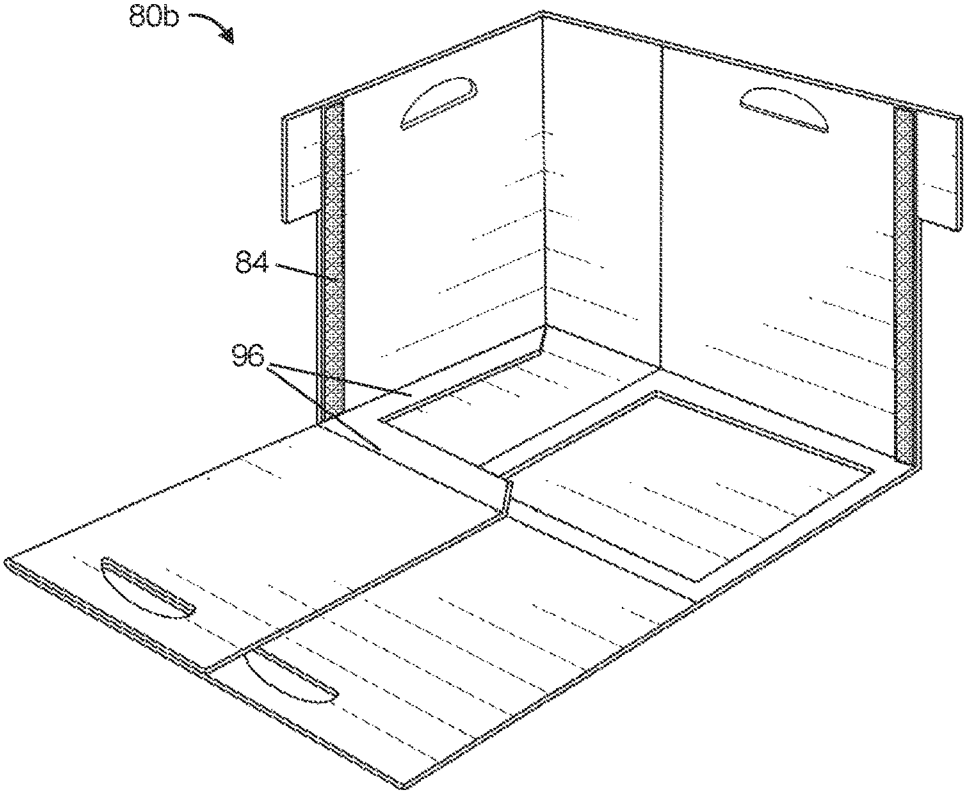
Figure 6C:
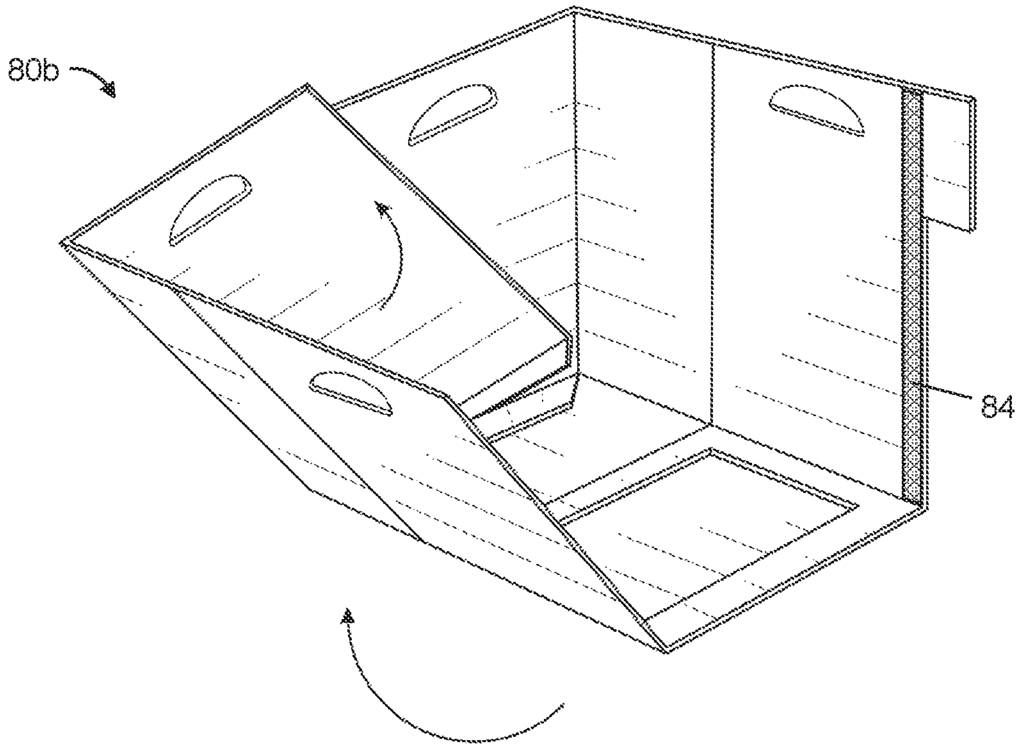
Figure 6D:
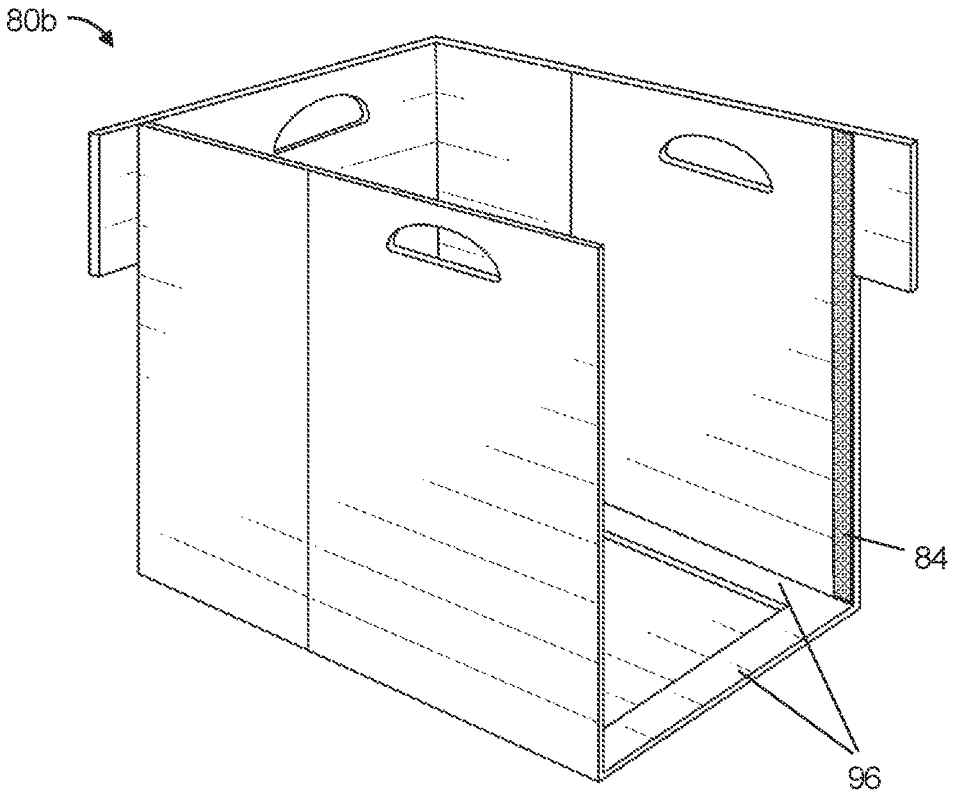
Figure 7A:
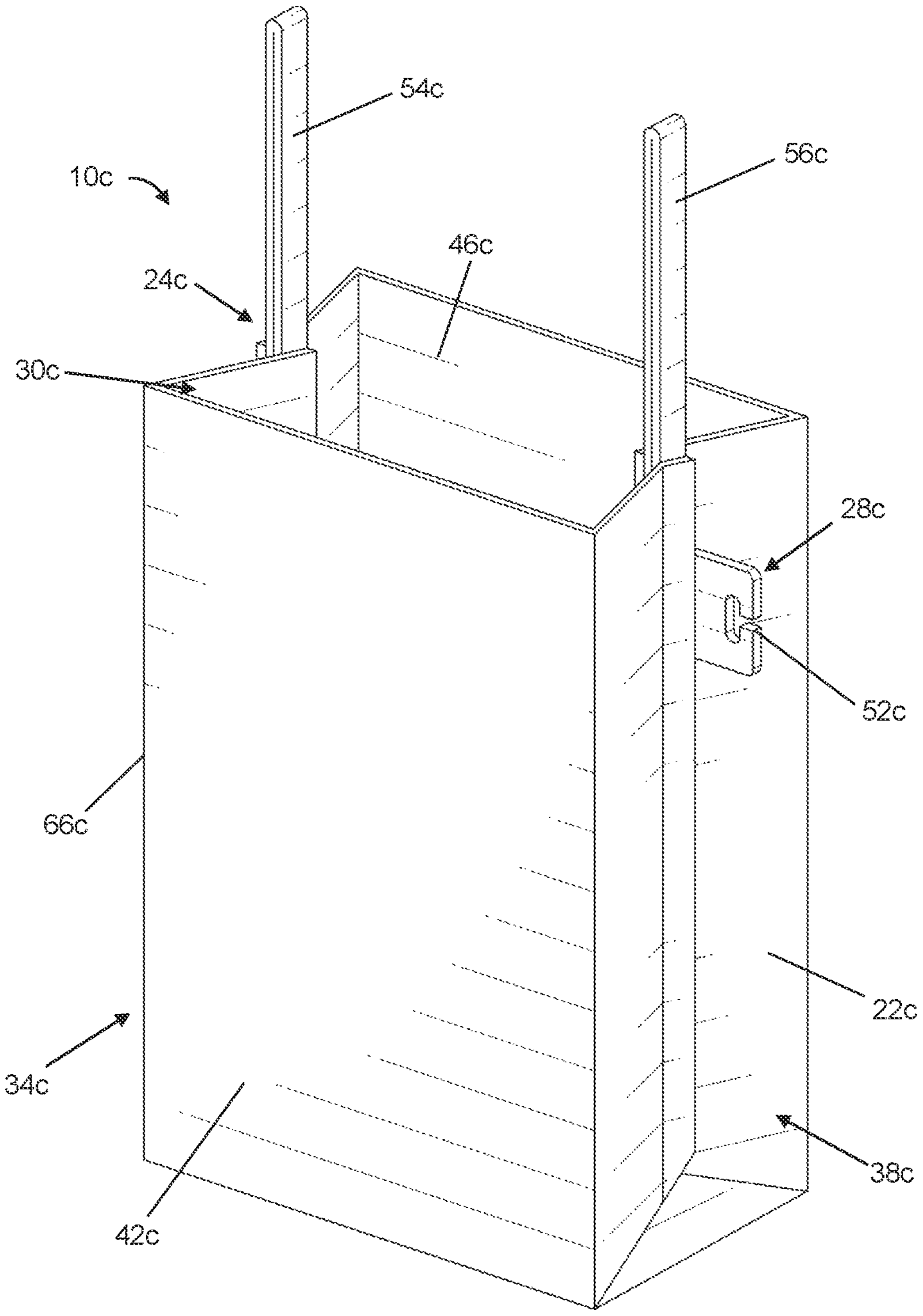
FIG. 7A is a perspective view of an example of a fourth configuration of the present paper bags.
Figure 7C:
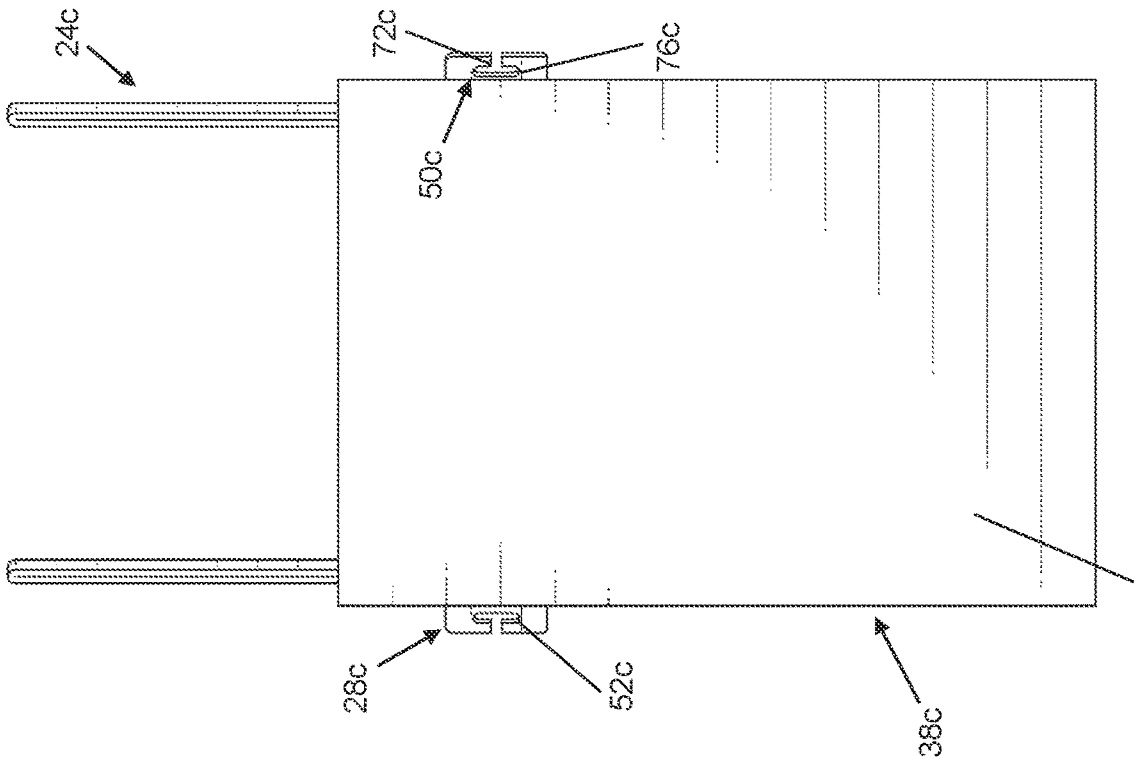
FIGS. 7B and 7C are front and back views, respectively, of the paper bag of FIG. 7A.
Figure 7B:
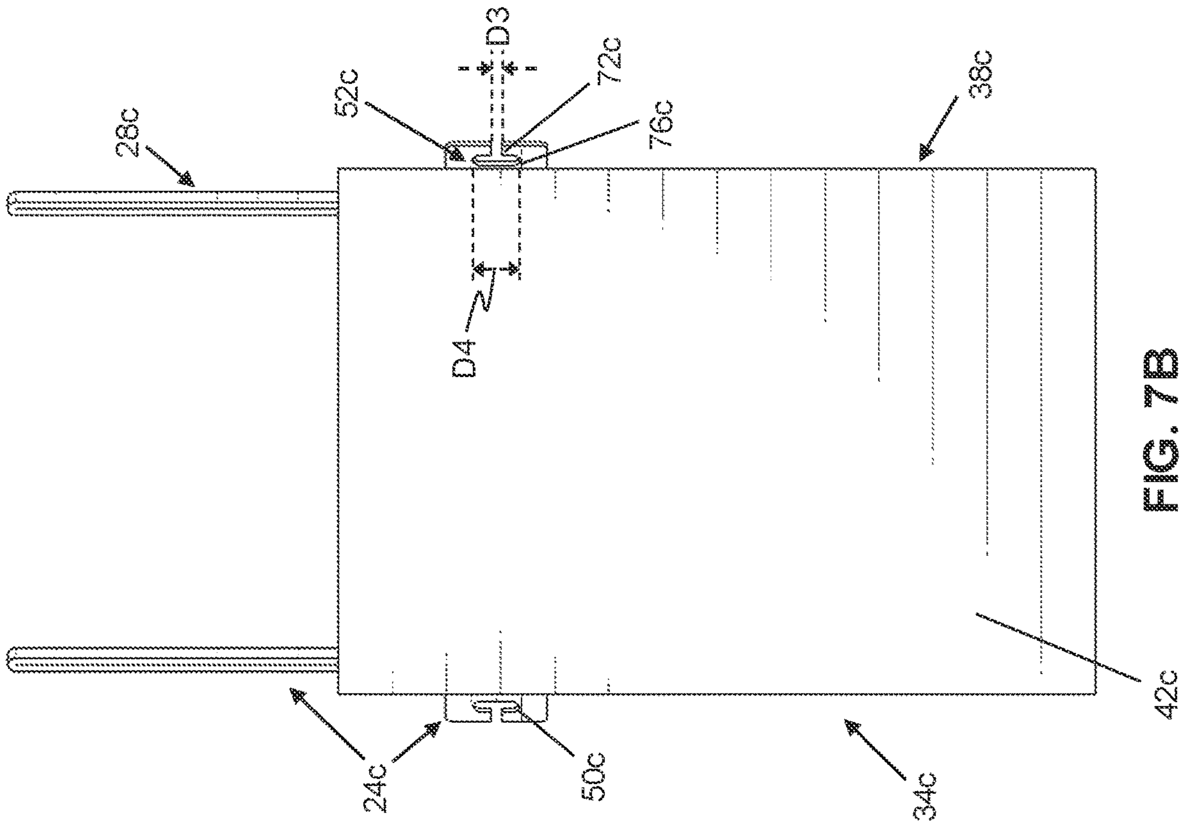
Figure 7F:
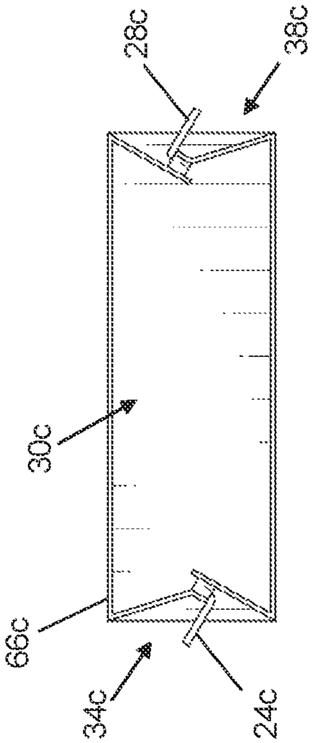
FIGS. 7F and 7G are top and bottom views, respectively, of the paper bag of FIG. 7A.
Figure 7G:
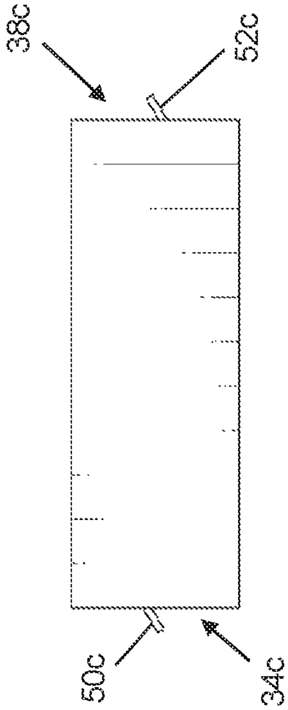
Figure 7E:
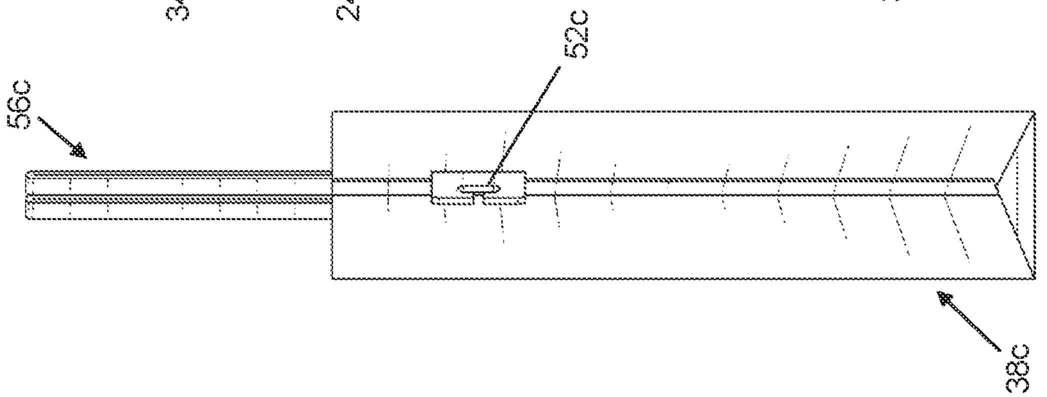
FIGS. 7D and 7E are left and right side views, respectively, of the paper bag of FIG. 7A.
Figure 7D:
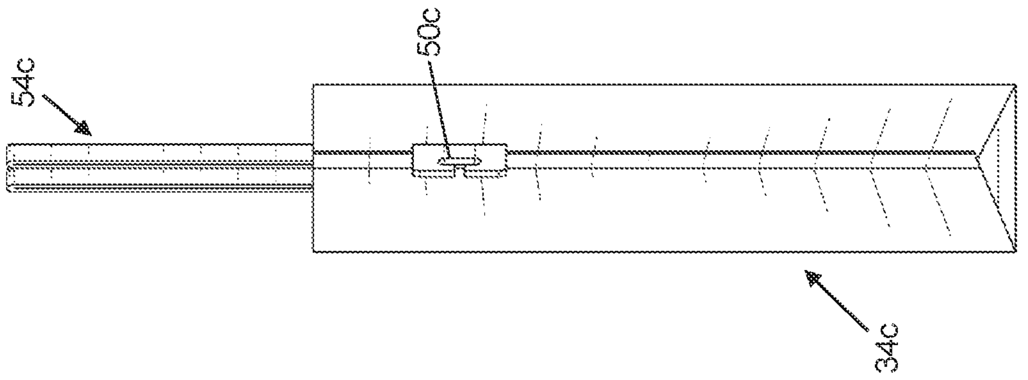
Figure 7I:
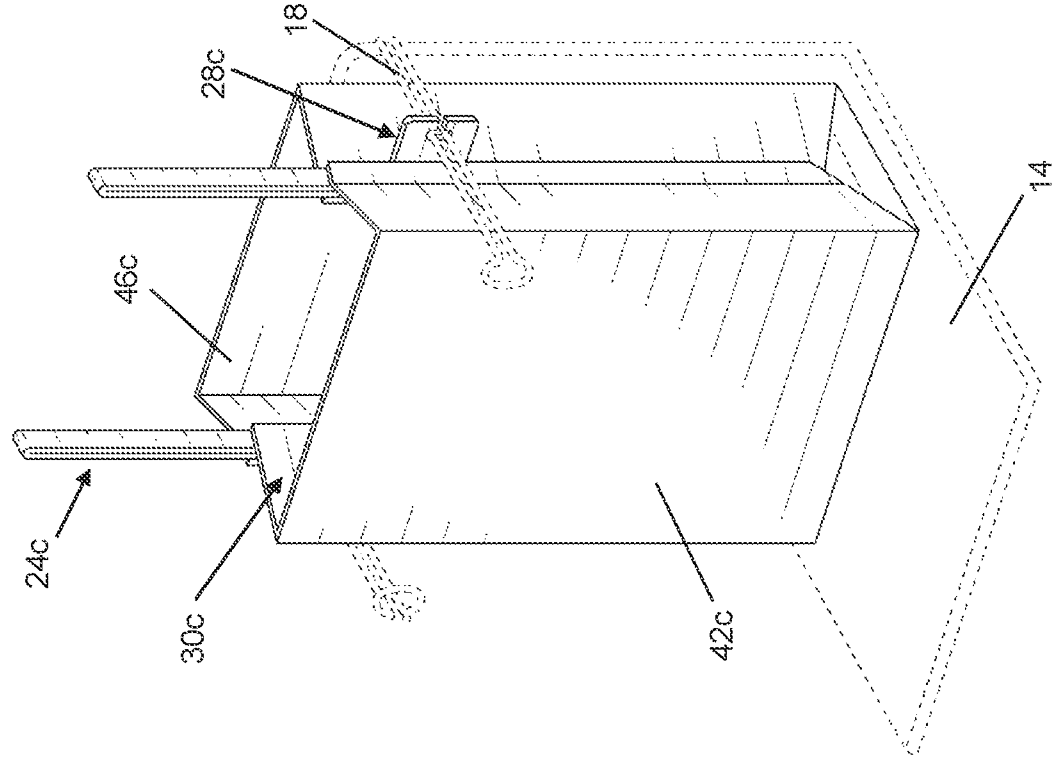
FIG. 7I is a perspective view of the paper bag of FIG. 7A in a second position while engaged with a bag holder system.
Figure 7H:
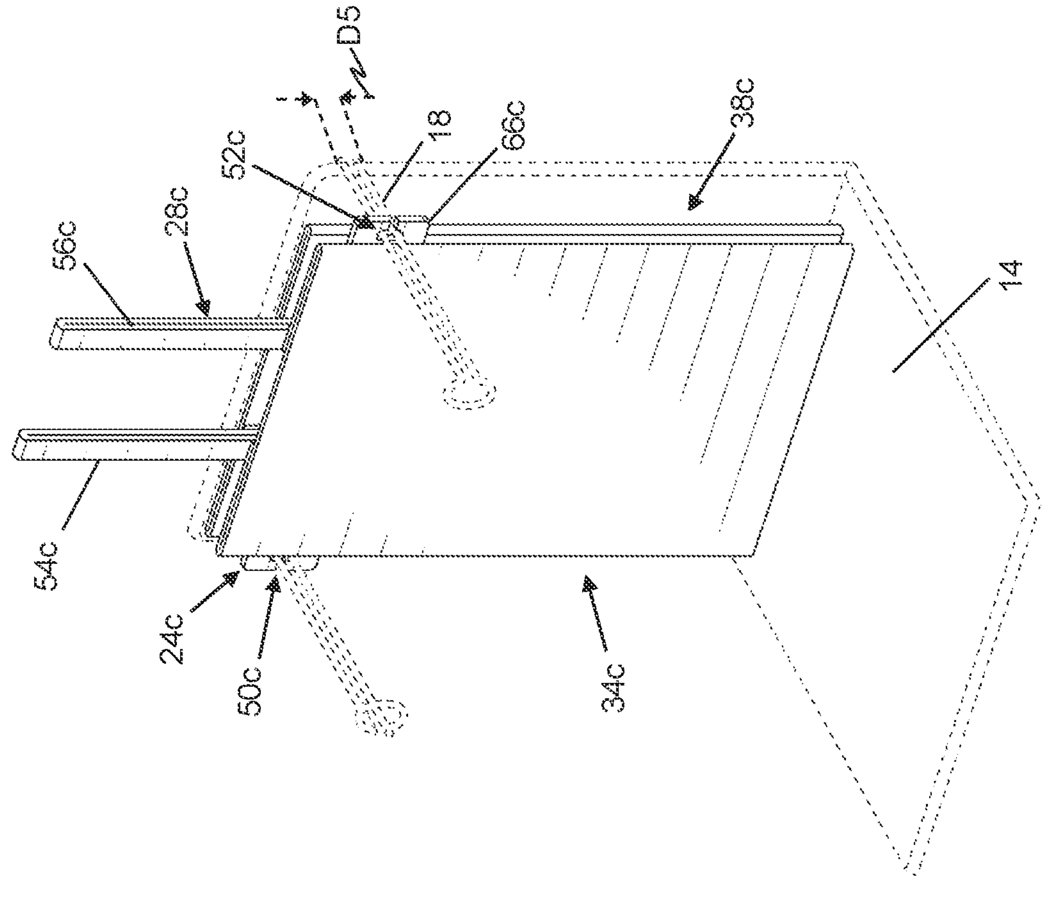
FIG. 7H is a perspective view of the paper bag of FIG. 7A in a first position while engaged with a bag holder system.

As shown, the method of forming bag 10*b* can include folding sheet 80*b*. For example, as shown in FIGS. 6A and 6B, a portion of sheet 80*b* corresponding to second section 46*b* and second attachment portion 28*b* can be rotated relative to the rest of the sheet. Sheet 80*b* can then be folded, as shown in FIGS. 6B-6D, to create additional supportive layers to strengthen second section 46*b*. As shown, each additional layer can have features matching that of second section 46*b*, such as an aperture 58*b*. Further, sheet 80*b* can include one or more hanging portions 96, such as overhangs or corners, which strengthen specific portions of bag 10*b*. As shown in FIGS. 6B and 6C, hanging portions may fold in while forming bag 10*b* to strengthen a bottom of the back at a front and back side of the bag. In this way and others, bag 10*b* can add additional strength at known stress locations to prevent the bag from breaking during use. Although not shown, a portion of sheet 80*b* corresponding to first section 42*b* and first attachment portion 24*b* may be folded in a manner similar to that shown in FIGS. 6B-6D to form bag 10*b*.

FIGS. 7A-7I show a fourth configuration 10*c* of the present bags. Bag 10*c* includes a body 22*c*, a first attachment portion 24*c* configured to engage with an arm 18 of bag holder 14, and a second attachment portion 28*c* configured to engage with another arm 18 of the bag holder. Body 22*c* includes a first side 34*c*, a second side 38*c* opposing the first side, and a first section 42*c* and a second section 46*c* disposed between the first side and the second side.

As shown, first attachment portion 24*c* and second attachment portion 28*c* are separate from body 22*c*. First attachment portion 24*c* may be positioned closer to first side 34*c* of body 22*c* than to second side 38*c*. Similarly, second attachment portion 28*c* may be positioned closer to second side 38*c* of body 22*c* than to first side 34*c*. For example, second attachment portion 28*c* may extend away from second side 38*c*, for example in a lateral direction, of bag 10*c*.

First attachment portion 24*c* includes a notch 50*c* and a handle portion 54*c* and second attachment portion 28*c* includes a notch 52*b* and a handle portion 56*c*. As depicted, notches 50*c*, 52*c* extends inward from a perimeter 66*c* of bag 10*c*, such as for example in an orthogonal direction from the perimeter. As best shown in FIG. 5B, notches 50*c*, 52*c* include a first region 72*c* having a first transverse dimension D3 and a second region 76*c* having a second transverse dimension D4 that is greater than the first transverse dimension. In some configurations, such as that shown in FIGS. 7H and 7I, first transverse dimension D3 is less than a height D5 of arm 18 of bag holder 14. Additionally, or alternatively, second transverse dimension D4 of notch 50*c* can be greater than height D5 of arm 18. As describe herein, first attachment portion 24*c* and second attachment portion 28*c* can be configured to slide along arm 18 while supporting bag 10*c*.

As shown, handle portion 54*c* extends vertically above opening 30*c* on first side 34*c* of body 22*c* and handle portion 56*c* extends vertically above the opening on second side 38*c* of the body. Handle portions 54*c*, 56*c* can include a strip of paper material that is folded back on itself to define a loop that can be used to carry bag 10*c*. In some configurations, first attachment portion 24*c* is disposed below opening 30*c* and at least part of handle portion 54*c*, such as a majority thereof, is disposed above opening. In this way and others, users may manipulate handle portions 54*c*, 56*c* while notches 50*c*, 52*c* are engaged with bag holder 14.

Figure 8A:
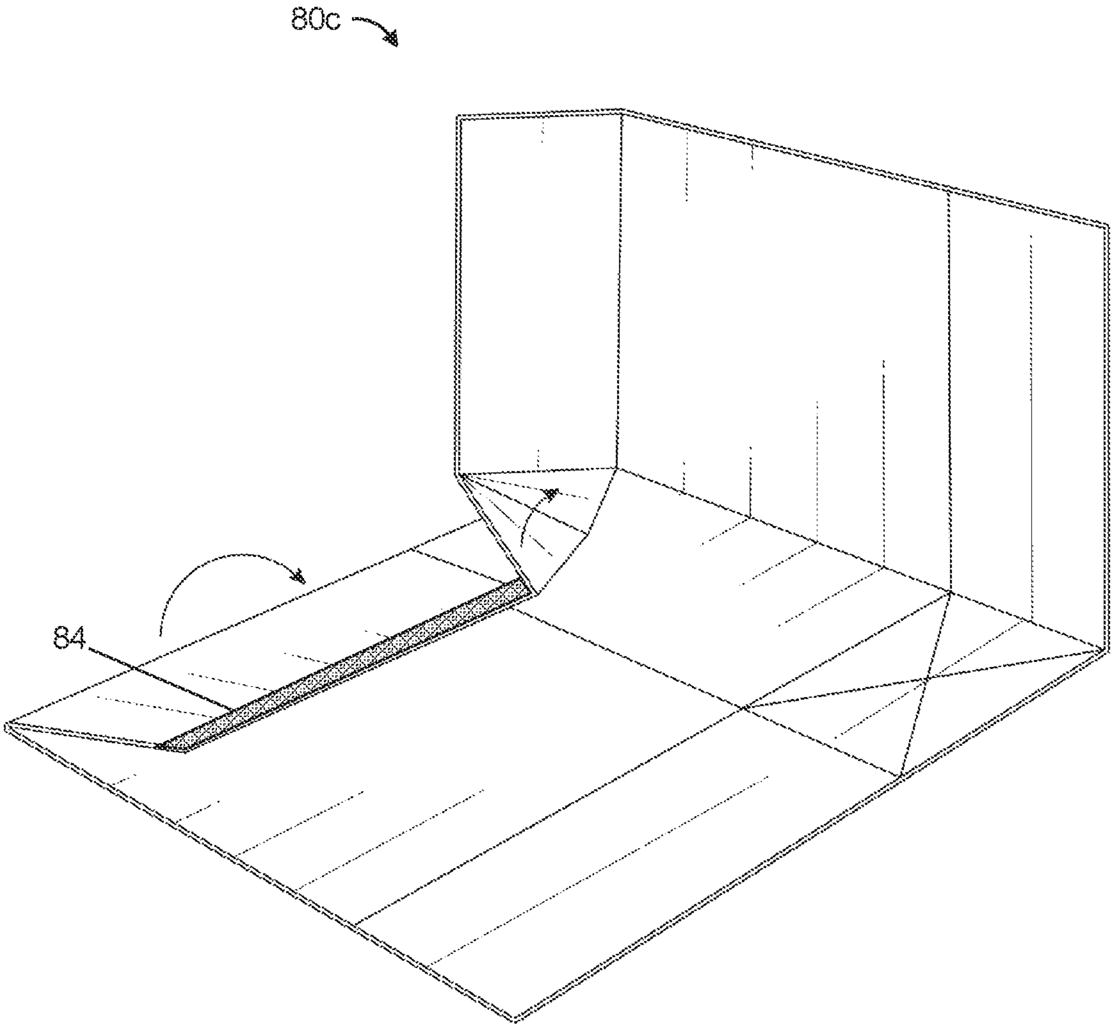
FIGS. 8A and 8B show a process of forming the paper bag of FIG. 7A.
Figure 8B:
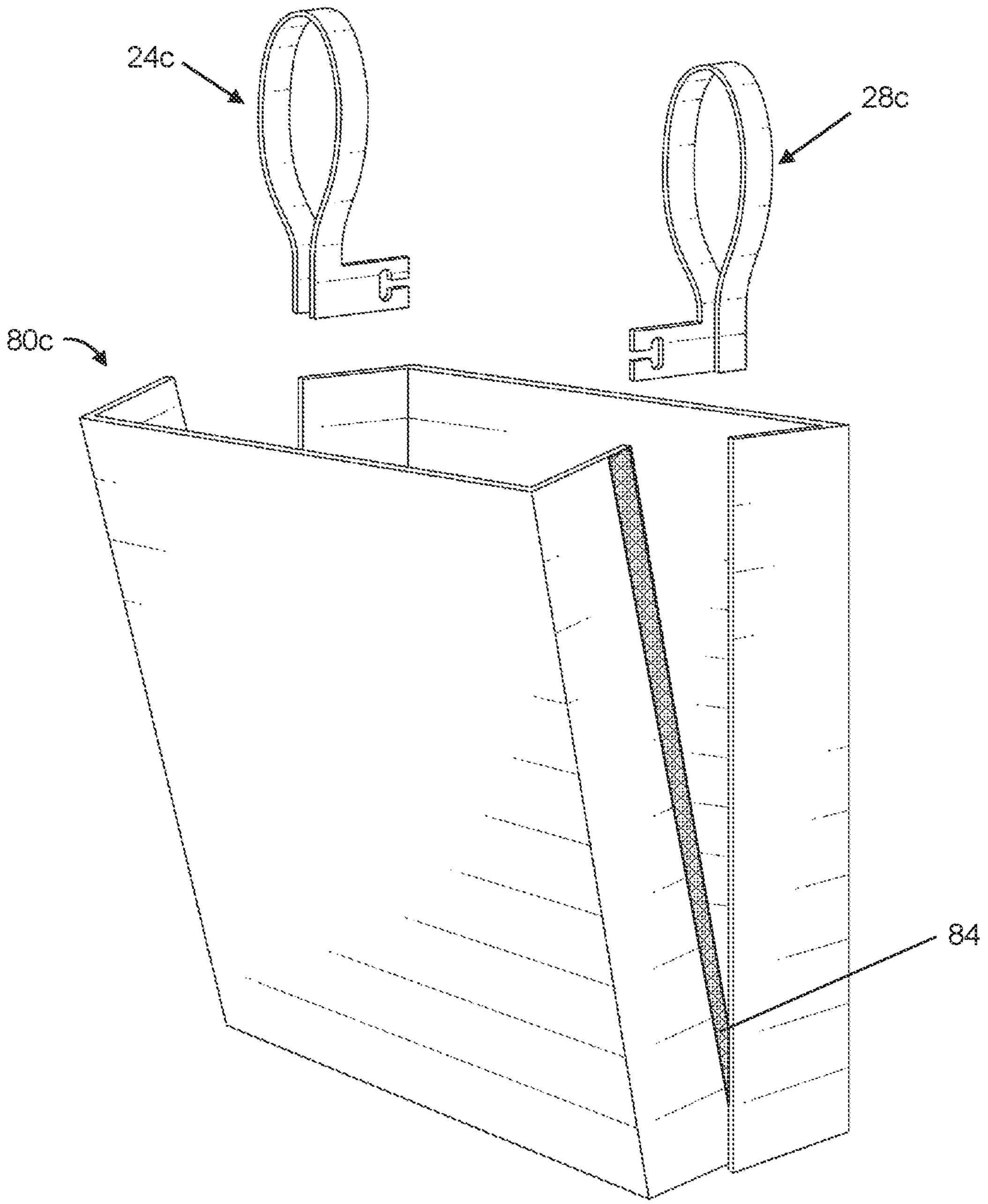
Figure 9A:
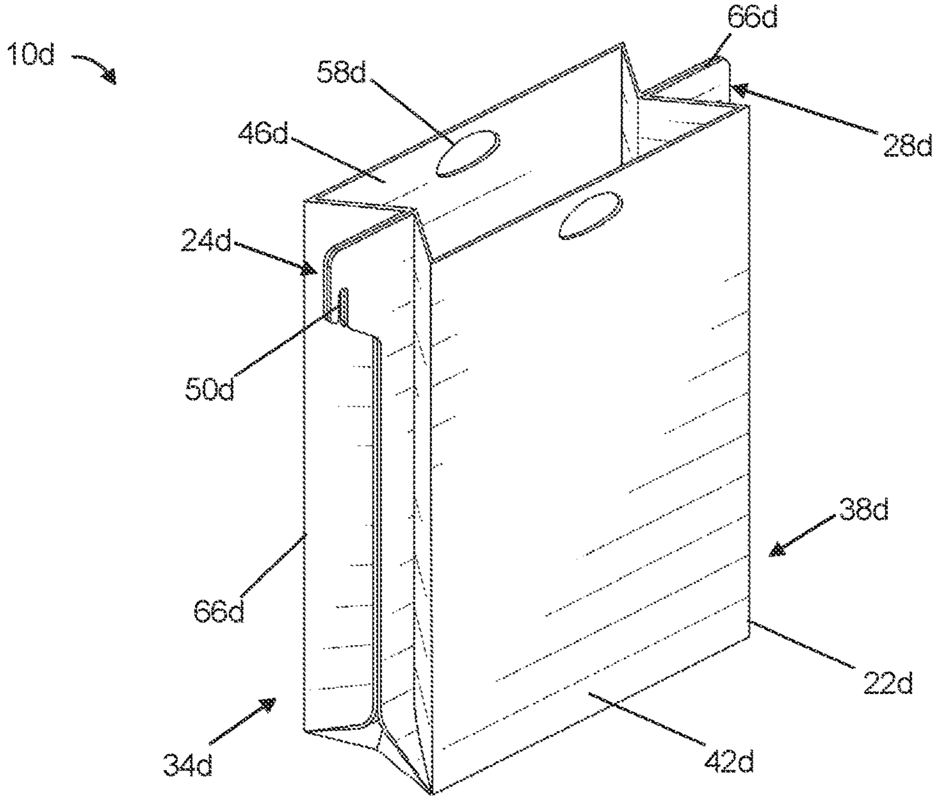
FIG. 9A is a perspective view of an example of a fifth configuration of the present paper bags.
Figure 9B:
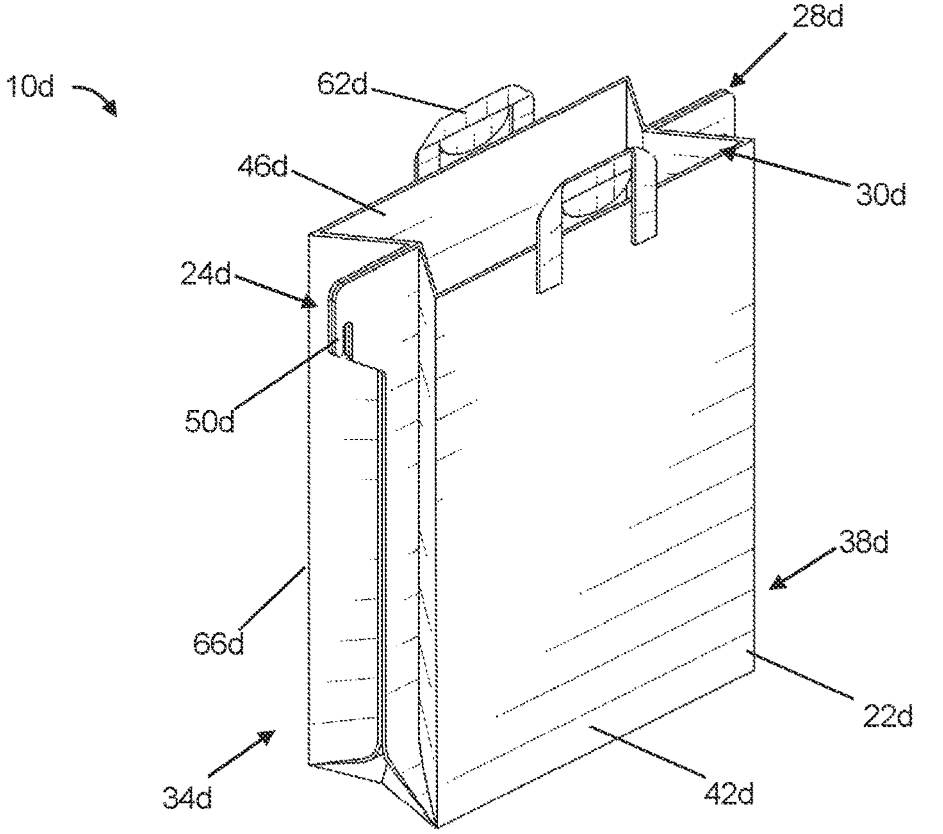
FIG. 9B is a perspective view of another example of a fifth configuration of the present paper bags.
Figures 9C, 9D:
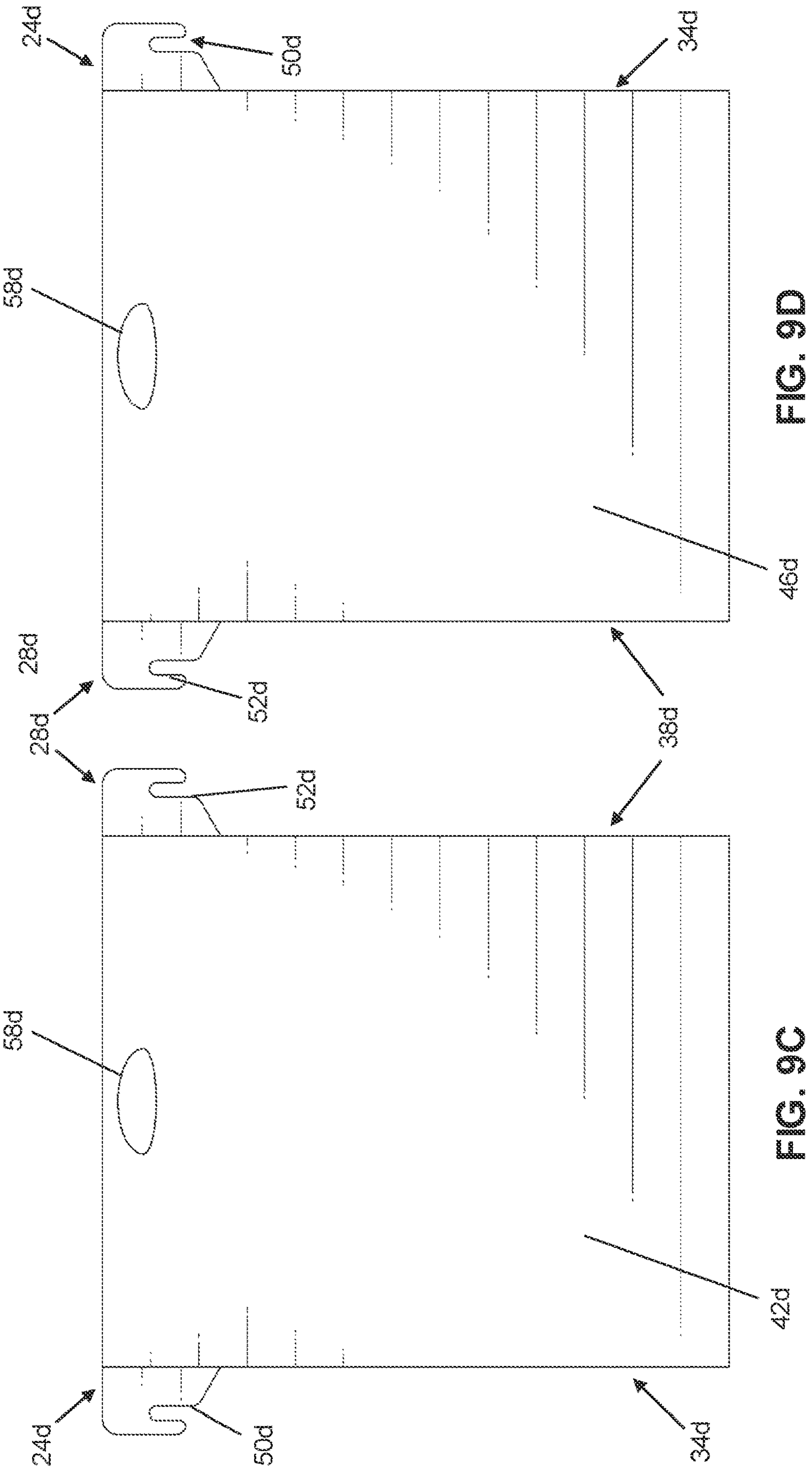
FIGS. 9C and 9D are front and back views, respectively, of the paper bag of FIG. 9A.
Figure 9G:
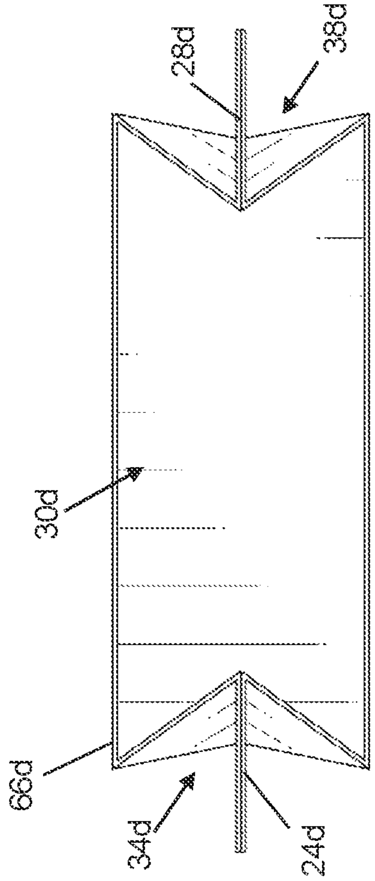
FIGS. 9G and 9H are top and bottom views, respectively, of the paper bag of FIG. 9A.
Figure 9H:
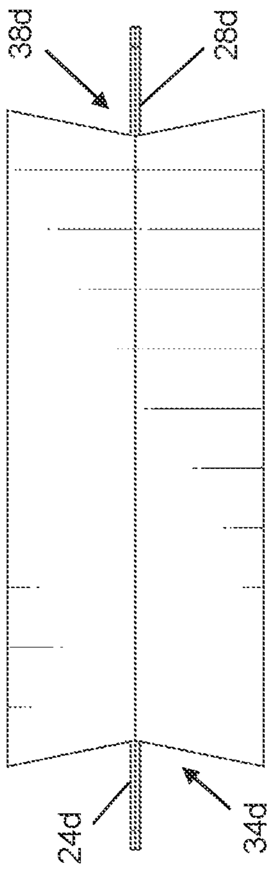
Figure 9F:
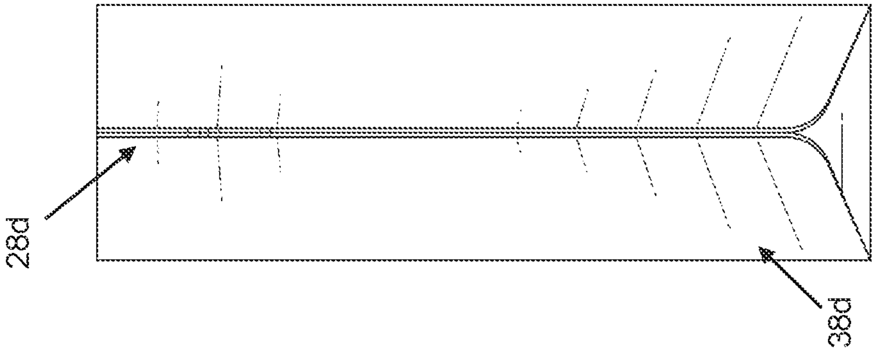
FIGS. 9E and 9F are left and right side views, respectively, of the paper bag of FIG. 9A.
Figure 9E:
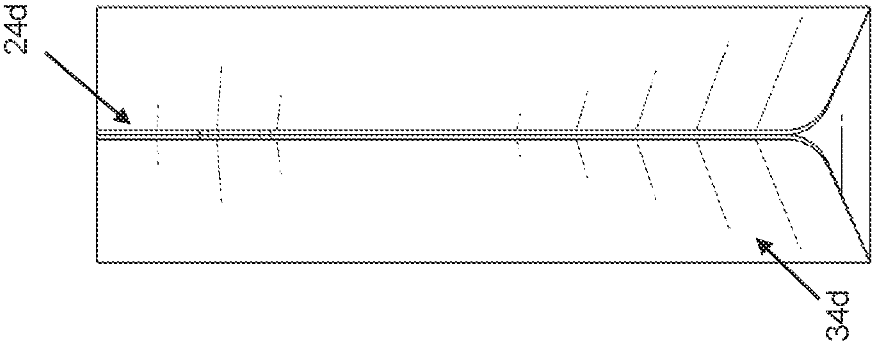
Figure 9J:
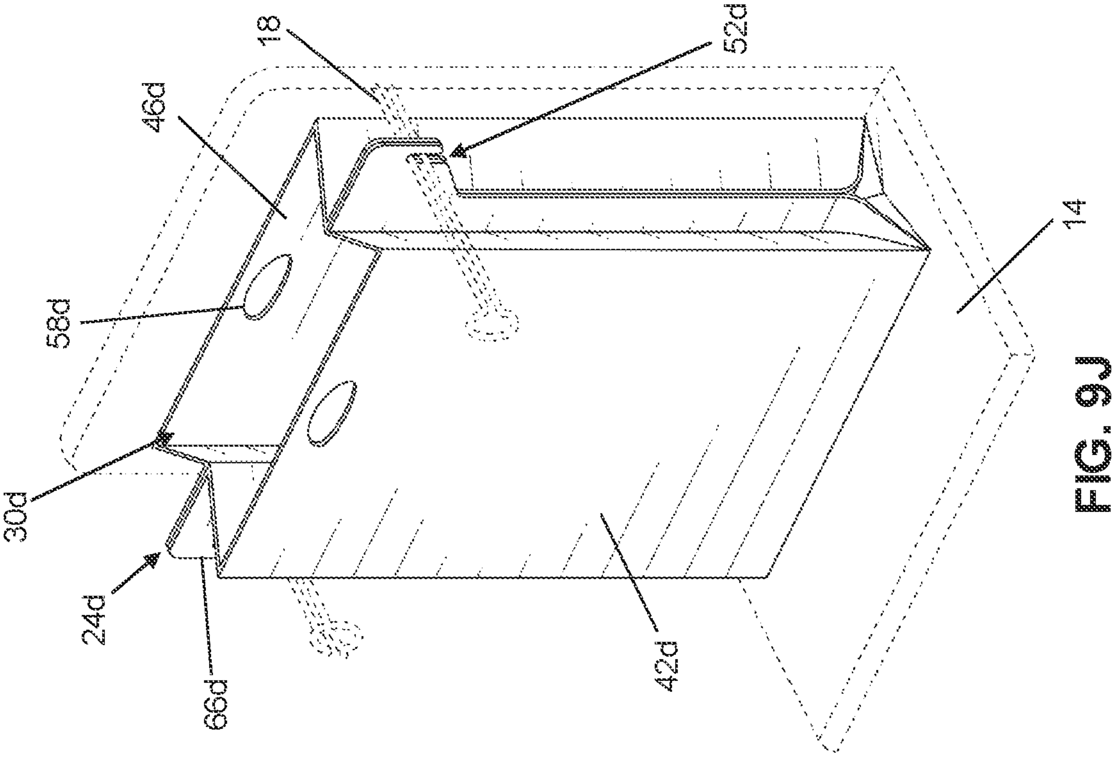
FIG. 9I is a perspective view of the paper bag of FIG. 9A in a first position while engaged with a bag holder system.
Figure 9I:
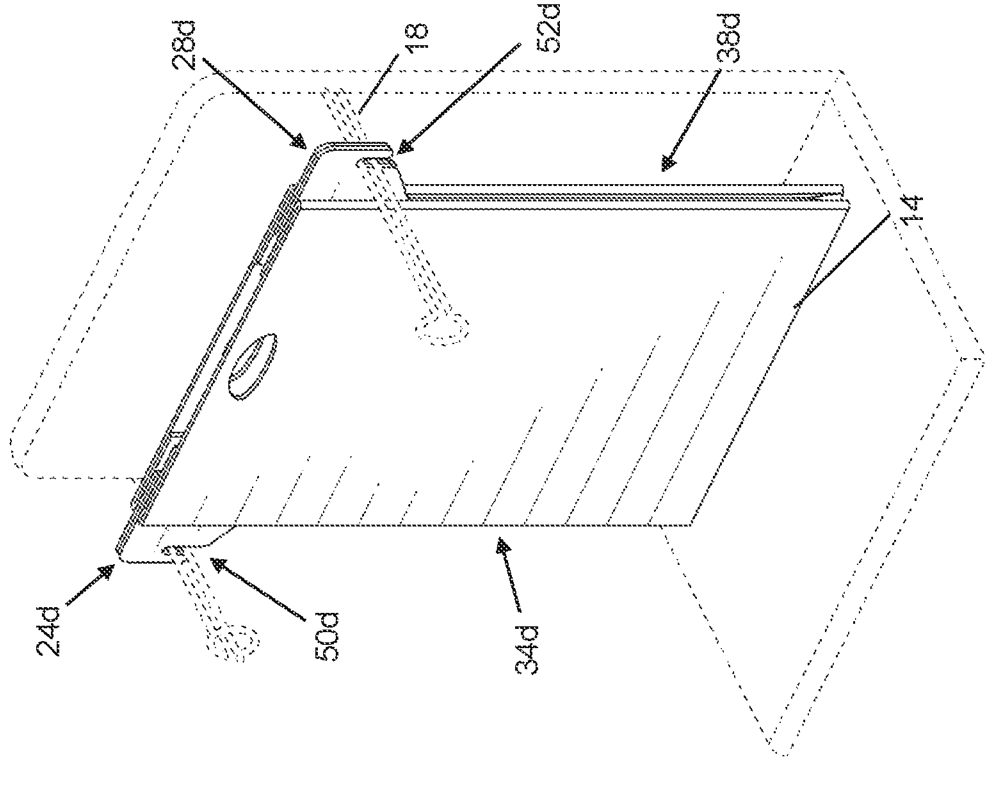

Referring now to FIGS. 8A and 8B, shown is a process for making bag 10*c* from a sheet 80*c* of paper material. As shown in FIG. 8A, sheet 80*c* can be a pre-fabricated sheet, such as a rectangular sheet of paper, that is sized and shaped based on the target dimensions of bag 10*c* or can be cut from a larger area of paper material to form sheet 80*c*. In some configurations, Sheet 80*c* includes adhesive material 84 applied to one or more sides of the sheet. In some configurations, the process can include applying adhesive 84 to different portions of sheet 80*c*. However, in other configurations, sheet 80*c* may come pre-fabricated with adhesive 84 already applied to the sheet. In such configurations, one or more other steps may be necessary, such as removing a covering from adhesive 84, or the like.

As shown, the method of forming bag 10*c* can include folding sheet 80*c*. For example, as shown in FIGS. 8A, a portion of sheet 80*c*, such as a side portion, can be folded multiple times. To further illustrate, sheet 80*c* can be folded to make corners which fold in while bag 10*c* forms to strengthen a bottom of the bag at each side. In some configurations, first and second attachment portions 24*c*, 28*c* can be coupled to sheet 80*c* during the folding process. For example, as shown in FIG. 8B, first attachment portion 24*c* may be disposed between two sections of sheet 80*c* corresponding to first side 34*c* of body 22*c* and adhered to the sheet 80*c*. First attachment portion 24*c* can be positioned relative to sheet such that handle portion 54*c* extends upwards to a target height and notch 50*c* extends outwards to a target width. Second attachment portion 28*c* can be attached in a similar manner as first attachment portion 24*c*. In this way and others, bag 10*c* can be adjusted to fit a particular bag holder, such as a pre-existing bag holder for plastic bags.

FIGS. 9A-9J show a fifth configuration 10*d* of the present bags. Bag 10*d* includes a body 22*d*, a first attachment portion 24*d* configured to engage with an arm 18 of bag holder 14, and a second attachment portion 28*d* configured to engage with another arm 18 of the bag holder. Body 22*d* includes a first side 34*d*, a second side 38*d* opposing the first side, and a first section 42*d* and a second section 46*d* disposed between the first side and the second side. In some configurations, first and second sections 42*d*, 46*d* can define an aperture 58*d* for carrying bag 10*d*; however, in other configurations, such as that shown in FIG. 9B, a handle 62*d* can be coupled to the first and second sections. Handle 62*d* can have flaps or gussets that can bolster the handle to provide additional strength.

First attachment portion 24*d* may be positioned closer to first side 34*d* of body 22*d* than to second side 38*d*. Similarly, second attachment portion 28*d* may be positioned closer to second side 38*d* of body 22*d* than to first side 34*d*. As shown, first attachment portion 24*d* and second attachment portion 28*d* are unitary with body 22*d*. For example, first and second attachment portions 24*d*, 28*d* may be continuous with first and second sides 34*d*, 38*d*, respectively.

First attachment portion 24*d* can include a notch 50*d* and second attachment portion 28*d* can include a notch 52*d*, each of which extends inward from a perimeter 66*d* of bag 10*d*. As depicted, notches 50*d*, 52*d* extend away from perimeter 66*d* at an angle. In some configurations, notches 50*d*, 52*d* can extend away from perimeter by a distance that is greater than a height D5 of arm 18. Notches 50*d*, 52*d* can be uniform and shape and extend substantially in a vertical plane. In this way and others, notches 50*d*, 52*d* can hang over arms 18 and slide along the arms while supporting bag 10*d*. In some configurations, edges of notches 50*d*, 52*d* are rounded, while in other configurations the notches can be shaped differently, such as for example, rectangular or angled. As describe herein, first attachment portion 24*d* and second attachment portion 28*d* can be configured to slide along arm 18 while supporting bag 10*d*.

Figure 10A:
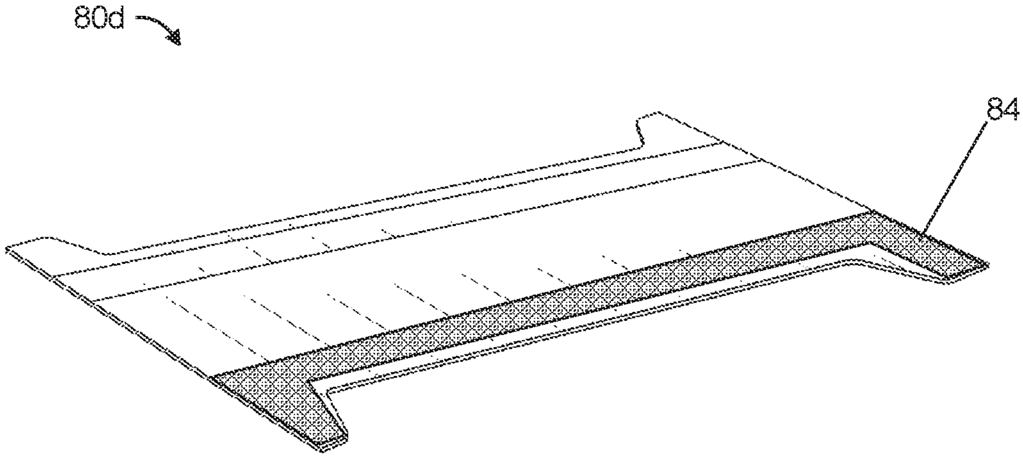
FIGS. 10A-10C show a process of forming the paper bag of FIG. 9A.
Figure 10B:
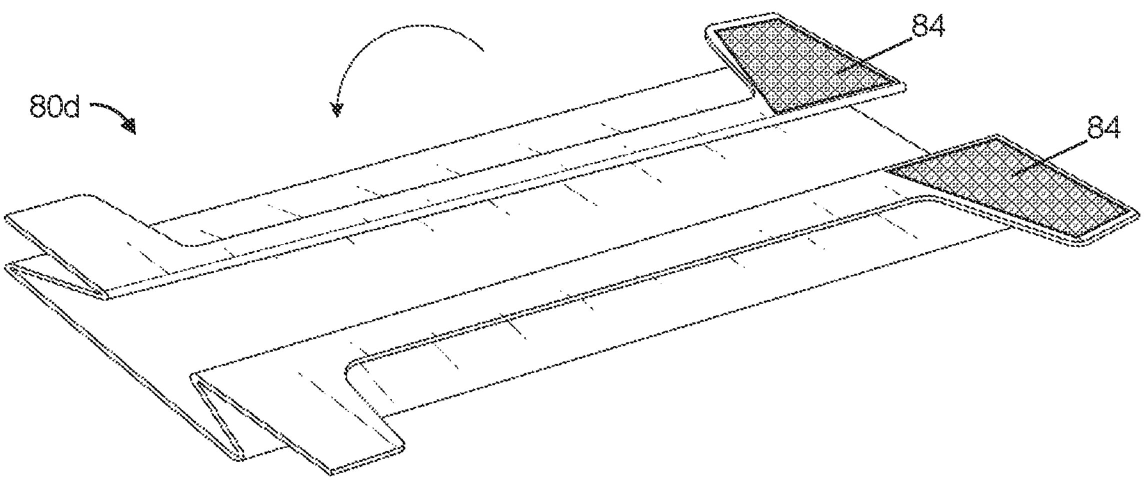
Figure 10C:
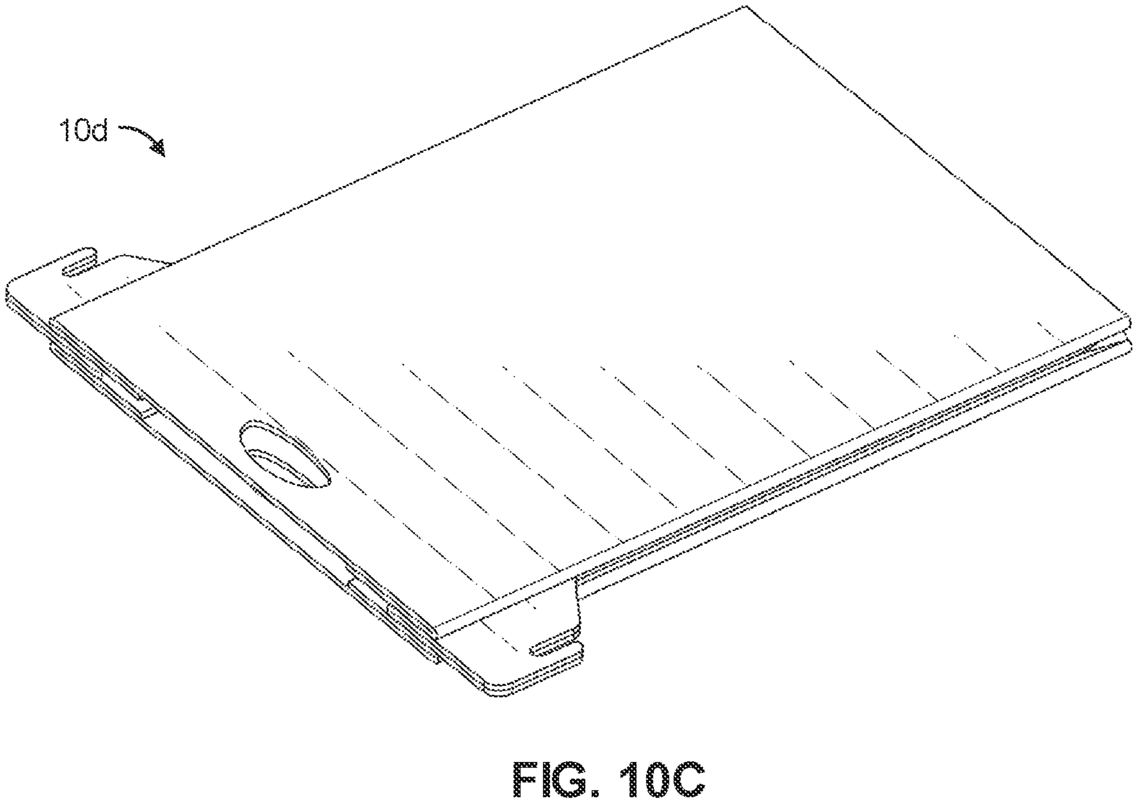

Referring now to FIGS. 10A-10C, shown is a process for making bag 10*d* from a sheet 80*d* of paper material. As shown in FIG. 8A, sheet 80*d* can be a pre-fabricated sheet that is sized and shaped based on the target dimensions of bag 10*d* or can be cut from a larger area of paper material to form sheet 80*d*. In some configurations, sheet 80*d* includes adhesive material 84 applied to one or more sides of the sheet. In some configurations, the process can include applying adhesive 84 to different portions of sheet 80*d*. However, in other configurations, sheet 80*d* may come pre-fabricated with adhesive 84 already applied to the sheet. In such configurations, one or more other steps may be necessary, such as removing a covering from adhesive 84, or the like.

As shown in FIGS. 10A-10B, the method of forming bag 10*d* can include folding sheet 80*d*. For example, sheet 80*d* can be folded inward on both lateral sides. In some such configurations, partial folding of the sides can be used to create gussets and increase the strength of a section of bag 10*d*. As depicted in FIG. 10B, sheet 80*d* can be folded multiple times, such as by folding the previously folded portions in half. In other configurations, sheet 80*d* can be folded any number of times to form bag 10*d*. Referring now to FIG. 10D, sheet 80*d* can be cut to form one or more features of bag 10*d*. For example, notches 50*d*, 52*d* and aperture 58*d* can be cut from sheet 80*d* to form bag 10*d*. The cutting steps may enable bag 10*d* to be specifically tailored to an existing bag holder.

FIGS. 11A-11I show a sixth configuration 10*e* of the present bags. Bag 10*e* includes a body 22*e*, a first attachment portion 24*e* configured to engage with an arm 18 of bag holder 14, and a second attachment portion 28*e* configured to engage with another arm 18 of the bag holder. Body 22*e* includes a first side 34*e*, a second side 38*e* opposing the first side, and a first section 42*e* and a second section 46*e* disposed between the first side and the second side. In some configurations, first and second sections 42*e*, 46*e* can define an aperture 58*e* for carrying bag 10*e*.

Figure 11A:
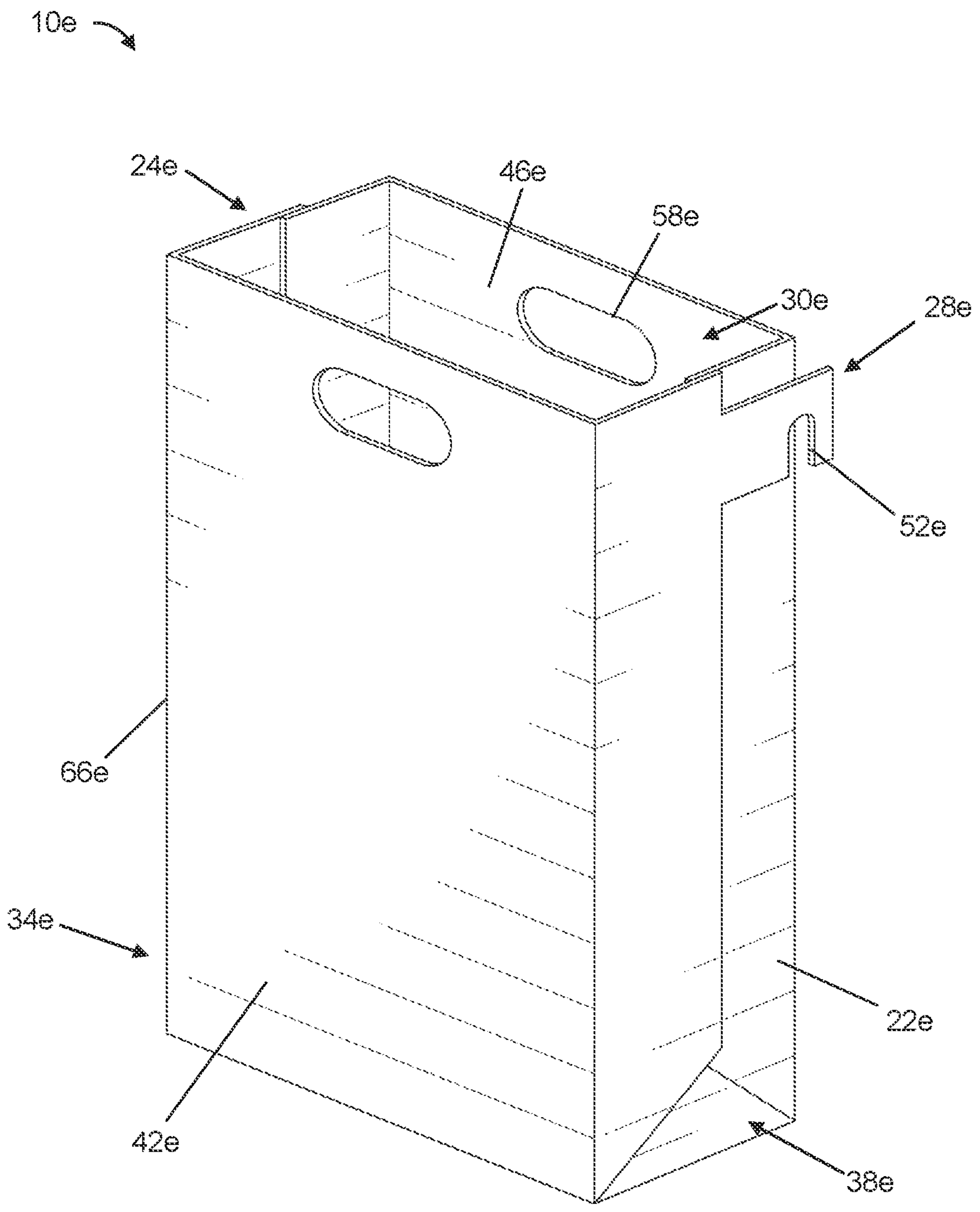
FIG. 11A is a perspective view of an example of a sixth configuration of the present paper bags.
Figure 11C:
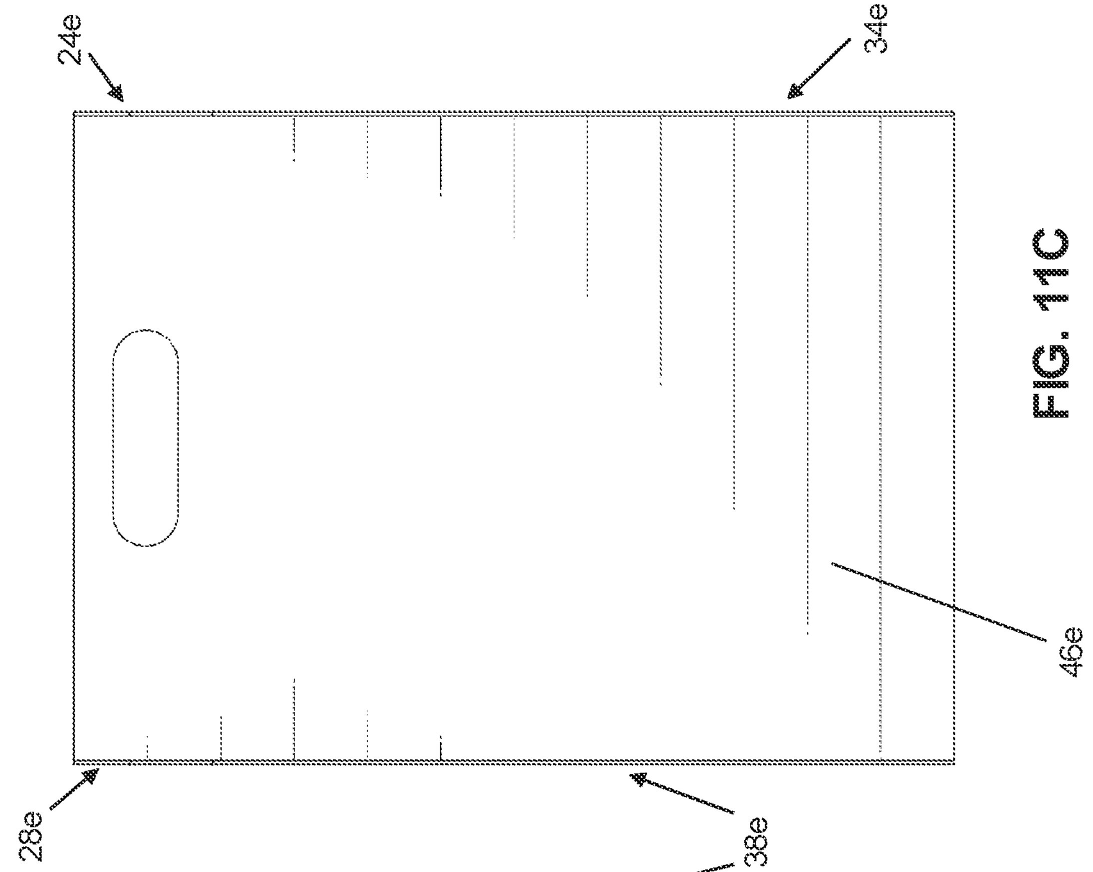
FIGS. 11B and 11C are front and back views, respectively, of the paper bag of FIG. 11A.
Figure 11B:
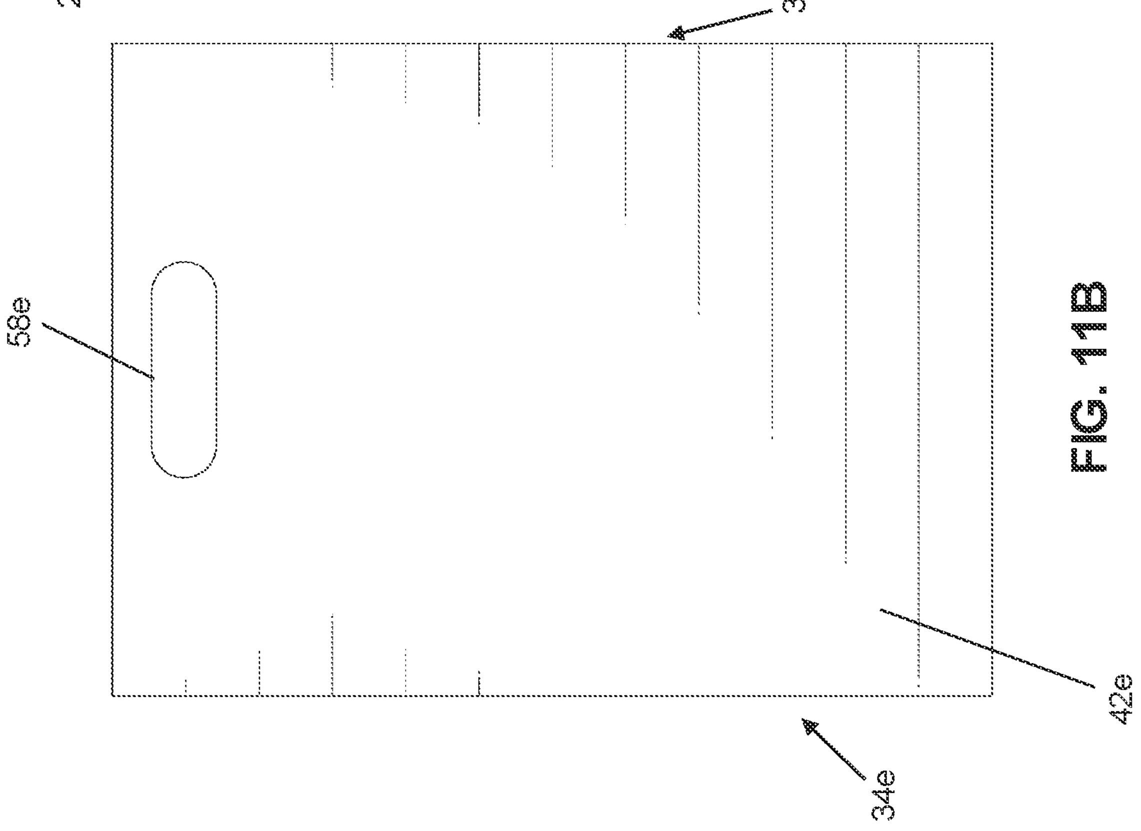
Figure 11F:
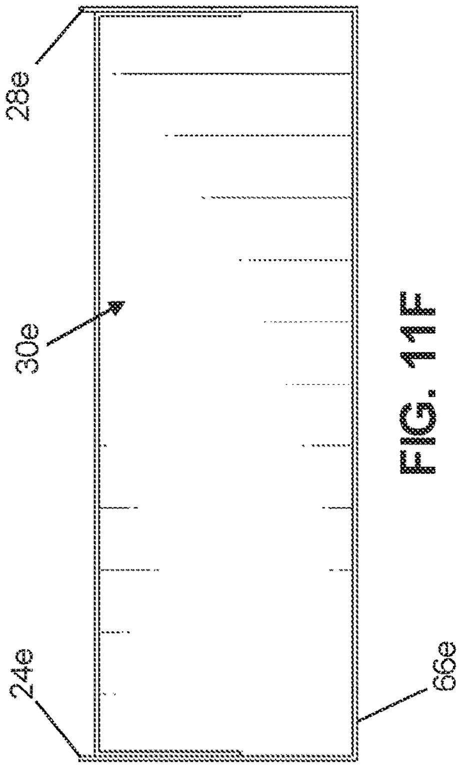
FIGS. 11F and 11G are top and bottom views, respectively, of the paper bag of FIG. 11A.
Figure 11G:
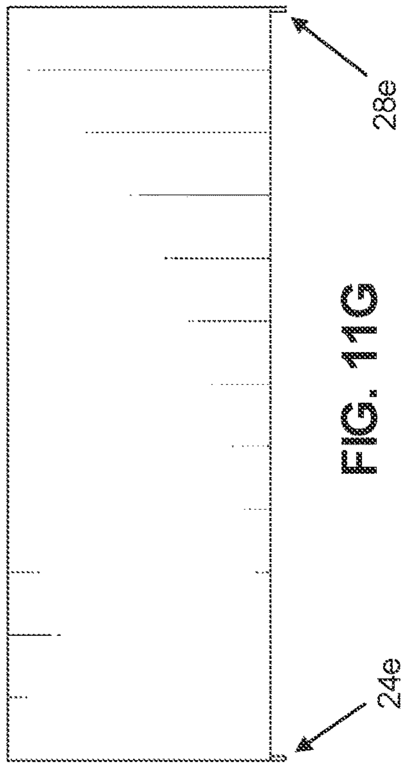
Figure 11E:
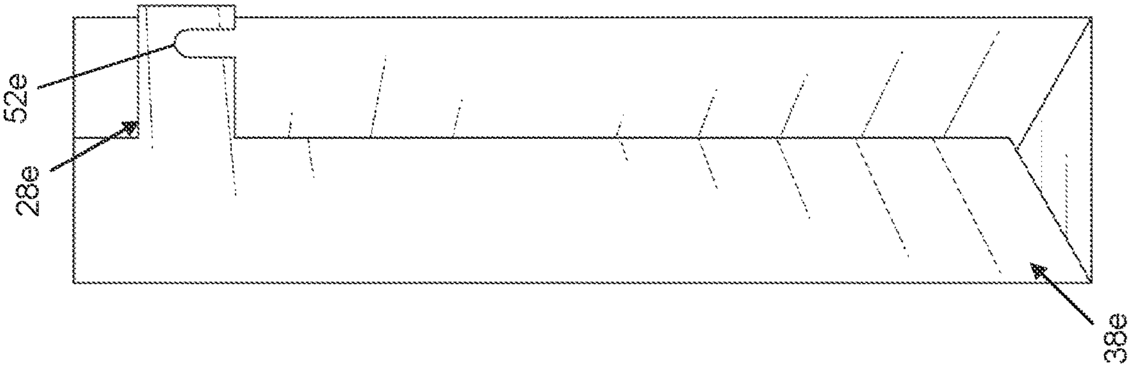
FIGS. 11D and 11E are left and right side views, respectively, of the paper bag of FIG. 11A.
Figure 11D:
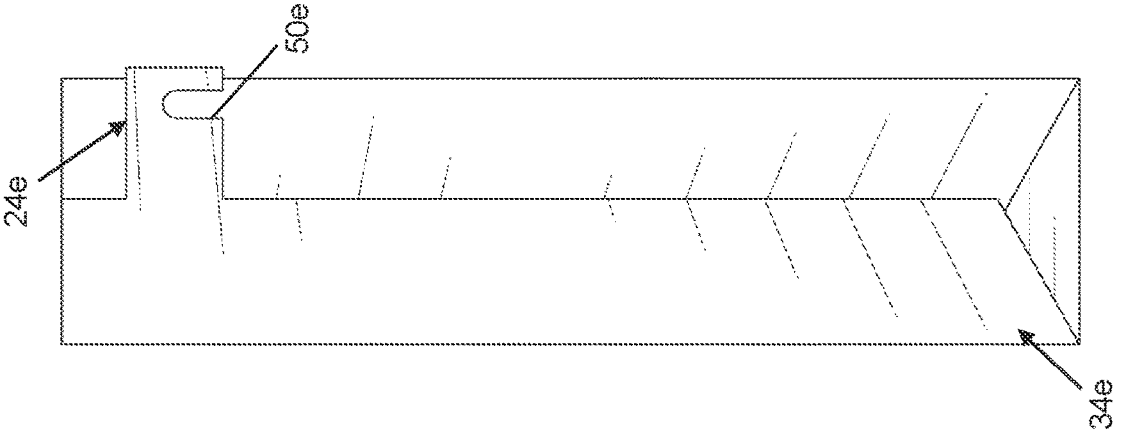
Figure 11H:
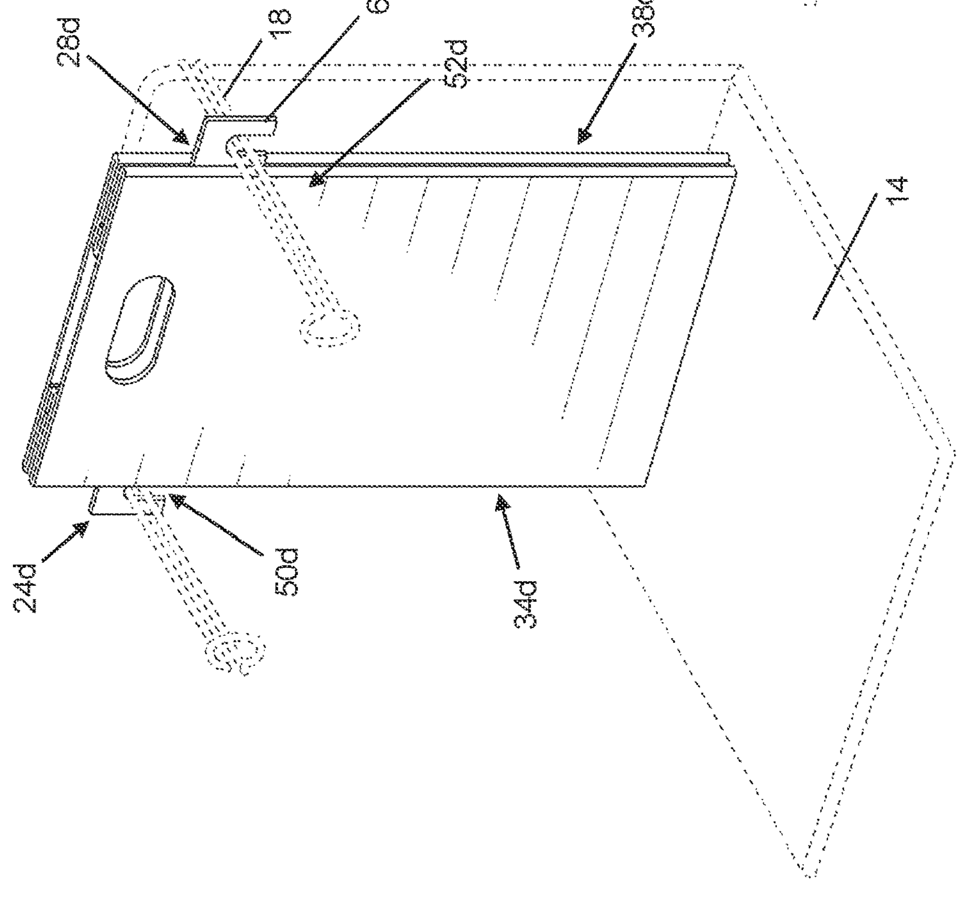
FIG. 11H is a perspective view of the paper bag of FIG. 11A in a first position while engaged with a bag holder system.
Figure 11I:
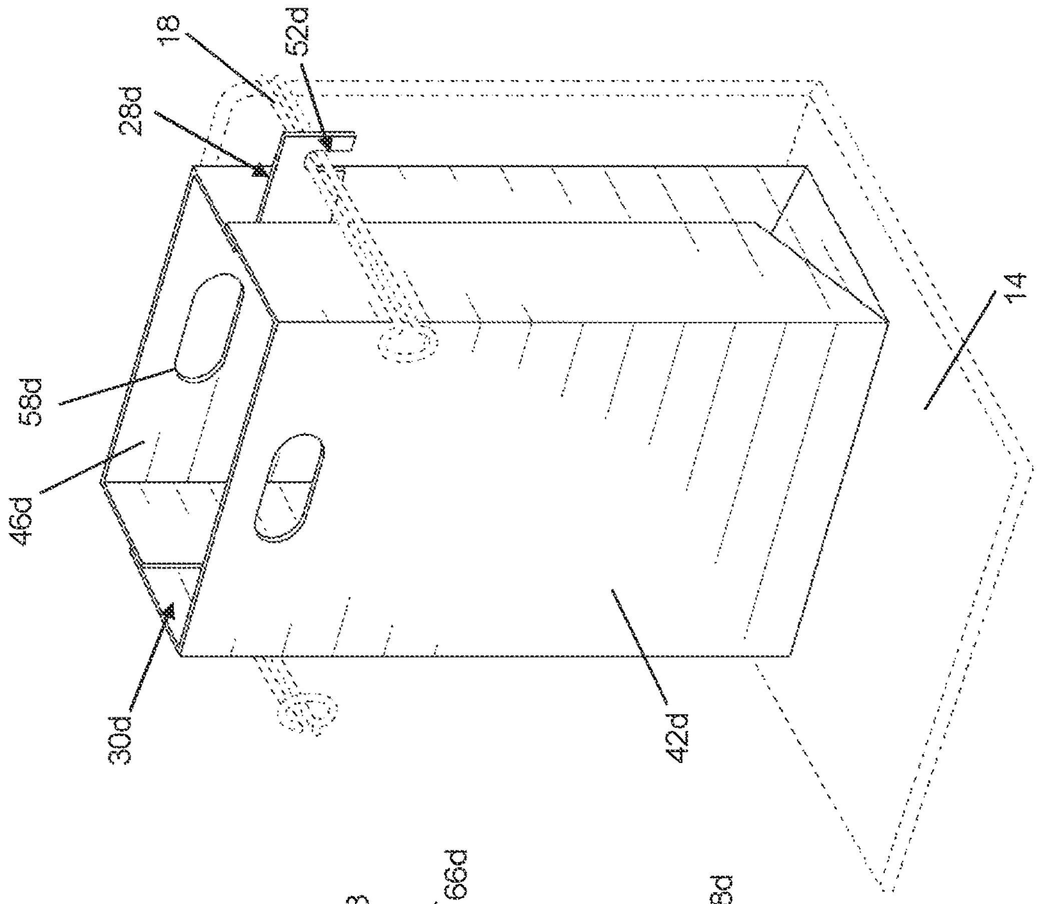
FIG. 11I is a perspective view of the paper bag of FIG. 11A in a second position while engaged with a bag holder system.

First attachment portion 24*e* may be positioned closer to first side 34*e* of body 22*e* than to second side 38*e*. Similarly, second attachment portion 28*e* may be positioned closer to second side 38*e* of body 22*e* than to first side 34*e*. As shown, first attachment portion 24*e* and second attachment portion 28*e* are unitary with body 22*e*. For example, first and second attachment portions 24*e*, 28*e* may be continuous with a portion of first and second sides 34*e*, 38*e*, respectively. As best shown in FIGS. 11H and 11I, first and second attachment portions 24*e*, 28*e* may be moveable relative to body 22*e*. For example, first and second attachment portions 24*e*, 28*e* can rotate relative to first side 34*e* and second side 38*e*, respectively.

First attachment portion 24*e* can include a notch 50*e* and second attachment portion 28*e* can include a notch 52*e*, each of which extends inward from a perimeter 66*e* of bag 10*e*. As depicted, notches 50*e*, 52*e* extend orthogonally away from perimeter 66*e*. In some configurations, notches 50*e*, 52*e* can extend away from perimeter by a distance that is greater than a height D5 of arm 18. Notches 50*e*, 52*e* can be uniform and shape and extend substantially in a vertical plane. In this way and others, notches 50*e*, 52*e* can hang over arms 18 and slide along the arms while supporting bag 10*e*. In some configurations, edges of notches 50*e*, 52*e* are rounded, while in other configurations the notches can be shaped differently, such as for example, rectangular or angled. As describe herein, first attachment portion 24*e* and second attachment portion 28*e* can be configured to slide along arm 18 while supporting bag 10*e*.

Figure 12A:
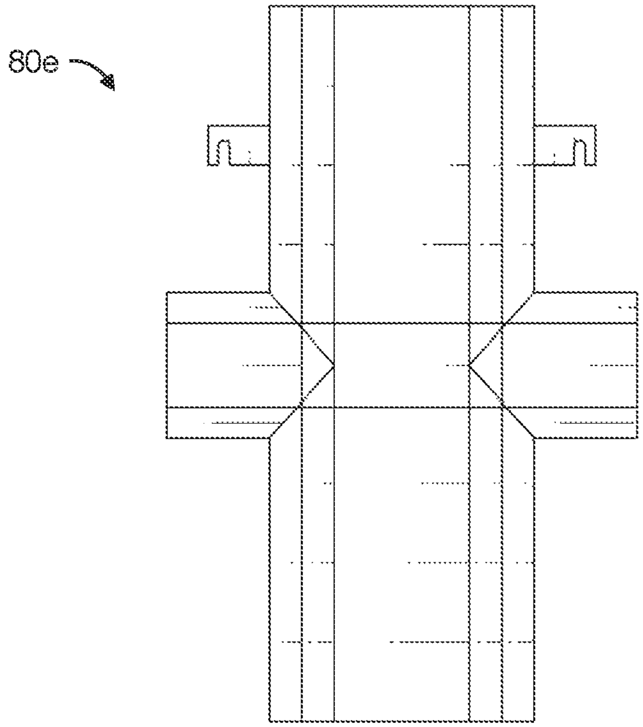
FIGS. 12A-12E show a process of forming the paper bag of FIG. 11A.

Referring now to FIGS. 12A-12E, shown is a process for making bag 10*e* from a sheet 80*e* of paper material. As shown in FIG. 12A, sheet 80*e* can be a pre-fabricated sheet, that is sized and shaped based on the target dimensions of bag 10*e* or can be cut from a larger area of paper material to form sheet 80*e*. In some configurations, sheet 80*e* includes adhesive material 84 applied to one or more sides of the sheet. In some configurations, the process can include applying adhesive 84 to different portions of sheet 80*e*. However, in other configurations, sheet 80*e* may come pre-fabricated with adhesive 84 already applied to the sheet. In such configurations, one or more other steps may be necessary, such as removing a covering from adhesive 84, or the like.

Figure 12B:
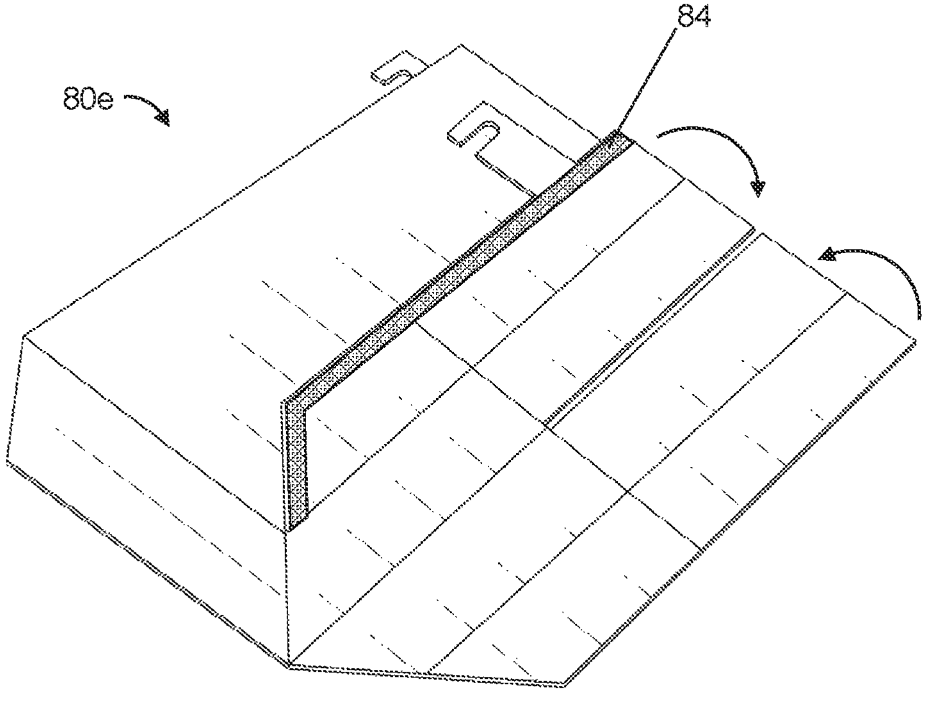
Figure 12C:
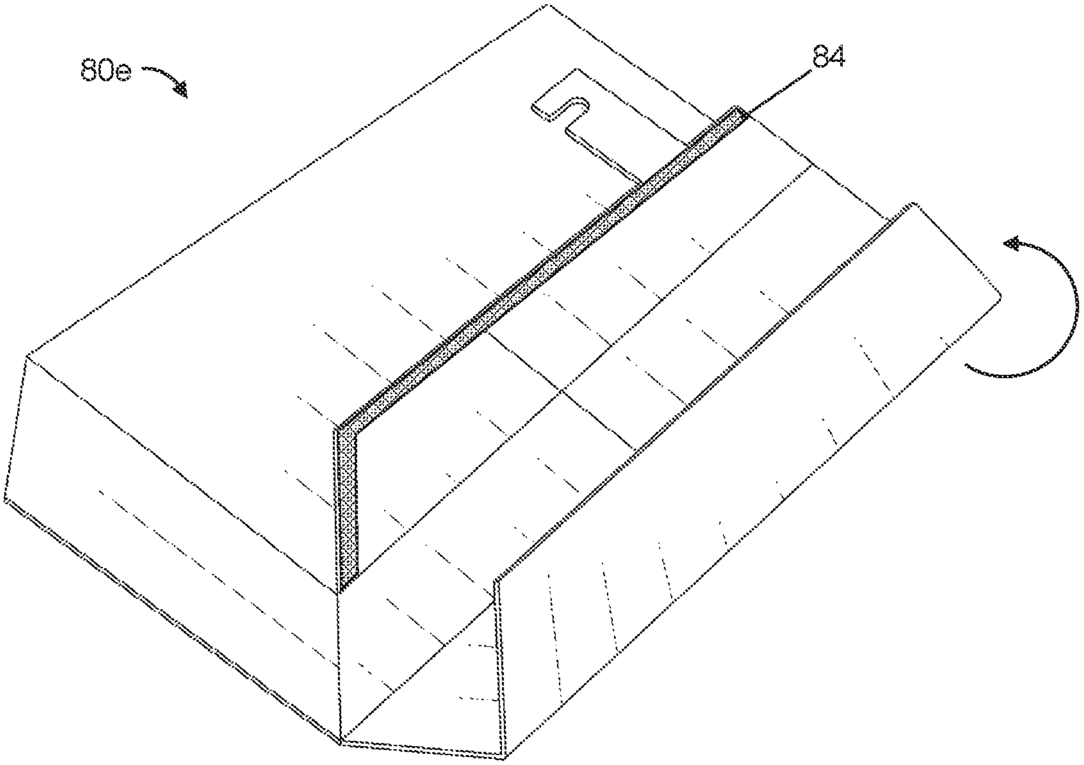
Figure 12D:
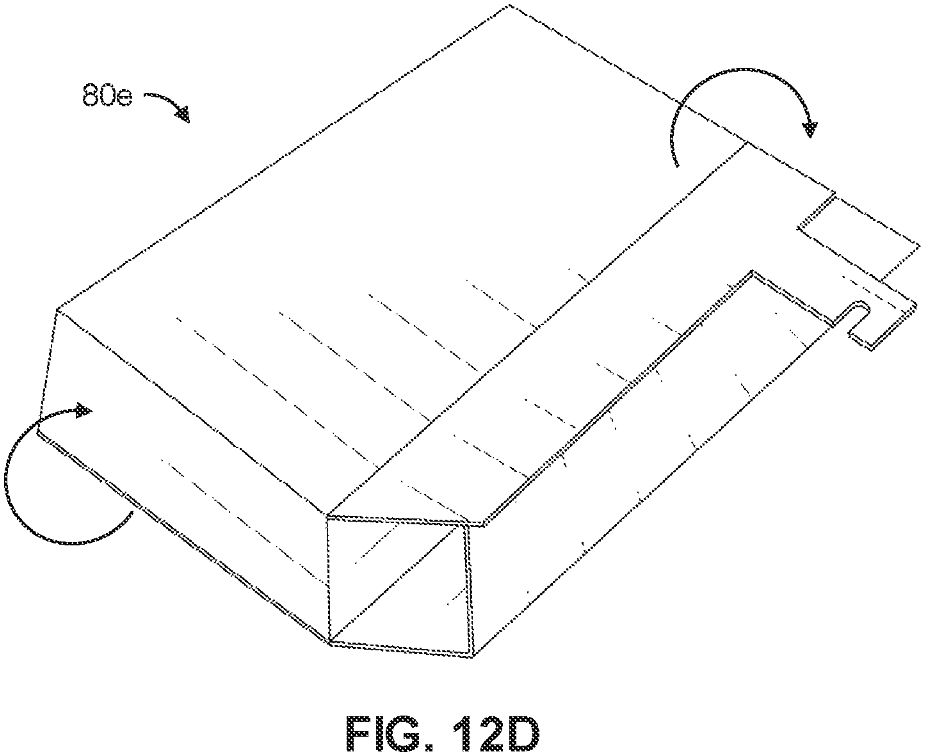
Figure 12E:
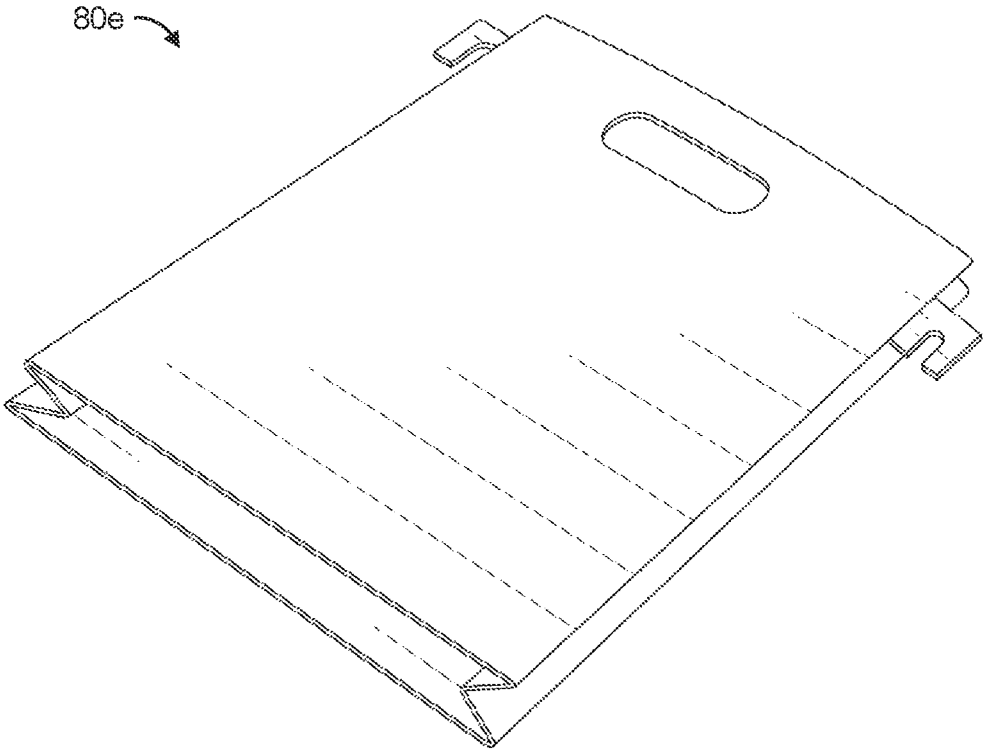
Figure 13A:
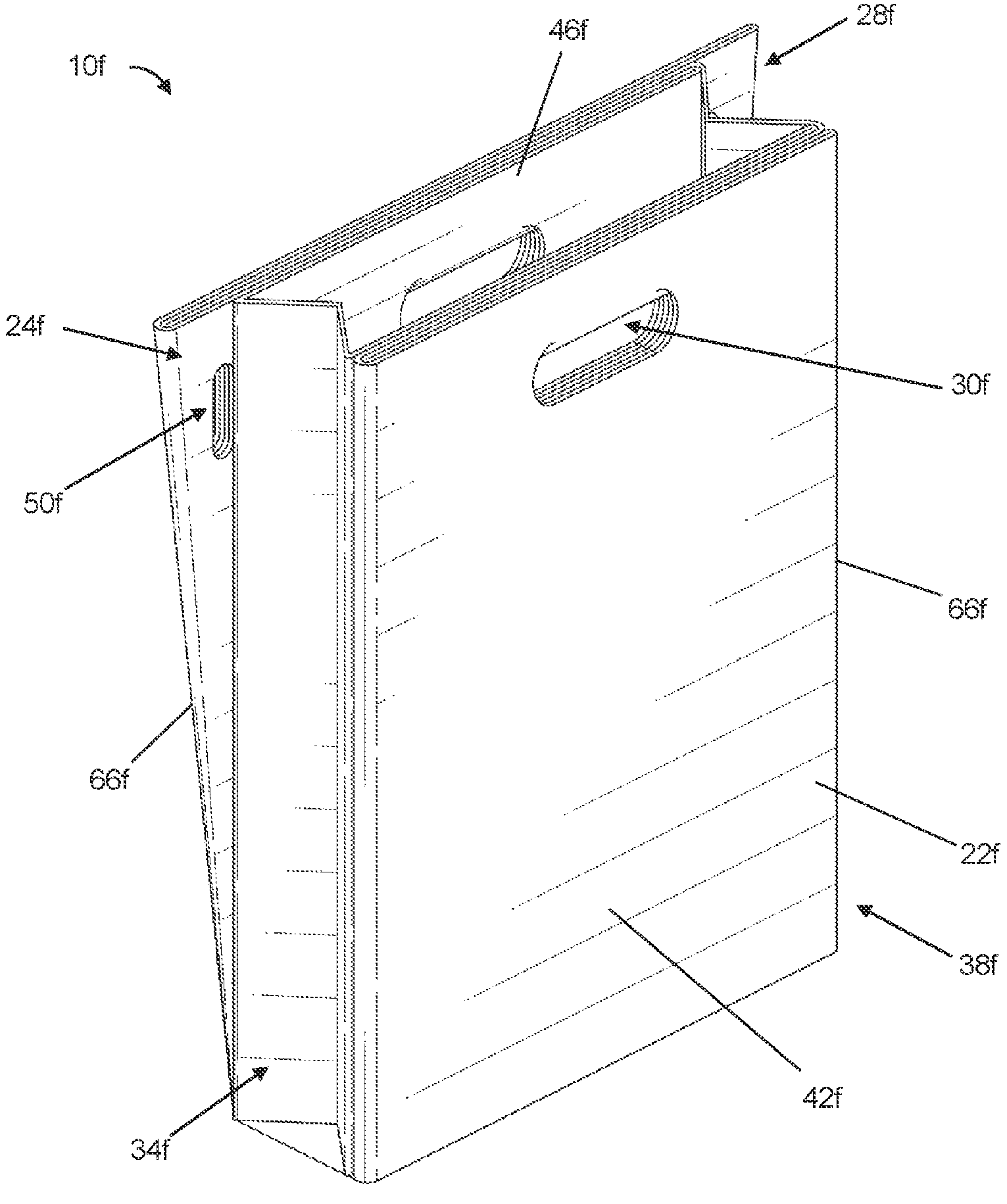
FIG. 13A is a perspective view of an example of a seventh configuration of the present paper bags.
Figure 13C:
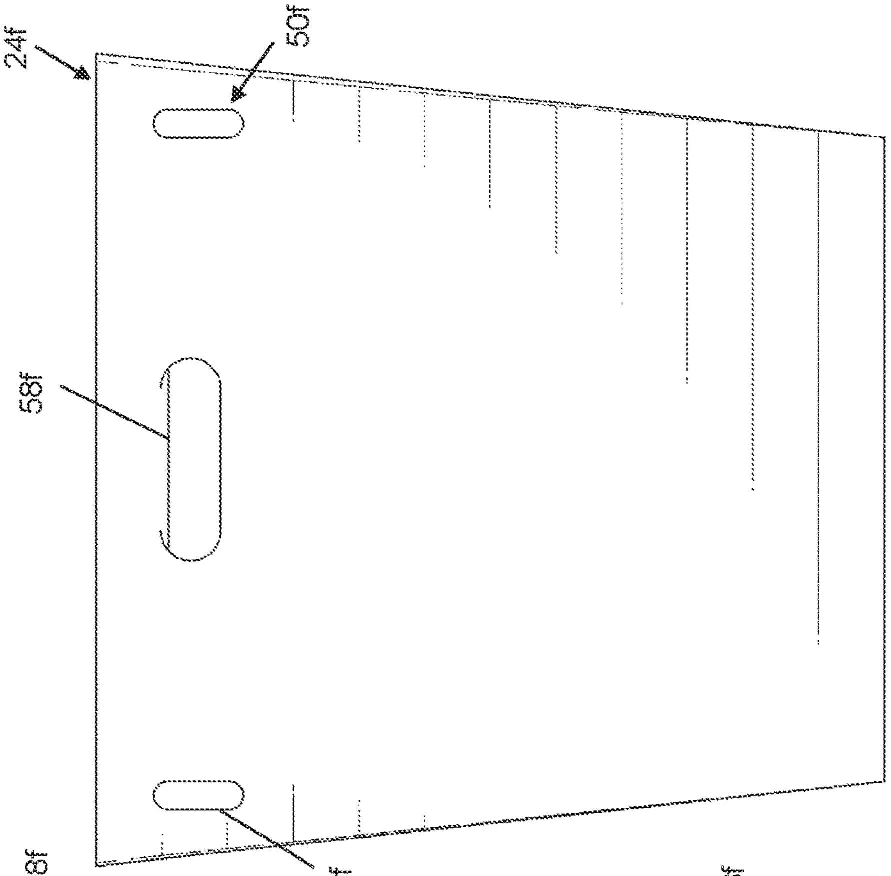
FIGS. 13B and 13C are front and back views, respectively, of the paper bag of FIG. 13A.
Figure 13B:
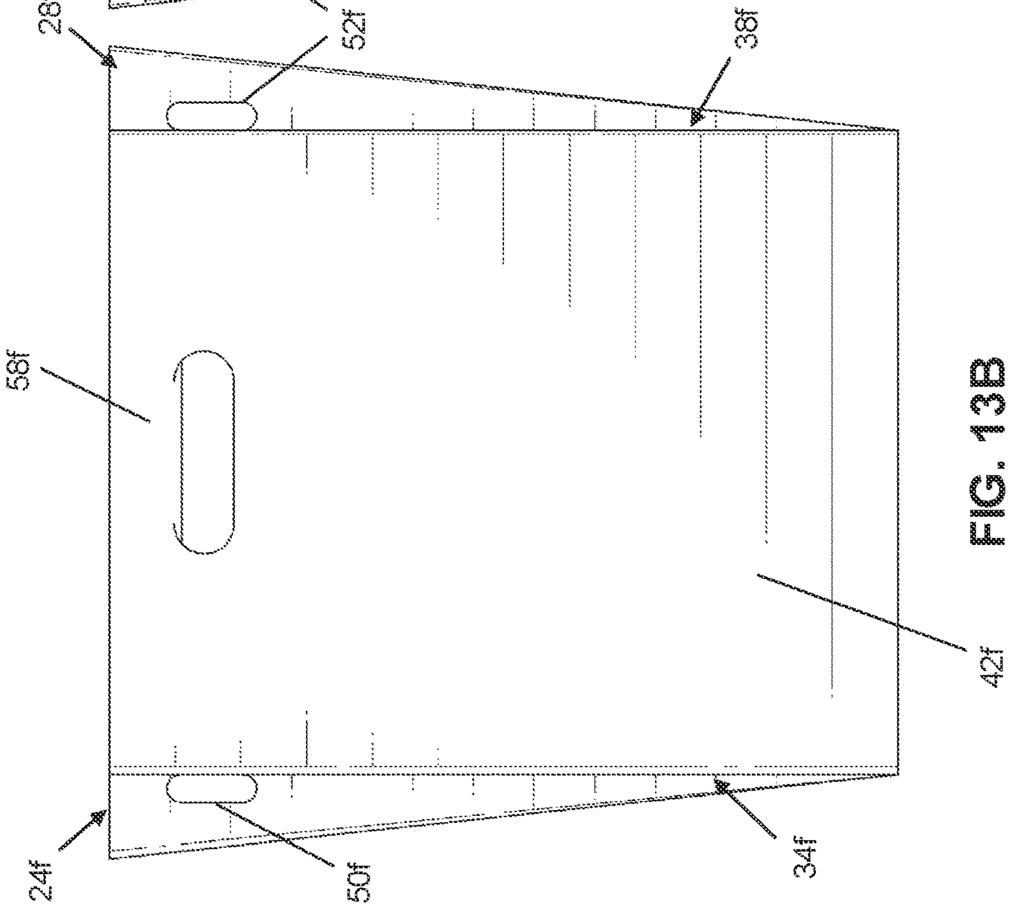
Figure 13F:
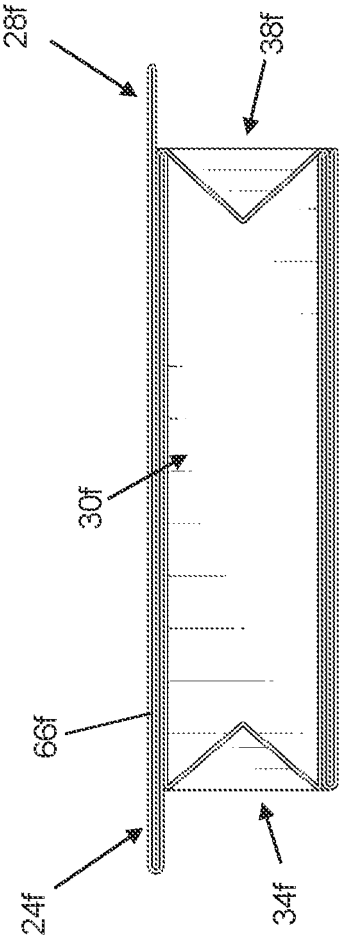
FIGS. 13F and 13G are top and bottom views, respectively, of the paper bag of FIG. 13A.
Figure 13G:
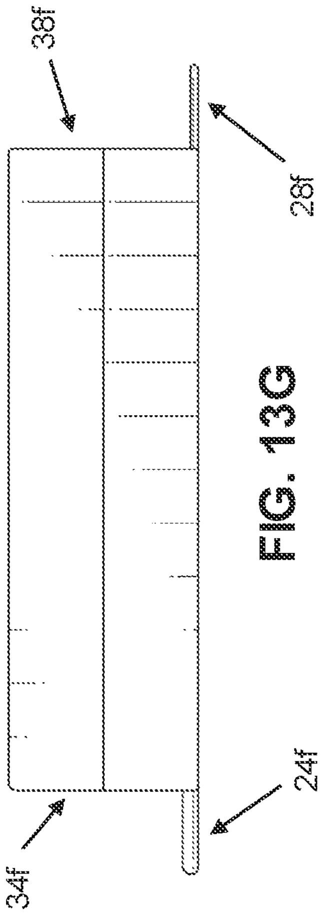
Figure 13E:
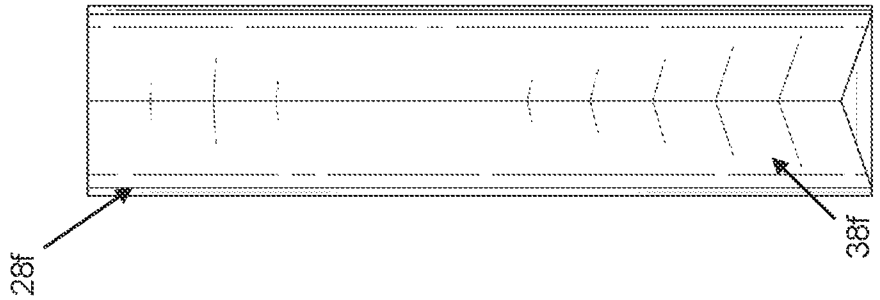
FIGS. 13D and 13E are left and right side views, respectively, of the paper bag of FIG. 13A.
Figure 13D:
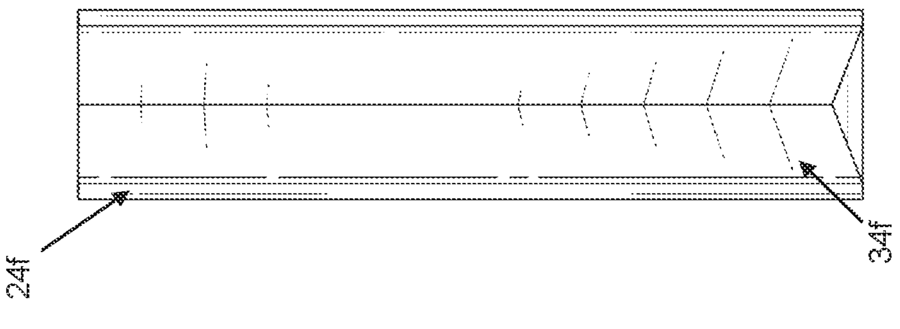
Figure 13I:
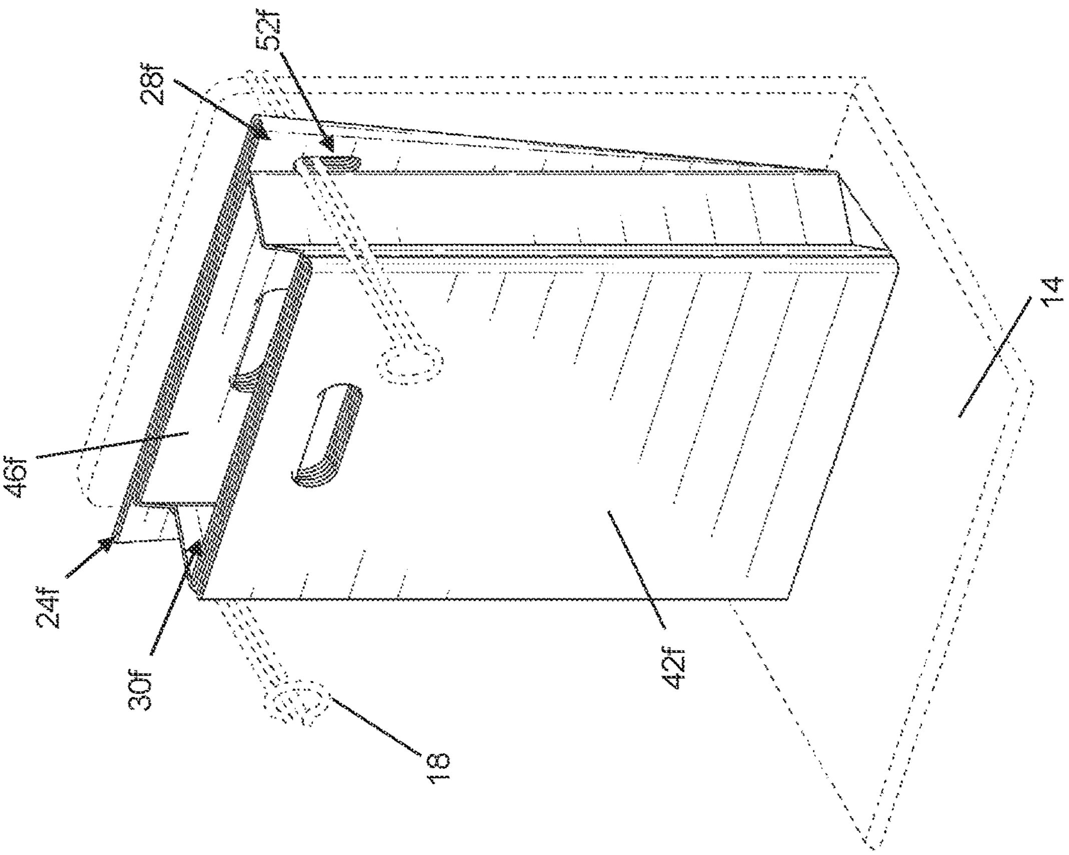
FIG. 13I is a perspective view of the paper bag of FIG. 13A in a second position while engaged with a bag holder system.
Figure 13H:
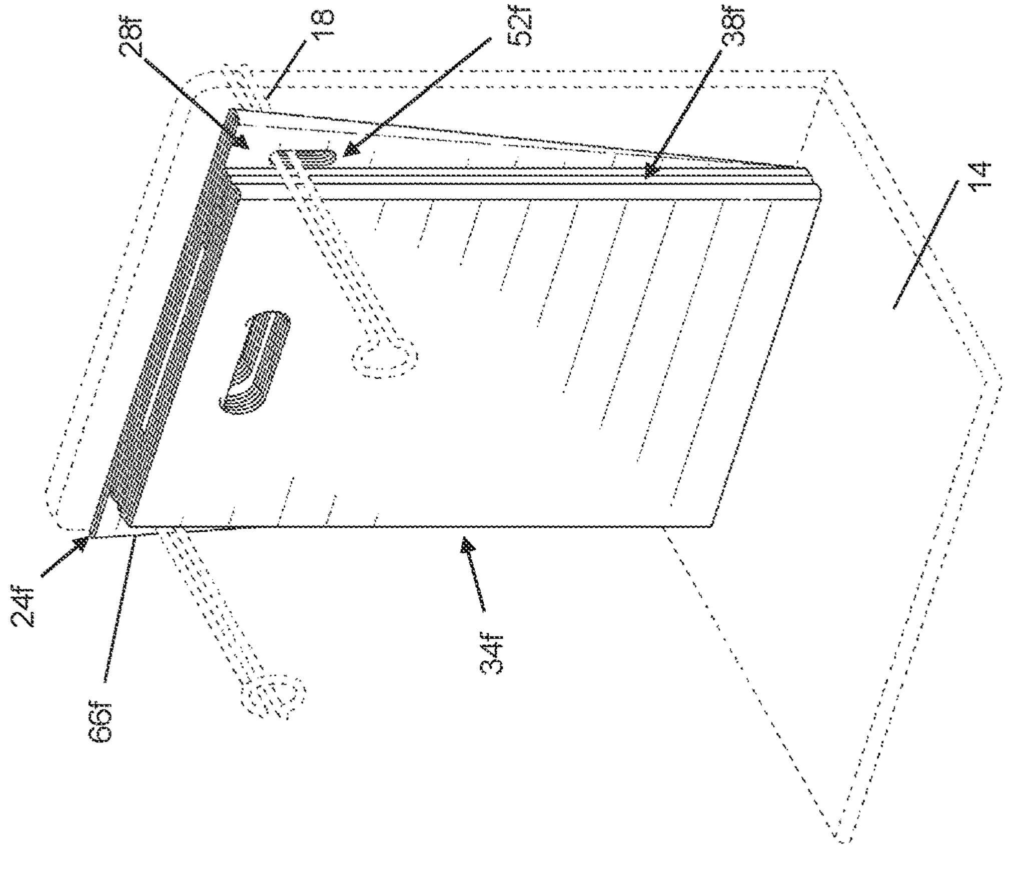
FIG. 13H is a perspective view of the paper bag of FIG. 13A in a first position while engaged with a bag holder system.

As shown in FIGS. 12A-12D, the method of forming bag 10*e* can include folding sheet 80*e*. For example, sheet 80*e* can be folded in half along a lateral axis. In some configurations, a portion of sheet 80*e* corresponding to a bottom of bag may be folded inward while the remainder of sheet is folded in half. As shown in FIG. 12B, sheet 80*e*, after being folded in half, can be partially folded inward on one side to reveal a strip of adhesive 48. Referring now to FIGS. 12B-12D, an end portion of sheet 80*e* can be folded inward and the portion of sheet with the strip of adhesive 48 can be folded on tip of the end portion to form a side, such as for example first side 34*e* and first attachment portion 24*e*. This step can be repeated at an opposite side of sheet 80*e* to form another side, such as, for example, second side 38*e* and first attachment portion 28*e*. Once formed these sides can be folded back together to form bag 10*e*. Some methods of forming bag 10*e* can include the steps of cutting one or more features of the bag, such as for example, apertures 58*e* or notches 50*e*, 52*e*. The cutting step can occur prior to or after folding.

FIGS. 13A-13I show a seventh configuration 10*f* of the present bags. Bag 10*f* includes a body 22*f*, a first attachment portion 24*f* configured to engage with an arm 18 of bag holder 14, and a second attachment portion 28*f* configured to engage with another arm 18 of the bag holder. Body 22*f* includes a first side 34*f*, a second side 38*f* opposing the first side, and a first section 42*f* and a second section 46*f* disposed between the first side and the second side. In some configurations, first and second sections 42*f*, 46*f* can define an aperture 58*f* for carrying bag 10*f*.

First attachment portion 24*f* may be positioned closer to first side 34*f* of body 22*f* than to second side 38*f*. Similarly, second attachment portion 28*f* may be positioned closer to second side 38*f* of body 22*f* than to first side 34*f*. As shown, first attachment portion 24*f* and second attachment portion 28*f* are unitary with body 22*f*. First attachment portion 24*f* can include a notch 50*f* and second attachment portion 28*f* can include a notch 52*f*. Notches 50*f*, 52*f* can be defined by an inner portion of the respective attachment portion. For example, notches 50*f*, 52*f* can correspond to an aperture defined by first and second attachment portions 24*f*, 28*f*, respectively. In some configurations, notches 50*f*, 52*f* can be elliptical, however, in other configurations, the notches can be rectangular, polygonal, angled, or otherwise rounded. A height of each notch 50*f*, 52*f* can be greater than a height D5 of arm 18. As describe herein, first attachment portion 24*f* and second attachment portion 28*f* can be configured to slide along arm 18 while supporting bag 10*f*.

Figure 14A:
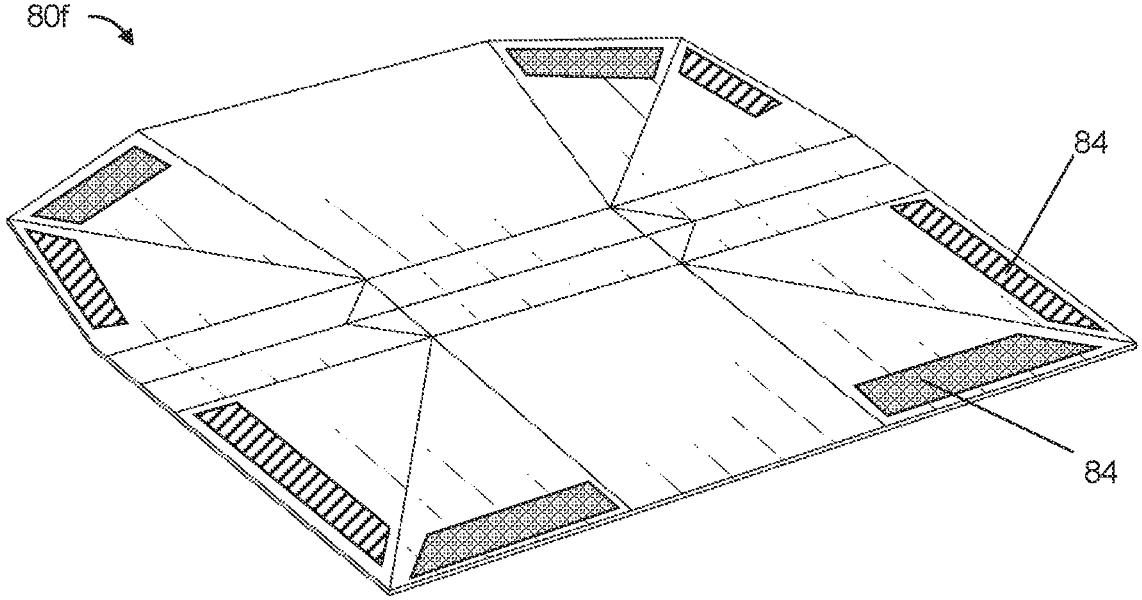
FIGS. 14A-14D show a process of forming the paper bag of FIG. 13A.

Referring now to FIGS. 14A-14D, shown is a process for making bag 10*f* from a sheet 80*f* of paper material. As shown in FIG. 14A, sheet 80*f* can be a pre-fabricated sheet, that is sized and shaped based on the target dimensions of bag 10*f* or can be cut from a larger area of paper material to form sheet 80*f*. In some configurations, sheet 80*f* includes adhesive material 84 applied to one or more sides of the sheet. In some configurations, the process can include applying adhesive 84 to different portions of sheet 80*f*. However, in other configurations, sheet 80*f* may come pre-fabricated with adhesive 84 already applied to the sheet. In such configurations, one or more other steps may be necessary, such as removing a covering from adhesive 84, or the like.

Figure 14B:
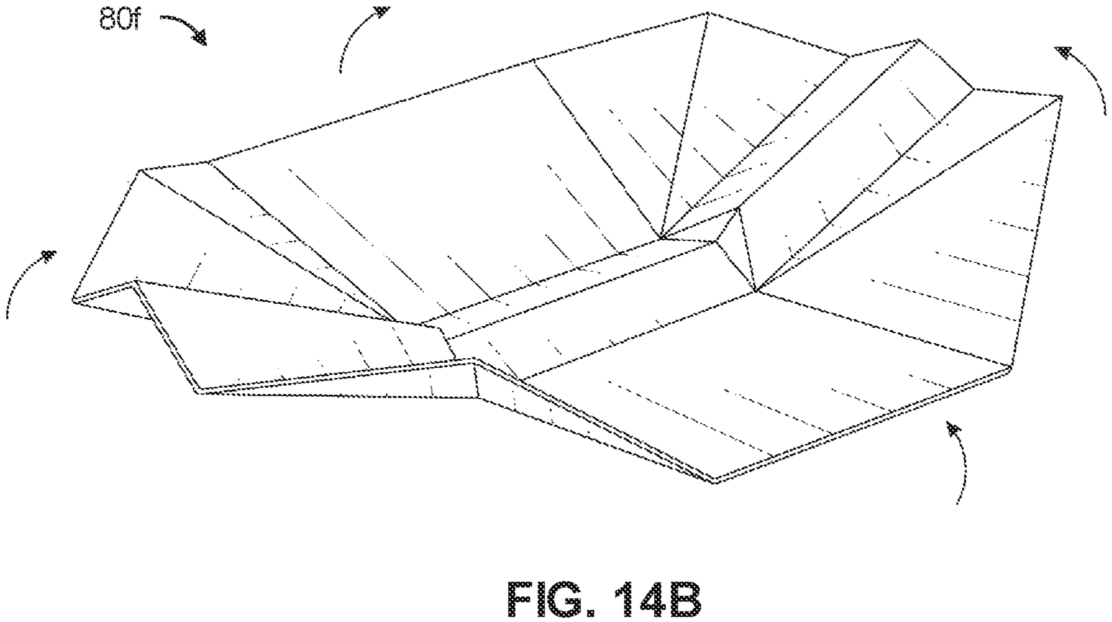
Figure 14C:
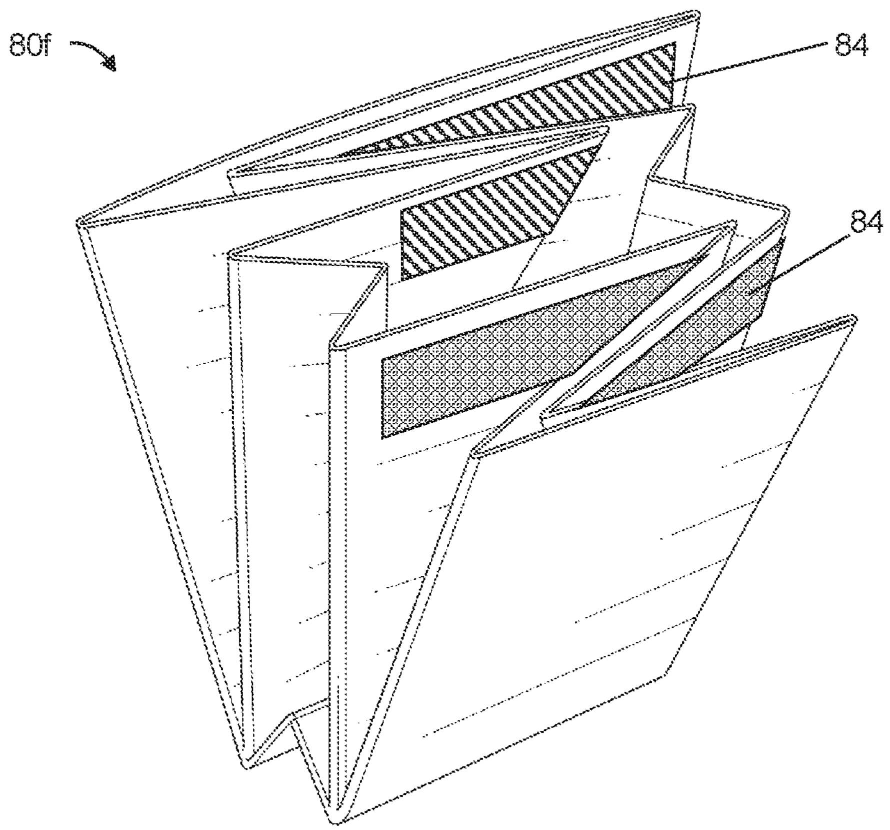
Figure 14D:
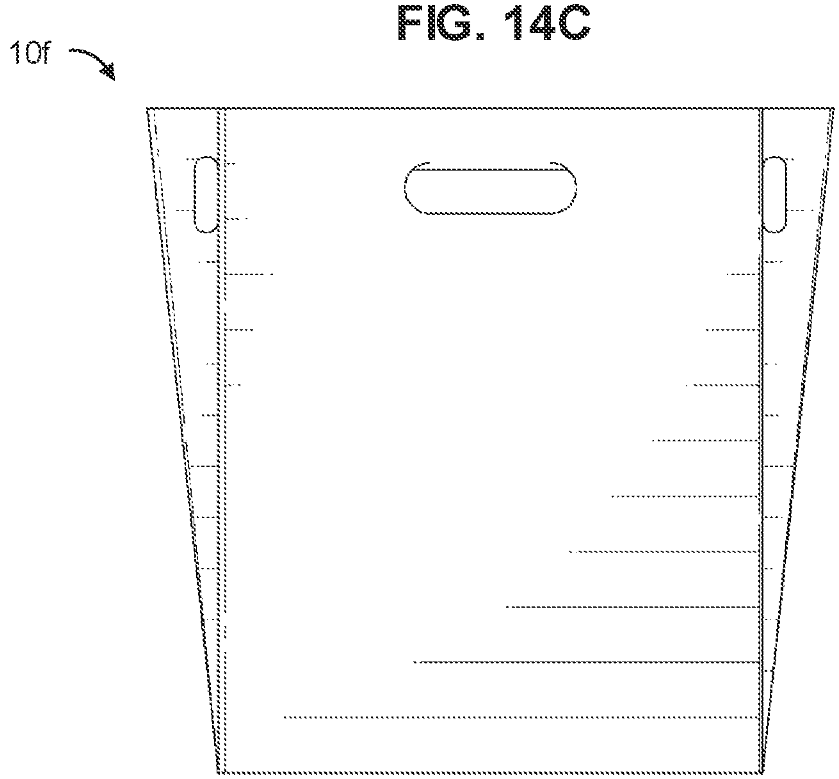

As shown in FIGS. 14A-14D, the method of forming bag 10*f* can include folding sheet 80*f*. For example, each edge of sheet 80*f* can be folded inward toward the center in an accordion like manner. As shown in FIGS. 14B and 14C, side portions of sheet 80*f* corresponding to first and second sides can fold laterally inwards while other panels of the sheet overlie each other to form the remainder of bag 10*f*. Some methods of forming bag 10*e* can include the steps of cutting one or more features of the bag, such as for example, apertures 58*f* or notches 50*f*, 52*f*. The cutting step can occur prior to or after folding.

FIGS. 15A-15I show an eighth configuration 10*g* of the present bags. Bag 10*g* includes a body 22*g*, a first attachment portion 24*g* configured to engage with an arm 18 of bag holder 14, and a second attachment portion 28*g* configured to engage with another arm 18 of the bag holder. Body 22*g* includes a first side 34*g*, a second side 38*g* opposing the first side, and a first section 42*g* and a second section 46*g* disposed between the first side and the second side.

As shown, first attachment portion 24*g* and second attachment portion 28*g* are separate from body 22*g*. First attachment portion 24*g* may be positioned closer to first side 34*g* of body 22*g* than to second side 38*g*. Similarly, second attachment portion 28*g* may be positioned closer to second side 38*g* of body 22*g* than to first side 34*g*. For example, second attachment portion 28*g* may extend away from second side 38*g*, for example in a vertical direction, of bag 10*g*.

Figure 15A:
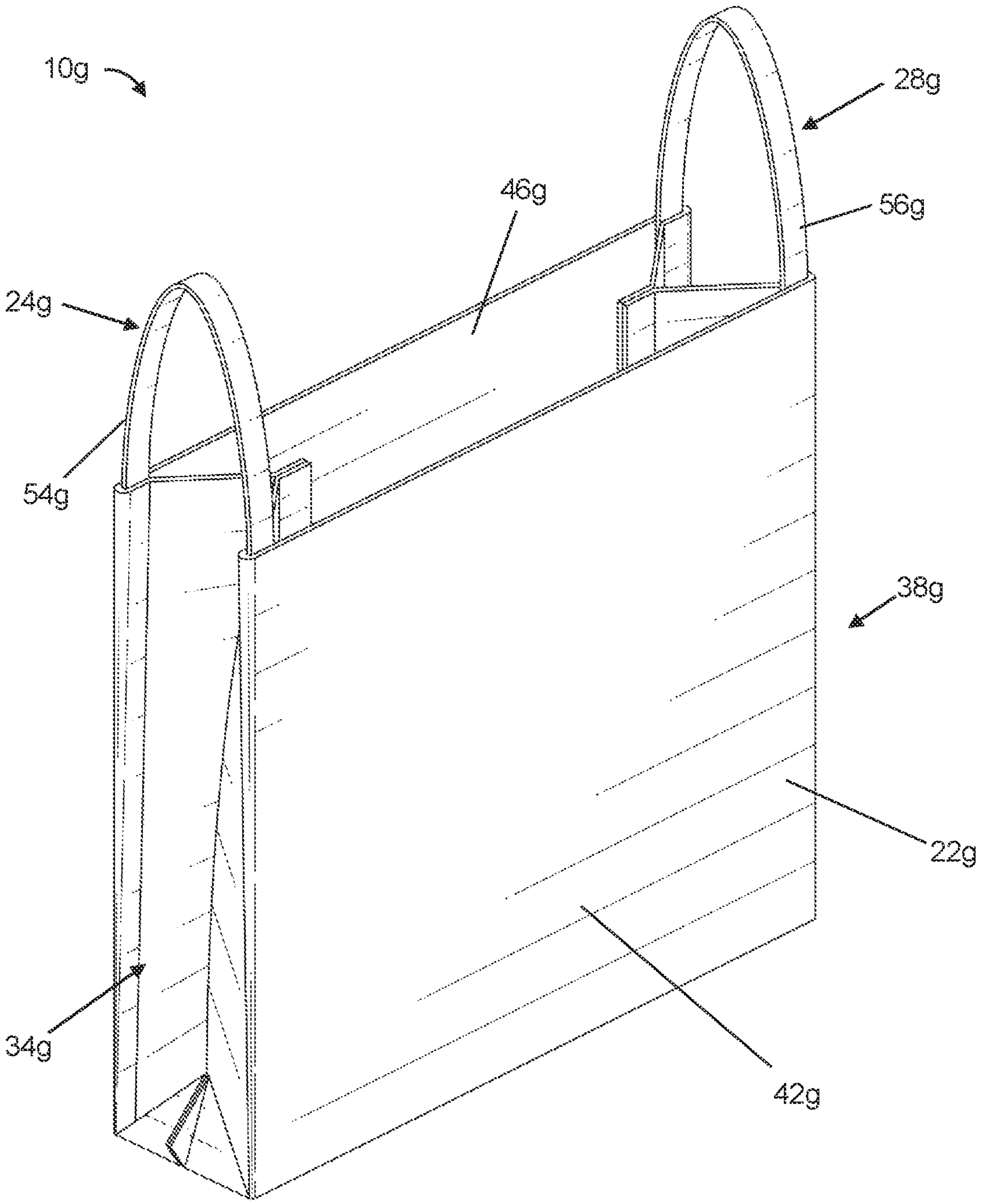
FIG. 15A is a perspective view of an example of an eighth configuration of the present paper bags.
Figure 15C:
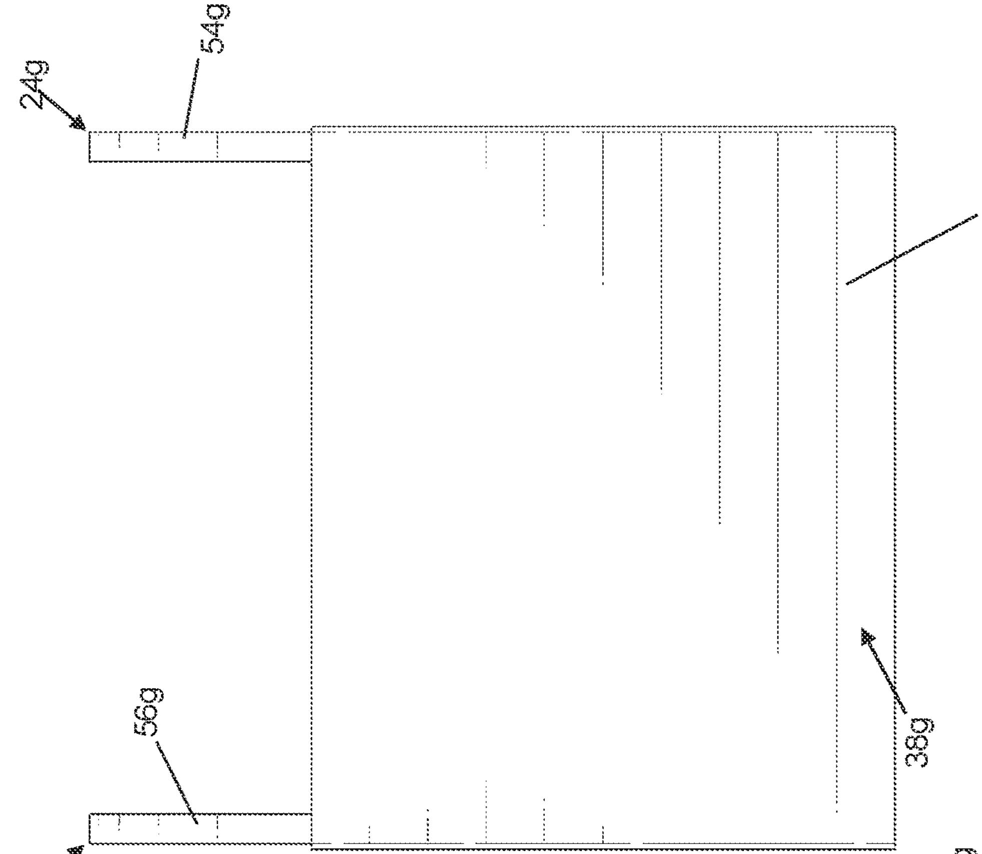
FIGS. 15B and 15C are front and back views, respectively, of the paper bag of FIG. 15A.
Figure 15B:
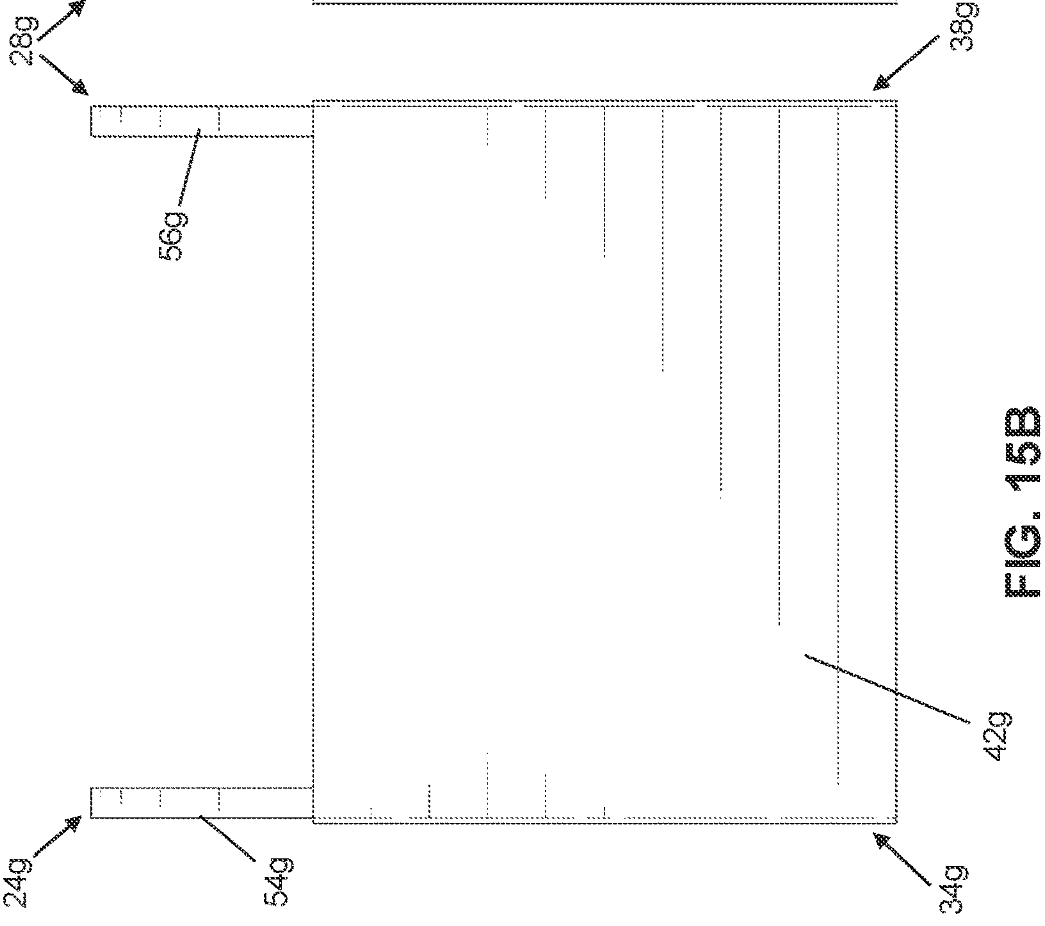
Figures 15D, 15E, 15F, 15G:
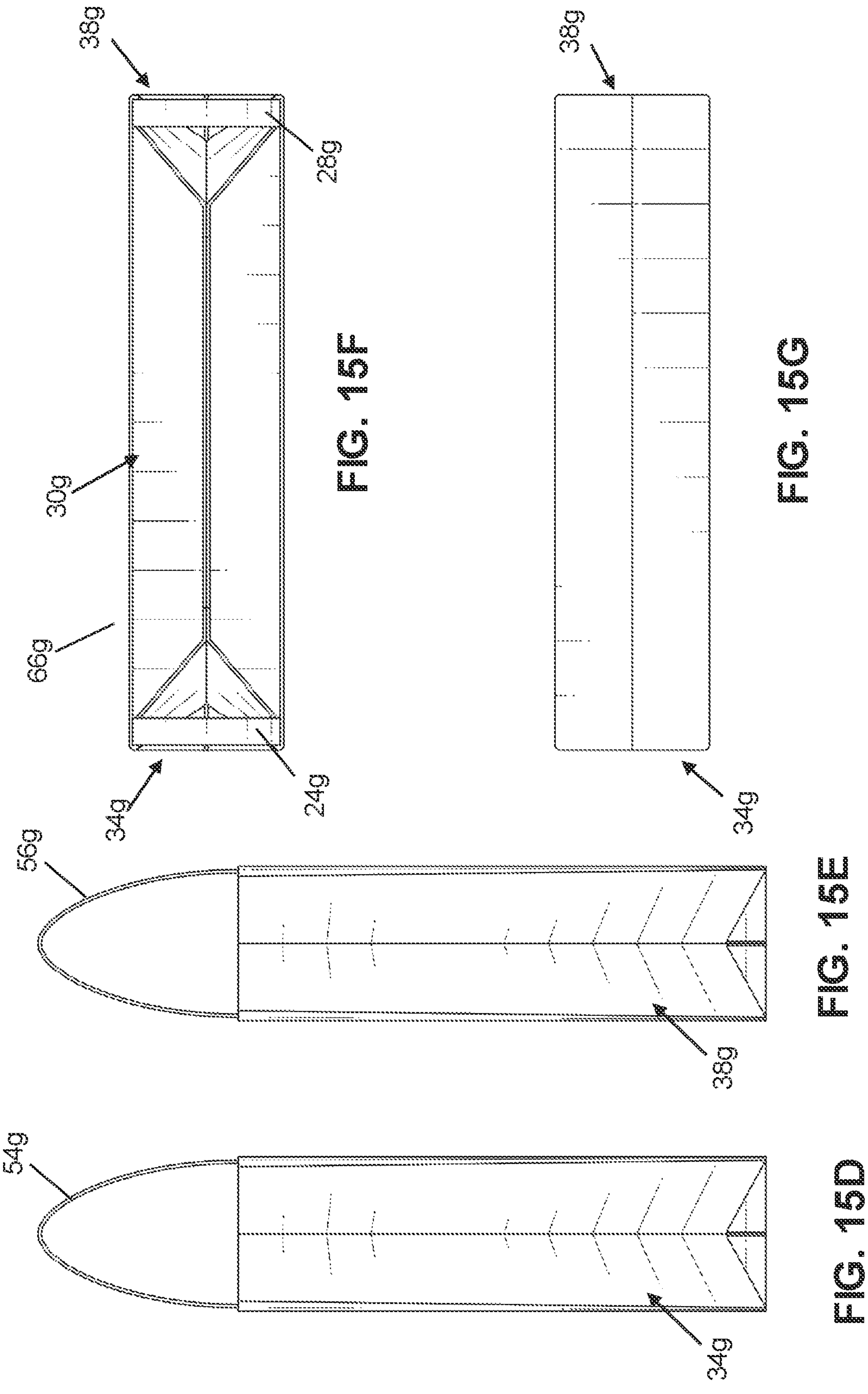
FIGS. 15D and 15E are left and right side views, respectively, of the paper bag of FIG. 15A.
FIGS. 15F and 15G are top and bottom views, respectively, of the paper bag of FIG. 15A.
Figure 15I:
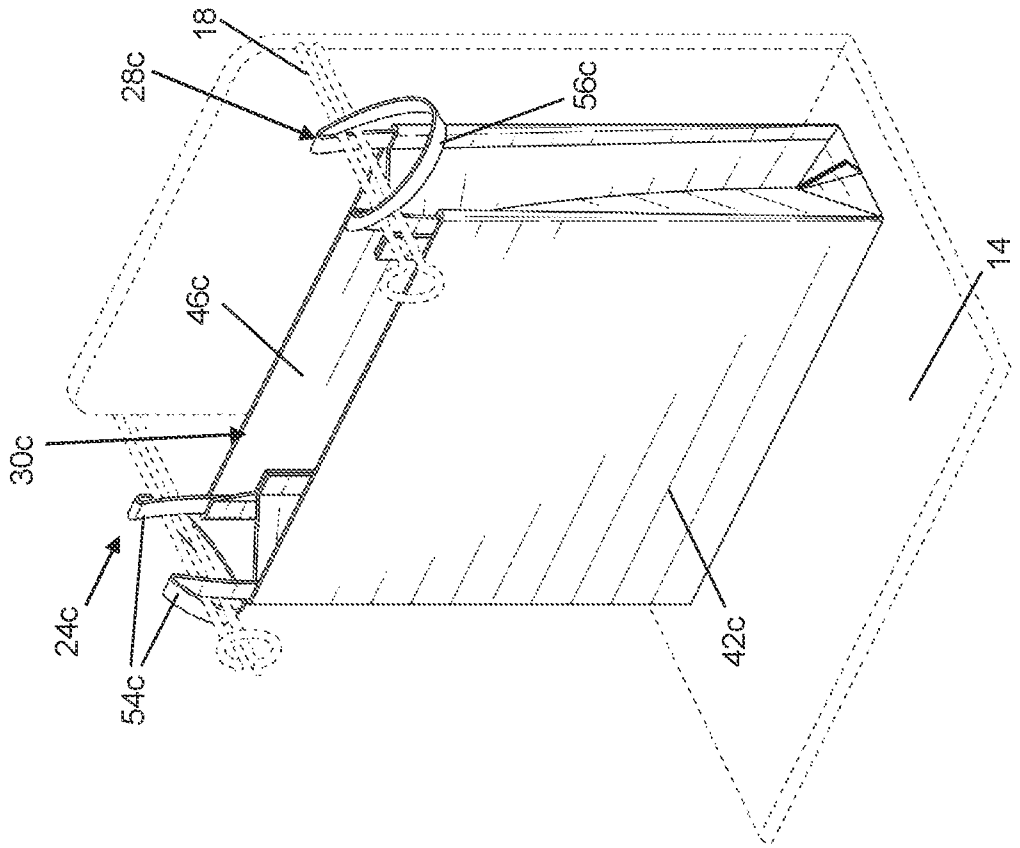
FIG. 15I is a perspective view of the paper bag of FIG. 15A in a second position while engaged with a bag holder system.
Figure 15H:
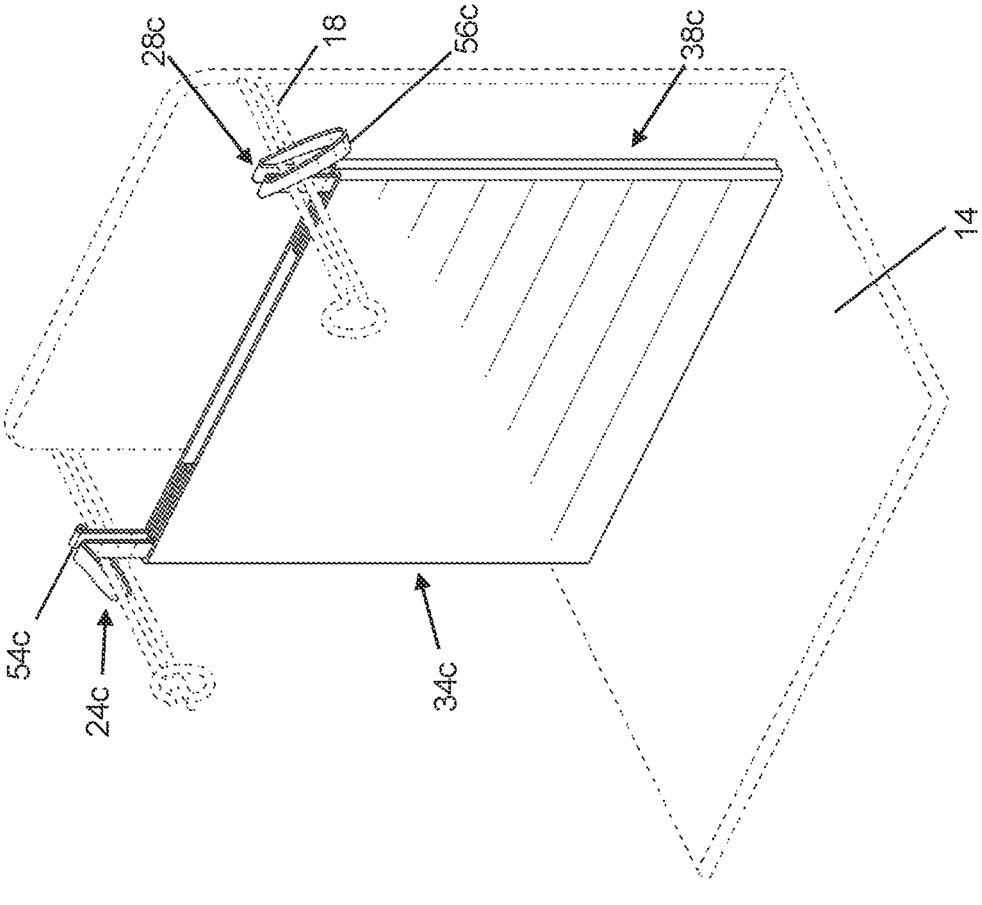
FIG. 15H is a perspective view of the paper bag of FIG. 15A in a first position while engaged with a bag holder system.

First attachment portion 24*g* a handle portion 54*g* and second attachment portion 28*g* includes a handle portion 56*g*. As shown, handle portion 54*g* extends vertically above opening 30*g* on first side 34*g* of body 22*g* and handle portion 56*g* extends vertically above the opening on second side 38*g* of the body. Handle portions 54*g*, 56*g* can include a strip of paper material that extends from first section 42*g* to second section 46*g* to define a loop that can be used to carry bag 10*g*. As best shown in FIGS. 15H and 15I, handle portions 54*g*, 56*g* may be moveable between an engaged position, as shown in FIG. 15H, and a carrying position, as shown in FIG. 15A. In the engage position, handle portions 54*g*, 56*g* can fold over itself to engage arm 18. Each of handle portions 54*g*, 56*fg* can be sufficiently stiff to support the weight of bag 10*g* in both the open and closed positions.

Figure 16A:
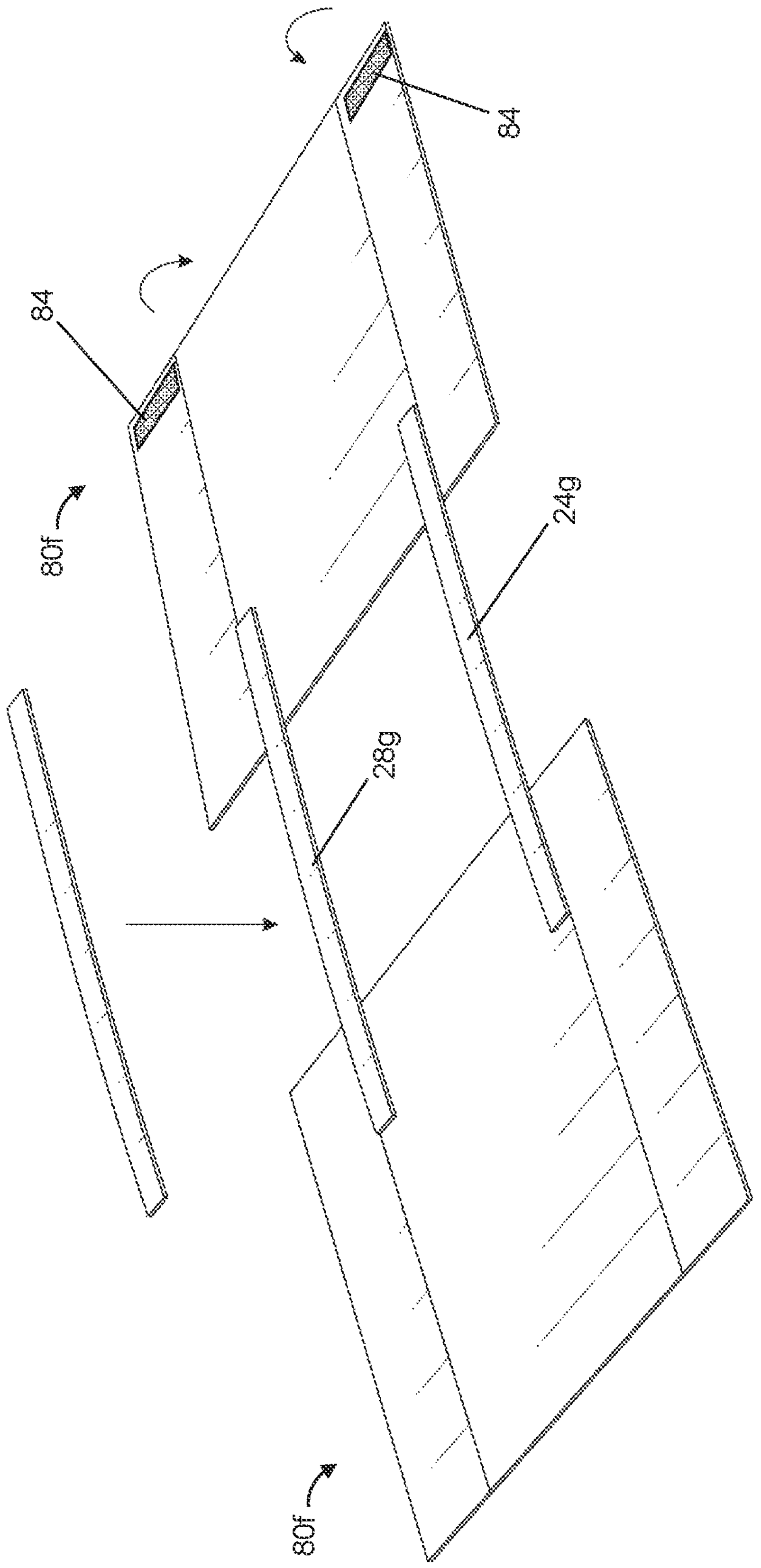
FIGS. 16A-16C show a process of forming the paper bag of FIG. 15A.
Figure 16B:
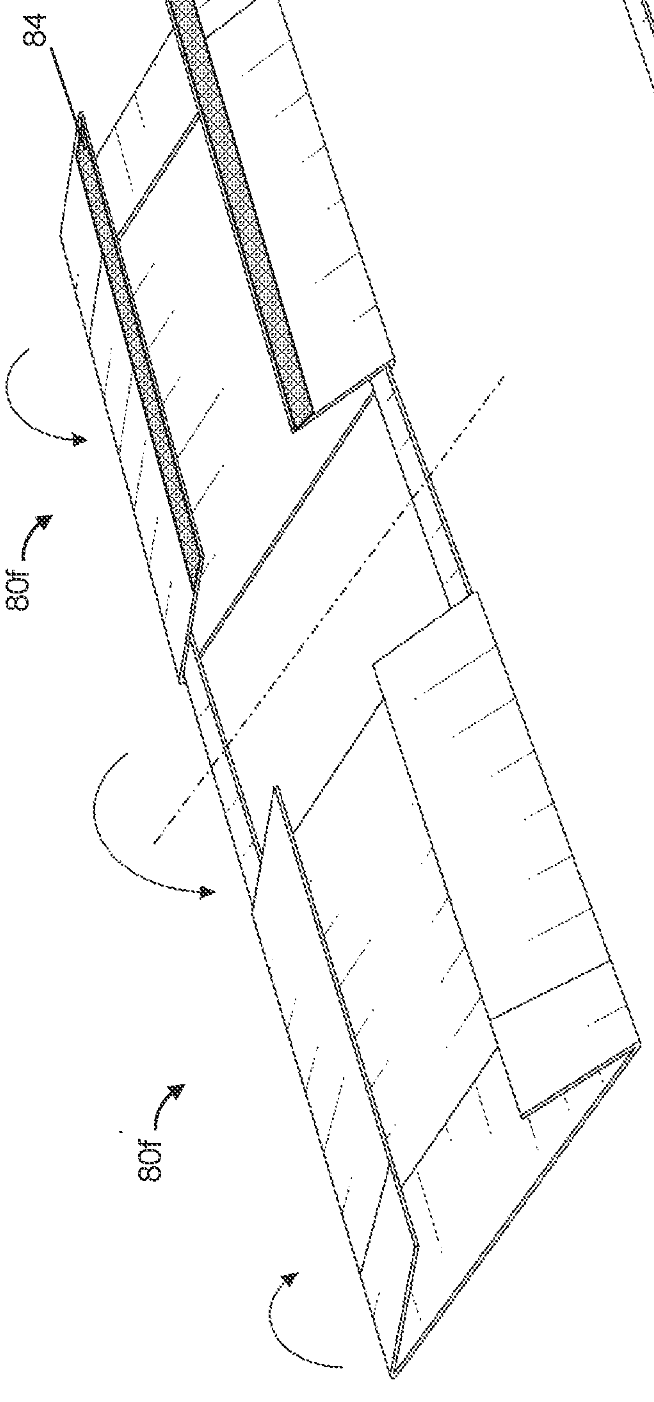
Figure 16C:
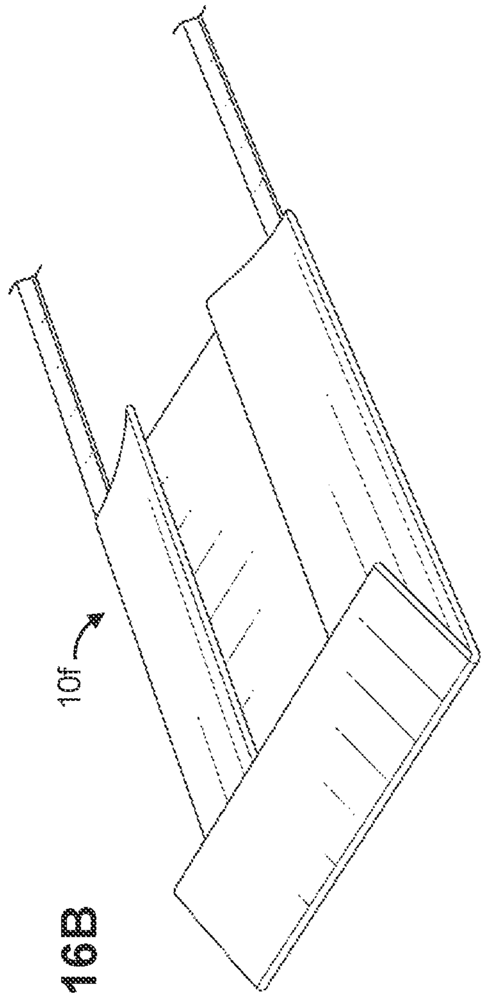

Referring now to FIGS. 16A-16C, shown is a process for making bag 10*g* from a sheet 80*g* of paper material. As shown in FIG. 16A, two sheets 80*g* can be used to form bag 10*g*. Sheets 80*g* can be pre-fabricated sheet or can be cut from a larger area of paper material to form the sheets. In some configurations, sheets 80*g* includes adhesive material 84 applied to one or more sides of the sheet. In some configurations, the process can include applying adhesive 84 to different portions of sheet 80*g*. However, in other configurations, sheet 80*g* may come pre-fabricated with adhesive 84 already applied to the sheet. In such configurations, one or more other steps may be necessary, such as removing a covering from adhesive 84, or the like.

Some methods of forming bag 10*g* may include the steps of attaching first attachment portion 24*g* or second attachment portion 28*g* to sheets 80*g*. For example, a first end of first and second attachment portions 24*g*, 28*g* can be attached to one sheet 80*g* and a second end of the first and second attachment portions can be attached to another sheet 80*g*. As shown in FIGS. 16A and 16B, some methods of forming bag 10*g* can include folding sheets 80*g*. For example, each sheet 80*g* can be folded inward from a lateral edge of the sheet to overlie an end of first and second attachment portions 24*g*, 28*g*. Adhesive 84 can be used on both sides of the attachment portions to securely bond the attachment portions to sheets 80*g*. In some methods, first and second attachment portions 24*g*, 28*g* can be folded, such as for example folding in half, to attach the sheets 80*g* together as shown in FIG. 16B. Additional folds can be made to form bag 10*g* and, in some configurations, one or more cutting steps may be performed to create different features as described herein.

The above specification and examples provide a complete description of the structure and use of illustrative configurations. Although certain configurations have been described above with a certain degree of particularity, or with reference to one or more individual configurations, those skilled in the art could make numerous alterations to the disclosed configurations without departing from the scope of this invention. For example, certain features of one configuration can be replaced or added to other configurations. To illustrate, a configuration having a handle can be also include an aperture in addition to or in place of the handle. The modifications are not limited to these two features and a skilled person would understand multiple aspects of the described configurations can be utilized in other configurations.

As such, the various illustrative configurations of the methods and systems are not intended to be limited to the particular forms disclosed. Rather, they include all modifications and alternatives falling within the scope of the claims, and configurations other than the one shown may include some or all of the features of the depicted configurations. For example, elements may be omitted or combined as a unitary structure, connections may be substituted, or both. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one configuration or may relate to several configurations. Accordingly, no single implementation described herein should be construed as limiting and implementations of the disclosure may be suitably combined without departing from the teachings of the disclosure.

The previous description of the disclosed implementations is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims. The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A paper bag comprising:

a body defining an opening configured to receive objects, the body having:

opposing folding first and second sides;

a first section disposed between the first side and the second side, the first section being movably coupled to the first side along a first lateral fold and to the second side along a second lateral fold;

a second section disposed between the first and second sides, the second section being movably coupled to the first side along a third lateral fold and to the second side along a fourth lateral fold, the second section moveable relative to the first section via folding of the first and second sides to define a cavity that is in communication with the opening;

a first attachment portion comprising paper configured to engage with a first arm of a bag holder, the first attachment portion being closer to the first side of the body than the second side; and a second attachment portion comprising paper configured to engage with a second arm of the bag holder, the second attachment portion being closer to the second side of the body than the first side;

where the body comprises paper;

where paper bag includes at least one characteristic selected from the list of characteristics consisting of:

the first and second attachment portions extend laterally outward from respective ones of the first and second sections to outer edges at least portions of which are laterally outward of the nearest lateral folds corresponding to the respective closer one of the first and second side of the paper bag; or the first and second attachment portions extend laterally outward beyond the lateral folds corresponding to the respective closer one of the first and second sides of the paper bag, and each of the first and second attachment portions includes a layer of paper that is unitary with a layer of paper defining a respective one of the first and second sections of the body of the paper bag, the first and second attachment portions each defining a notch configured to receive one of the first and second arms of the bag holder; or the first attachment portion includes a first notch and a second notch, and the second attachment portion includes a third notch and a fourth notch, the first notch extending at least partially inward of the first lateral fold such that a folded edge defined by the first lateral fold is interrupted by and extends above and below the first notch, and the second notch extending at least partially inward of the third lateral fold such that a folded edge defined by the third lateral fold is interrupted by and extends above and below the second notch, the third notch extending at least partially inward of the second lateral fold such that a folded edge defined by the second lateral fold is interrupted by and extends above and below the third notch, and the fourth notch extending at least partially inward of the fourth lateral fold such that a folded edge defined by the fourth lateral fold is interrupted by and extends above and below the fourth notch, where the first lateral fold is coupled to the third lateral fold to define a first handle portion above the first and second notches, and the second lateral fold is coupled to the fourth lateral fold to define a second handle portion above the third and fourth notches.

2. The paper bag of claim 1, where the paper includes kraft paper.

3. The paper bag of claim 1, further comprising:

a first handle coupled to the body; and a second handle coupled to the body.

4. The paper bag of claim 1, where:

the first section defines a first aperture; and the second section defines a second aperture that is aligned with the first aperture.

5. The paper bag of claim 1, where at least a majority of the first and second sections are interposed between the first attachment portion and the second attachment portion.

6. The paper bag of claim 1, where the first and second attachment portions are unitary with the body.

7. The paper bag of claim 1, where:

the paper bag includes a perimeter; and the first attachment portion comprises a first notch extending inward from the perimeter.

8. The paper bag of claim 7, where the first notch includes:

a first region having a first transverse dimension; and a second region having a second transverse dimension that is greater than the first transverse dimension.

9. The paper bag of claim 8, where the first transverse dimension is less than a dimension of the first arm of the bag holder and the second transverse dimension is greater than the dimension of the first arm such that the first attachment portion is configured to slide along the first arm.

10. The paper bag of claim 7, where the first notch is positioned vertically below the opening.

11. The paper bag of claim 7, where the first notch extends vertically upward from the perimeter.

12. The paper bag of claim 7, where the second attachment portion comprises a second notch extending inward from the perimeter.

13. The paper bag of claim 1, where the first attachment portion includes a handle portion.

14. The paper bag of claim 1, where the paper bag does not include plastic.

15. The paper bag of claim 1, where at least one of the first and second attachment portions are disposed laterally outward from the body.

16. The paper bag of claim 1, where a width of the paper bag is greater than a width of the body.

17. The paper bag of claim 1, where the first lateral fold is unitary with the third lateral fold.

18. A method of forming a paper bag comprising:

folding a paper sheet to form a bag comprising:

a body having:

a first section disposed between a folding first side and a folding second side of the body, the first section being movably coupled to the first side along a first lateral fold and to the second side along a second lateral fold;

a second section opposite the first section and disposed between the first and second sides of the body, the second section being movably coupled to the first side along a third lateral fold and to the second side along a fourth lateral fold;

forming a first attachment portion in the bag, the first attachment portion comprising paper configured to engage with a first arm of a bag holder; and forming a second attachment portion in the bag, the second attachment portion comprising paper configured to engage with a second arm of the bag holder;

where:

the first attachment portion is closer to the first side of the body than the second side than the second side; and the second attachment portion is closer to the second side of the body than the first side; and where the paper bag includes at least one characteristic selected from the list of characteristics consisting of:

the first and second attachment portions extend laterally outward from respective ones of the first and second sides to outer edges at least portions of which are laterally outward of the lateral folds corresponding to the respective closer one of the first and second side of the paper bag, the first and second attachment portions each defining a notch configured to receive one of the first and second arms of the bag holder; or the first and second attachment portions extend laterally outward beyond the lateral folds corresponding to the respective closer one of the first and second sides of the paper bag, and each of the first and second attachment portions includes a layer of paper that is unitary with a layer of paper defining a respective one of the first and second sections of the body of the paper bag, the first and second attachment portions each defining a notch configured to receive one of the first and second arms of the bag holder; or the first attachment portion includes a first notch and a second notch, and the second attachment portion includes a third notch and a fourth notch, the first notch extending at least partially inward of the first lateral fold such that a folded edge defined by the first lateral fold is interrupted by and extends above and below the first notch, and the second notch extending at least partially inward of the third lateral fold such that a folded edge defined by the third lateral fold is interrupted by and extends above and below the second notch, the third notch extending at least partially inward of the second lateral fold such that a folded edge defined by the second lateral fold is interrupted by and extends above and below the third notch, and the fourth notch extending at least partially inward of the fourth lateral fold such that a folded edge defined by the fourth lateral fold is interrupted by and extends above and below the fourth notch, where the first lateral fold is coupled to the third lateral fold to define a first handle portion above the first and second notches, and the second lateral fold is coupled to the fourth lateral fold to define a second handle portion above the third and fourth notches.

19. The method of claim 18, where:

forming the first attachment portion includes cutting a first notch in the bag; and forming the second attachment portion includes cutting a second notch in the bag.

20. The method of claim 19, where the first and second notch extend from a perimeter of the bag.

21. The method of claim 18, where the first and second attachment portions do not extend laterally outward beyond the lateral folds, and the method further comprises:

attaching a portion of the first section to a portion of the second section; and cutting a portion of the sheet to form an opening of the bag; and where the second section is moveable relative to the first section to define a cavity that is in communication with the opening of the bag.

22. The method of claim 18, where the second lateral fold is unitary with the fourth lateral fold.

* * * * *